United States Patent
Xu et al.

(10) Patent No.: US 11,035,940 B2
(45) Date of Patent: *Jun. 15, 2021

(54) METHOD, APPARATUS, AND SYSTEM FOR WIRELESS PROXIMITY AND PRESENCE MONITORING

(71) Applicants: Qinyi Xu, Mountain View, CA (US); Yi Han, Ellicott City, MD (US); Hung-Quoc Duc Lai, Parkville, MD (US); Beibei Wang, Clarksville, MD (US); Oscar Chi-Lim Au, San Jose, CA (US); K. J. Ray Liu, Potomac, MD (US)

(72) Inventors: Qinyi Xu, Mountain View, CA (US); Yi Han, Ellicott City, MD (US); Hung-Quoc Duc Lai, Parkville, MD (US); Beibei Wang, Clarksville, MD (US); Oscar Chi-Lim Au, San Jose, CA (US); K. J. Ray Liu, Potomac, MD (US)

(73) Assignee: ORIGIN WIRELESS, INC., Greenbelt, MD (US)

(*) Notice: Subject to any disclaimer, the term of this patent is extended or adjusted under 35 U.S.C. 154(b) by 0 days.

This patent is subject to a terminal disclaimer.

(21) Appl. No.: 16/667,648

(22) Filed: Oct. 29, 2019

(65) Prior Publication Data
US 2020/0064456 A1    Feb. 27, 2020

Related U.S. Application Data

(63) Continuation-in-part of application No. 15/326,112, filed as application No. PCT/US2015/041037 on Jul.
(Continued)

(51) Int. Cl.
*G01S 13/56* (2006.01)
*G01S 13/00* (2006.01)
*G01S 7/00* (2006.01)

(52) U.S. Cl.
CPC ............ *G01S 13/003* (2013.01); *G01S 7/006* (2013.01); *G01S 13/56* (2013.01)

(58) Field of Classification Search
CPC ......... G01S 13/003; G01S 13/56; G01S 7/006
See application file for complete search history.

(56) References Cited

U.S. PATENT DOCUMENTS

| 9,742,974 B2 * | 8/2017 | Tang | H04N 5/23206 |
| 2002/0130807 A1 * | 9/2002 | Hall | G01S 7/282 342/28 |

(Continued)

*Primary Examiner* — Christopher M Brandt

(57) ABSTRACT

Methods, apparatus and systems for monitoring a presence or a motion of an object in a proximity of an apparatus are described. In one example, a described apparatus is in a venue for wireless proximity monitoring. The apparatus comprises: a transmitter, a receiver, and a processor. The transmitter is configured for transmitting a wireless signal through a wireless multipath channel, wherein the wireless multipath channel is impacted by a motion of an object within a proximity of the apparatus. The receiver is configured for: receiving the wireless signal through the wireless multipath channel between the transmitter and the receiver, and obtaining a time series of channel information (TSCI) of the wireless multipath channel based on the wireless signal received by the receiver. The processor is configured for monitoring the motion of the object within the proximity of the apparatus based at least partially on the TSCI.

30 Claims, 14 Drawing Sheets

Related U.S. Application Data 17, 2015, and a continuation-in-part of application No. 16/127,151, filed on Sep. 10, 2018, which is a continuation-in-part of application No. PCT/US2017/021963, filed on Mar. 10, 2017, and a continuation-in-part of application No. 16/127,092, filed on Sep. 10, 2018, now Pat. No. 10,476,730, which is a continuation-in-part of application No. PCT/US2017/021957, filed on Mar. 10, 2017, and a continuation-in-part of application No. 16/125,748, filed on Sep. 9, 2018, now Pat. No. 10,833,912, which is a continuation-in-part of application No. PCT/US2017/015909, filed on Jan. 31, 2017, which is a continuation-in-part of application No. 15/861,422, filed on Jan. 3, 2018, and a continuation-in-part of application No. 16/200,608, filed on Nov. 26, 2018, now Pat. No. 10,735,298, and a continuation-in-part of application No. 16/200,616, filed on Nov. 26, 2018, now Pat. No. 10,495,725, and a continuation-in-part of application No. 16/446,589, filed on Jun. 19, 2019, now Pat. No. 10,742,475, which is a continuation-in-part of application No. 15/326,112, filed as application No. PCT/US2015/041037 on Jul. 17, 2015, said application No. 16/446,589 is a continuation-in-part of application No. 15/584,052, filed on May 2, 2017, now Pat. No. 10,447,094, which is a continuation-in-part of application No. 15/434,813, filed on Feb. 16, 2017, now Pat. No. 10,129,862, and a continuation-in-part of application No. 16/127,151, filed on Sep. 10, 2018, which is a continuation-in-part of application No. PCT/US2017/021963, filed on Mar. 10, 2017, and a continuation-in-part of application No. 16/127,092, filed on Sep. 10, 2018, now Pat. No. 10,476,730, which is a continuation-in-part of application No. PCT/US2017/021957, filed on Mar. 10, 2017, and a continuation-in-part of application No. PCT/US2017/027131, filed on Apr. 12, 2017, and a continuation-in-part of application No. 15/384,217, filed on Dec. 19, 2016, now Pat. No. 10,440,705, and a continuation-in-part of application No. 16/125,748, filed on Sep. 9, 2018, now Pat. No. 10,833,912, which is a continuation-in-part of application No. PCT/US2017/015909, filed on Jan. 31, 2017, and a continuation-in-part of application No. 15/861,422, filed on Jan. 3, 2018, and a continuation-in-part of application No. 16/060,710, filed as application No. PCT/US2016/066015 on Dec. 9, 2016, now Pat. No. 10,380,881, said application No. 16/446,589 is a continuation-in-part of application No. 15/873,806, filed on Jan. 17, 2018, now Pat. No. 10,270,642, and a continuation-in-part of application No. 16/101,444, filed on Aug. 11, 2018, now Pat. No. 10,291,460, and a continuation-in-part of application No. 16/200,608, filed on Nov. 26, 2018, now Pat. No. 10,735,298, and a continuation-in-part of application No. 16/200,616, filed on Nov. 26, 2018, now Pat. No. 10,495,725, and a continuation-in-part of application No. 16/203,299, filed on Nov. 28, 2018, now Pat. No. 10,374,863, and a continuation-in-part of application No. 16/203,317, filed on Nov. 28, 2018, now Pat. No. 10,397,039.

(60) Provisional application No. 62/753,017, filed on Oct. 30, 2018, provisional application No. 62/806,688, filed on Feb. 15, 2019, provisional application No. 62/806,694, filed on Feb. 15, 2019, provisional application No. 62/846,686, filed on May 12, 2019, provisional application No. 62/846,688, filed on May 12, 2019, provisional application No. 62/849,853, filed on May 18, 2019, provisional application No. 62/331,278, filed on May 3, 2016, provisional application No. 62/734,224, filed on Sep. 20, 2018, provisional application No. 62/744,093, filed on Oct. 10, 2018, provisional application No. 62/868,782, filed on Jun. 28, 2019, provisional application No. 62/873,781, filed on Jul. 12, 2019, provisional application No. 62/900,565, filed on Sep. 15, 2019, provisional application No. 62/902,357, filed on Sep. 18, 2019.

(56) References Cited

U.S. PATENT DOCUMENTS

| | | | |
|---|---|---|---|
| 2010/0118827 A1* | 5/2010 | Sundaresan | H04W 72/0486 370/330 |
| 2014/0142748 A1* | 5/2014 | Geigel | G07F 9/026 700/237 |
| 2015/0223189 A1* | 8/2015 | Le Grand | G01S 5/0252 455/456.3 |
| 2015/0289155 A1* | 10/2015 | Gao | H04B 7/0413 370/252 |
| 2017/0230210 A1* | 8/2017 | Narasimha | H04B 7/0639 |
| 2017/0332363 A1* | 11/2017 | Lee | H04W 24/08 |
| 2017/0365163 A1* | 12/2017 | MacKenzie | G01S 13/88 |
| 2019/0175074 A1* | 6/2019 | Zhang | G08B 21/043 |
| 2019/0349715 A1* | 11/2019 | Ghourchian | H04W 4/33 |

* cited by examiner

METHOD, APPARATUS, AND SYSTEM FOR WIRELESS PROXIMITY AND PRESENCE MONITORING

CROSS-REFERENCE TO RELATED APPLICATIONS

The present application hereby incorporates by reference the entirety of the disclosures of, and claims priority to, each of the following cases:
(a) U.S. patent application Ser. No. 15/326,112, entitled "WIRELESS POSITIONING SYSTEMS", filed on Jan. 13, 2017,
  (1) which is a national stage entry of PCT patent application PCT/US2015/041037, entitled "WIRELESS POSITIONING SYSTEMS", filed on Jul. 17, 2015, published as WO 2016/011433A2 on Jan. 21, 2016,
(b) U.S. patent application Ser. No. 16/127,151, entitled "METHODS, APPARATUS, SERVERS, AND SYSTEMS FOR VITAL SIGNS DETECTION AND MONITORING", filed on Sep. 10, 2018,
  (1) which is a continuation-in-part of PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
(c) U.S. patent application Ser. No. 16/127,092, entitled "METHODS, APPARATUS, SERVERS, AND SYSTEMS FOR HUMAN IDENTIFICATION BASED ON HUMAN RADIO BIOMETRIC INFORMATION", filed on Sep. 10, 2018,
  (1) Which is a continuation-in-part of PCT patent application PCT/US2017/021957, entitled "METHODS, APPARATUS, SERVERS, AND SYSTEMS FOR HUMAN IDENTIFICATION BASED ON HUMAN RADIO BIOMETRIC INFORMATION", filed on Mar. 10, 2017, published as WO2017/156487A1 on Sep. 14, 2017,
(d) U.S. patent application Ser. No. 16/125,748, entitled "METHODS, DEVICES, SERVERS, APPARATUS, AND SYSTEMS FOR WIRELESS INTERNET OF THINGS APPLICATIONS", filed on Sep. 9, 2018,
  (1) which is a continuation-in-part of PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017,
(e) U.S. patent application Ser. No. 15/861,422, entitled "METHOD, APPARATUS, SERVER, AND SYSTEMS OF TIME-REVERSAL TECHNOLOGY", filed on Jan. 3, 2018,
(f) U.S. Provisional Patent application 62/753,017, entitled "METHOD, APPARATUS, AND SYSTEM FOR HUMAN IDENTIFICATION BASED ON HUMAN RADIO BIOMETRIC INFORMATION", filed on Oct. 30, 2018,
(g) U.S. patent application Ser. No. 16/200,608, entitled "METHOD, APPARATUS, SERVER AND SYSTEM FOR VITAL SIGN DETECTION AND MONITORING", filed on Nov. 26, 2018,
(h) U.S. patent application Ser. No. 16/200,616, entitled "METHOD, APPARATUS, SERVER AND SYSTEM FOR REAL-TIME VITAL SIGN DETECTION AND MONITORING", filed on Nov. 26, 2018,
(i) U.S. Provisional Patent application 62/806,688, entitled "METHOD, APPARATUS, AND SYSTEM FOR WIRELESS GAIT RECOGNITION", filed on Feb. 15, 2019,
(j) U.S. Provisional Patent application 62/806,694, entitled "METHOD, APPARATUS, AND SYSTEM FOR OUTDOOR TARGET TRACKING", filed on Feb. 15, 2019,
(k) U.S. Provisional Patent application 62/846,686, entitled "METHOD, APPARATUS, AND SYSTEM FOR WIRELESS INERTIAL MEASUREMENT", filed on May 12, 2019,
(l) U.S. Provisional Patent application 62/846,688, entitled "Method, Apparatus, and System for Processing and Presenting Life Log based on a Wireless Signal", filed on May 12, 2019,
(m) U.S. Provisional Patent application 62/849,853, entitled "Method, Apparatus, and System for Wireless Artificial Intelligent in Smart Car", filed on May 18, 2019,
(n) U.S. patent application Ser. No. 16/446,589, entitled "METHOD, APPARATUS, AND SYSTEM FOR OBJECT TRACKING AND SENSING USING BROADCASTING", filed on Jun. 19, 2019,
  (1) which is a Continuation-in-Part of U.S. patent application Ser. No. 15/326,112, entitled "WIRELESS POSITIONING SYSTEMS", filed on Jan. 13, 2017,
    a. which is a national stage entry of PCT patent application PCT/US2015/041037, entitled "WIRELESS POSITIONING SYSETMS", filed on Jul. 17, 2015, published as WO 2016/011433A2 on Jan. 21, 2016,
  (2) which is a Continuation-in-Part of U.S. patent application Ser. No. 15/584,052, entitled "METHOD, SYSTEM, AND APPARATUS FOR WIRELESS POWER TRANSMISSION BASED ON POWER WAVEFORMING", filed on May 2, 2017,
    a. which claims priority to U.S. Provisional patent application 62/331,278, entitled "USING VIRTUAL ANTENNAS FOR POWER WAVEFORMING IN WIRELESS POWER TRANSMISSION SYSTEMS", filed on May 3, 2016,
  (3) which is a Continuation-in-Part of U.S. patent application Ser. No. 15/434,813, entitled "METHODS, DEVICES, APPARATUS, AND SYSTEMS FOR MEDIUM ACCESS CONTROL IN WIRELESS COMMUNICATION SYSTEMS UTILIZING SPATIAL FOCUSING EFFECT", filed on Feb. 16, 2017, issued as U.S. Pat. No. 10,129,862 on Nov. 13, 2018,
  (4) which is a Continuation-in-Part of U.S. patent application Ser. No. 16/127,151, entitled "METHODS, APPARATUS, SERVERS, AND SYSTEMS FOR VITAL SIGNS DETECTION AND MONITORING", filed on Sep. 10, 2018,
    a. which is a national stage entry of PCT patent application PCT/US2017/021963, entitled "METHODS, APPARATUS, SERVERS, AND SYSTEMS FOR VITAL SIGNS DETECTION AND MONITORING", filed on Mar. 10, 2017, published as WO2017/156492A1 on Sep. 14, 2017,
  (5) which is a Continuation-in-Part of U.S. patent application Ser. No. 16/127,092, entitled "METHODS, APPARATUS, SERVERS, AND SYSTEMS FOR HUMAN IDENTIFICATION BASED ON HUMAN RADIO BIOMETRIC INFORMATION", filed on Sep. 10, 2018,
   a. which is a continuation-in-part of PCT patent application PCT/US2017/021957, entitled "METHODS, APPARATUS, SERVERS, AND SYSTEMS FOR HUMAN IDENTIFICATION BASED ON HUMAN RADIO BIOMETRIC INFORMATION", filed on Mar. 10, 2017, published as WO2017/156487A1 on Sep. 14, 2017,
(6) which is a Continuation-in-Part of PCT patent application PCT/US2017/027131, entitled "METHODS, APPARATUS, SERVERS, AND SYSTEMS FOR OBJECT TRACKING", filed on Apr. 12, 2017, published as WO2017/180698A1 on Oct. 19, 2017,
(7) which is a Continuation-in-Part of U.S. patent application Ser. No. 15/384,217, entitled "METHOD, APPARATUS, SERVER, AND SYSTEMS OF TIME-REVERSAL TECHNOLOGY", filed on Dec. 19, 2016, published as US2017/0188359A1 on Jun. 29, 2017,
(8) which is a Continuation-in-Part of U.S. patent application Ser. No. 16/125,748, entitled "METHODS, DEVICES, SERVERS, APPARATUS, AND SYSTEMS FOR WIRELESS INTERNET OF THINGS APPLICATIONS", filed on Sep. 9, 2018,
   a. which is a national stage entry of PCT patent application PCT/US2017/015909, entitled "METHODS, DEVICES, SERVERS, APPARATUS, AND SYSTEMS FOR WIRELESS INTERNET OF THINGS APPLICATIONS", filed on Jan. 31, 2017, published as WO2017/155634A1 on Sep. 14, 2017,
(9) which is a Continuation-in-Part of U.S. patent application Ser. No. 15/861,422, entitled "METHOD, APPARATUS, SERVER, AND SYSTEMS OF TIME-REVERSAL TECHNOLOGY", filed on Jan. 3, 2018,
(10) which is a Continuation-in-Part of U.S. patent application Ser. No. 16/060,710, entitled "METHOD, APPARATUS, AND SYSTEMS FOR WIRELESS EVENT DETECTION AND MONITORING", filed on Jun. 8, 2018,
   a. which is a national stage entry of PCT patent application PCT/US2016/066015, entitled "METHOD, APPARATUS, AND SYSTEMS FOR WIRELESS EVENT DETECTION AND MONITORING", filed on Dec. 9, 2016, published as WO2017/100706A1 on Jun. 15, 2017,
(11) which is a Continuation-in-Part of U.S. patent application Ser. No. 15/873,806, entitled "METHOD, APPARATUS, AND SYSTEM FOR OBJECT TRACKING AND NAVIGATION", filed on Jan. 17, 2018, issued as U.S. Pat. No. 10,270,642 on Apr. 23, 2019,
(12) which is a Continuation-in-Part of U.S. patent application Ser. No. 16/101,444, entitled "METHOD, APPARATUS, AND SYSTEM FOR WIRELESS MOTION MONITORING", filed on Aug. 11, 2018, issued as U.S. Pat. No. 10,291,460 on May 14, 2019,
(13) which claims priority to U.S. Provisional Patent application 62/734,224, entitled "METHOD, APPARATUS, AND SYSTEM FOR WIRELESS SLEEP MONITORING", filed on Sep. 20, 2018,
(14) which claims priority to U.S. Provisional Patent application 62/744,093, entitled "METHOD, APPARATUS, AND SYSTEM FOR WIRELESS PROXIMITY AND PRESENCE MONITORING", filed on Oct. 10, 2018,
(15) which claims priority to U.S. Provisional Patent application 62/753,017, entitled "METHOD, APPARATUS, AND SYSTEM FOR HUMAN IDENTIFICATION BASED ON HUMAN RADIO BIOMETRIC INFORMATION", filed on Oct. 30, 2018,
(16) which is a Continuation-in-Part of U.S. patent application Ser. No. 16/200,608, entitled "METHOD, APPARATUS, SERVER AND SYSTEM FOR VITAL SIGN DETECTION AND MONITORING", filed on Nov. 26, 2018,
(17) which is a Continuation-in-Part of U.S. patent application Ser. No. 16/200,616, entitled "METHOD, APPARATUS, SERVER AND SYSTEM FOR REAL-TIME VITAL SIGN DETECTION AND MONITORING", filed on Nov. 26, 2018,
(18) which is a Continuation-in-Part of U.S. patent application Ser. No. 16/203,299, entitled "APPARATUS, SYSTEMS AND METHODS FOR EVENT RECOGNITION BASED ON A WIRELESS SIGNAL", filed on Nov. 28, 2018,
(19) which is a Continuation-in-Part of U.S. patent application Ser. No. 16/203,317, entitled "APPARATUS, SYSTEMS AND METHODS FOR FALL-DOWN DETECTION BASED ON A WIRELESS SIGNAL", filed on Nov. 28, 2018,
(20) which claims priority to U.S. Provisional Patent application 62/806,688, entitled "METHOD, APPARATUS, AND SYSTEM FOR WIRELESS GAIT RECOGNITION", filed on Feb. 15, 2019,
(21) which claims priority to U.S. Provisional Patent application 62/806,694, entitled "METHOD, APPARATUS, AND SYSTEM FOR OUTDOOR TARGET TRACKING", filed on Feb. 15, 2019,
(22) which claims priority to U.S. Provisional Patent application 62/846,686, entitled "METHOD, APPARATUS, AND SYSTEM FOR WIRELESS INERTIAL MEASUREMENT", filed on May 12, 2019,
(23) which claims priority to U.S. Provisional Patent application 62/846,688, entitled "Method, Apparatus, and System for Processing and Presenting Life Log based on a Wireless Signal", filed on May 12, 2019,
(24) which claims priority to U.S. Provisional Patent application 62/849,853, entitled "Method, Apparatus, and System for Wireless Artificial Intelligent in Smart Car", filed on May 18, 2019,
(o) U.S. Provisional Patent application 62/868,782, entitled "METHOD, APPARATUS, AND SYSTEM FOR VITAL SIGNS MONITORING USING HIGH FREQUENCY WIRELESS SIGNALS", filed on Jun. 28, 2019,
(p) U.S. Provisional Patent application 62/873,781, entitled "METHOD, APPARATUS, AND SYSTEM FOR IMPROVING TOPOLOGY OF WIRELESS SENSING SYSTEMS", filed on Jul. 12, 2019,
(q) U.S. Provisional Patent application 62/900,565, entitled "QUALIFIED WIRELESS SENSING SYSTEM", filed on Sep. 15, 2019,
(r) U.S. Provisional Patent application 62/902,357, entitled "METHOD, APPARATUS, AND SYSTEM FOR AUTOMATIC AND OPTIMIZED DEVICE-TO-CLOUD CONNECTION FOR WIRELESS SENSING", filed on Sep. 18, 2019.

TECHNICAL FIELD

The present teaching generally relates to wireless proximity and presence monitoring. More specifically, the present teaching relates to monitoring the presence of a live object and potential motion of the object based on wireless channel information in a rich-scattering environment.

BACKGROUND

In the era of Internet of Things (IoT), smart appliances are designed and developed to achieve customer satisfaction and convenience and the market for smart appliances is primed. For instance, a Smart TV can deliver an innovative TV usage pattern. An existing method to control a TV at home would include either pressing a button on a conventional remote controller or an image processing technology to identify a user. Pressing a button is often inconvenient to a user holding something in hands. Videos or images taken from a camera to perform human identification would have a risk of potential privacy leakage. As such, existing techniques related to a smart appliance are not entirely satisfactory.

SUMMARY

The present teaching generally relates wireless proximity and presence monitoring. More specifically, the present teaching relates to monitoring the presence of a live object and potential motion of the object based on time-reversal technology in a rich-scattering environment, e.g. an indoor environment or urban metropolitan area, enclosed environment, underground environment, etc. Instead of using the conventional remote controller to control a TV at home, with the help of wireless sensing, a Smart TV disclosed herein can be automatically turned on/off, paused and/or resumed by detecting certain motion patterns in front of the TV and by sensing the presence of a human in a certain area, e.g., the living room.

In one embodiment, an apparatus in a venue for wireless proximity monitoring is described. The apparatus comprises: a transmitter, a receiver, and a processor. The transmitter is configured for transmitting a wireless signal through a wireless multipath channel, wherein the wireless multipath channel is impacted by a motion of an object within a proximity of the apparatus. The receiver is configured for: receiving the wireless signal through the wireless multipath channel between the transmitter and the receiver, and obtaining a time series of channel information (TSCI) of the wireless multipath channel based on the wireless signal received by the receiver. The processor is coupled to the receiver and configured for monitoring the motion of the object within the proximity of the apparatus based at least partially on the TSCI.

In one embodiment, the motion of the object is monitored by determining at least one of: a characteristics of the motion, a behavior of the object, a location of the object, a duration of the motion, a timing of the motion, an intensity of the motion, a distance of the motion, a speed of the motion, an acceleration of the motion, a repeated pattern of the motion, a periodic characteristics of the motion, a transient characteristics of the motion, an activity of the object, a regular activity of the object, a daily activity of the object, a weekly activity of the object, a monthly activity of the object, a yearly activity of the object, a change of the object, a change of the motion, a change of intensity of the motion, a change of a duration of the motion, an impulsive change of the motion, a change of the motion, a change in behavior of the object, a change in transient characteristics of the motion, a change in periodic characteristics of the motion, an event associated with the object, a fall-down event of the object, an appearance of the object, a disappearance of the object, a behavior of the object, a gesture of the object, a gait of the object, a security-related event, at least one companion of the object, an information of the at least one companion, and a quantity of the object comprising an identity, a count, a class, a group, an age, a location, a time, a timing, a duration, a body condition, a vital sign, a breathing rate, a heart rate, a sleep quality, a sleep measure, an activity level, an activity measure, a physical state, an emotional state, a mental state, an anxiety, a calmness, a restlessness, a walking distance, a daily step count, a behavior, a fight, a presence, an absence, an appearance, a disappearance, an approaching, a receding, a pacing back and forth, a pacing from one end to another, a pacing from one point to another, a trend, a daily activity, a repeated activity, a normal activity, a deviation from normal activity, a sign of sickness, a sign of danger, a sign of need, an emotion, an expression, a facial expression, a body language, a gesture, a gait, a sign, a body motion, a head motion, a shoulder motion, a limb motion, a hand motion, a finger motion, a handwriting, a brush stroke, a keystroke, a symptom, and another quantity of the object.

In another embodiment, a described apparatus is in a venue where a transmitter and a receiver are located. The described apparatus comprises: a processor and at least one of the transmitter and the receiver. The transmitter is configured for transmitting a wireless signal through a wireless multipath channel that is impacted by a motion of an object within a proximity of the apparatus. The receiver is configured for: receiving the wireless signal through the wireless multipath channel between the transmitter and the receiver, and obtaining a time series of channel information (TSCI) of the wireless multipath channel based on the wireless signal received by the receiver. The processor is configured for: monitoring the motion of the object within the proximity of the apparatus based at least partially on the TSCI, and controlling the apparatus based on the monitored motion of the object within the proximity of the apparatus.

The motion of the object is monitored by determining at least one of: a characteristics of the motion, a behavior of the object, a location of the object, a duration of the motion, a timing of the motion, an intensity of the motion, a distance of the motion, a speed of the motion, an acceleration of the motion, a repeated pattern of the motion, a periodic characteristics of the motion, a transient characteristics of the motion, an activity of the object, a regular activity of the object, a daily activity of the object, a weekly activity of the object, a monthly activity of the object, a yearly activity of the object, a change of the object, a change of the motion, a change of intensity of the motion, a change of a duration of the motion, an impulsive change of the motion, a change in behavior of the object, a change in transient characteristics of the motion, a change in periodic characteristics of the motion, an event associated with the object, a fall-down event of the object, an appearance of the object, a disappearance of the object, a behavior of the object, a gesture of the object, a gait of the object, a security-related event, at least one companion of the object, an information of the at least one companion, and a quantity of the object comprising an identity, a count, a class, a group, an age, a location, a time, a timing, a duration, a body condition, a vital sign, a breathing rate, a heart rate, a sleep quality, a sleep measure, an activity level, an activity measure, a physical state, an emotional state, a mental state, an anxiety, a calmness, a restlessness, a walking distance, a daily step count, a behavior, a fight, a presence, an absence, an appearance, a disappearance, an approaching, a receding, a pacing back and forth, a pacing from one end to another, a pacing from one point to another, a trend, a daily activity, a repeated activity, a normal activity, a deviation from normal activity, a sign of sickness, a sign of danger, a sign of need, an emotion, an expression, a facial expression, a body language, a gesture, a gait, a sign, a body motion, a head motion, a shoulder motion, a limb motion, a hand motion, a finger motion, a handwriting, a brush stroke, a keystroke, a symptom, and another quantity of the object.

In one embodiment, the apparatus includes the receiver but not the transmitter. The receiver receives the wireless signal and extracts the TSCI, e.g. a channel state information (CSI), for performing the proximity detection.

In another embodiment, the apparatus includes the transmitter but not the receiver. The CSI is extracted by the receiver; and the proximity detection is performed at the receiver instead of the apparatus. The apparatus plays the role of sending the wireless signal.

In yet another embodiment, the apparatus includes a transmitter which broadcasts the wireless signal to multiple receivers. Each receiver extracts the CSI and performs individual proximity detection or computes motion statistics. All receivers send their proximity detection results or motion statistics to the transmitter on the apparatus that combines the detection results or motion statistics to do a joint proximity detection. The transmissions of detection results or motion statistics do not consume much bandwidth.

In still another embodiment, the apparatus includes the transmitter but not the receiver. The CSI is extracted at the receiver that sends the CSI to the transmitter. The proximity detection is performed at the transmitter.

In a different embodiment, a method, implemented by a processor, a memory communicatively coupled with the processor, and a set of instructions stored in the memory to be executed by the processor, is described. The method comprises: obtaining a radio-frequency (RF) channel information (CI) from at least one RF sensor placed near an apparatus in a venue, wherein: a first RF sensor sends a RF signal to a second RF sensor through a RF channel impacted by a motion of an object in a neighboring region of the apparatus, and the second RF sensor receives the RF signal and computes the RF CI of the RF channel based on the received RF signal; monitoring the motion of the object in the neighboring region of the apparatus based on the RF CI; and performing an action associated with the apparatus in response to a condition being detected based on at least one of: the RF CI and the motion of the object.

Other concepts relate to software for implementing the present teaching on wireless proximity and presence monitoring based on time-reversal technology in a rich-scattering environment. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of exemplary embodiments. These exemplary embodiments are described in detail with reference to the drawings. These embodiments are non-limiting exemplary embodiments, in which like reference numerals represent similar structures throughout the several views of the drawings.

DETAILED DESCRIPTION

Figure 1:
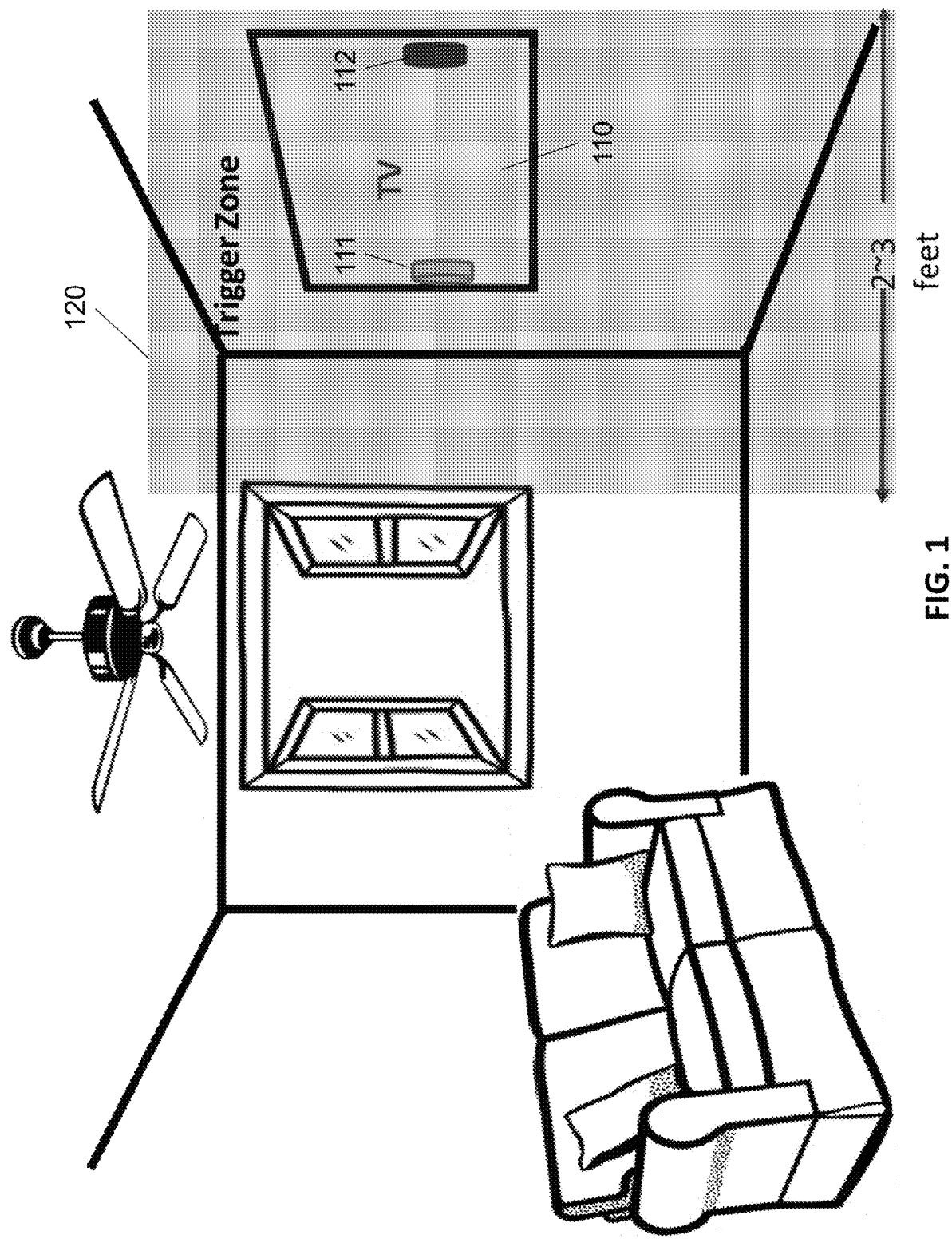
FIG. 1 illustrates an exemplary demonstration of a Smart TV use case, according to some embodiments of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

In one embodiment, the present teaching discloses a method, apparatus, device, system, and/or software (method/apparatus/device/system/software) of a wireless monitoring system. A time series of channel information (CI) of a wireless multipath channel (channel) may be obtained using a processor, a memory communicatively coupled with the processor and a set of instructions stored in the memory. The time series of CI (TSCI) may be extracted from a wireless signal (signal) transmitted between a Type 1 heterogeneous wireless device (Type 1 device, or TX device) and a Type 2 heterogeneous wireless device (Type 2 device, or RX device) in a venue through the channel. The channel may be impacted by a motion (or movement or a change/variation in position/location) of an object in the venue. A characteristics and/or a spatial-temporal information (e.g. motion information) of the object and/or of the motion of an object may be monitored based on the TSCI. A task may be performed based on the characteristics and/or the spatial-temporal information (e.g. motion information). A presentation associated with the task may be generated in a user-interface (UI) on a device of a user. The TSCI may be preprocessed.

The wireless signal may comprise: transmitted signal, received signal of the transmitted wireless signal, time series of probe signals, RF signal, RF transmission, baseband signal, downlink signal, uplink signal, broadcast signal, bandlimited signal, standard compliant signal, wireless standard compliant signal, protocol signal, wireless communication network signal, cellular network signal, WiFi signal, LTE/5G/6G/7G signal, beacon signal, beacon wireless signal, reference signal, source signal, wireless source signal, motion probes, motion detection signal, motion sensing signal and/or synchronization signal.

The wireless multipath channel may comprise: a channel of wireless communication network (e.g. WLAN, WiFi, wireless mesh network), cellular communication network (e.g. LTE/5G), ultra-wideband (UWB) network, microwave network, a frequency channel (e.g. in WiFi/LTE/5G), a coded channel (e.g. in CDMA), and/or another system. It may comprise more than one "consecutive" channels (perhaps heterogeneous, e.g. a WiFi channel and a UWB channel) whose frequency bands overlap. It may also comprise more than one non-consecutive channels (e.g. a WiFi channel at 2.4 GHz and a WiFi channel at 5 GHz) whose frequency bands are disjoint (i.e. do not overlap).

The Type 1 device may comprise: transmitter, RF interface, RF transmitter subsystem, TX device, transceiver, "Origin Satellite", broadcasting device, source device, hub device, wireless device, wireless source device, wireless communication device, and/or receiver. The Type 1 device or the TX device may have one or more radio, e.g. a 2.4 GHz radio, a 5 GHz radio, a front haul radio, a backhaul radio. It may be a mesh router. The Type 1 device may comprise a modem. The Type 1 device may comprise RF front end and/or RF/radio chip to send the wireless signal. The Type 1 device may transmit the wireless signal to the Type 2 device and communicate wireless (and/or cellular) network traffic in another channel in parallel. The Type 1 device may be a wireless (and/or cellular) access point (WAP) device.

The Type 2 device may comprise: receiver, RF interface, RF receiver subsystem, RX device, transceiver, "Tracker Bot", receiver of broadcasting service (e.g. of the Type 1 device), sensor device, remote sensor device, wireless sensor device, wireless communication device, destination device, hub device, target device, motion detection device, and/or transmitter. The Type 2 device may comprise RF front end and/or RF/radio chip to receive the wireless signal. The Type 2 device may passively observe/monitoring the wireless signal (and/or wireless/cellular communication network signals, wireless/cellular signals exchanged, etc.) from the Type 1 device without establishing connection with or requesting service from the Type 1 device (and/or the wireless communication network). In an example, the Type 1 device may be communicating with another wireless device(s) (e.g. in the venue). The Type 1 device may send/communicate the wireless signal (and/or wireless/cellular communication network signals, wireless/cellular signals exchanged, etc.) during communication with the another device(s), and the Type 2 device may monitor the communication (and/or wireless/cellular communication network signals, wireless/cellular signals exchanged, etc.) passively to obtain TSCI of the channel between the Type 1 device and the Type 2 device. The Type 2 device may obtain/store/retrieve/access/preprocess/condition/process/analyze/monitor/apply the TSCI. The Type 2 device may comprise a modem. The Type 2 device may receive the wireless signal from the Type 1 device and communicate wireless (and/or cellular) network traffic in another channel in parallel. The Type 2 device may be a wireless (and/or cellular) access point (WAP) device.

The Type 1 device (e.g. TX device) may function as/play the role of Type 2 device (e.g. RX device) temporarily, sporadically, continuously, repeatedly, simultaneously, concurrently, and/or contemporaneously, and vice versa. A device may function as Type 1 device and/or a Type 2 device temporarily, sporadically, simultaneously, concurrently, and/or contemporaneously.

The task may be performed passively and/or actively. It may be passive because the user may not need to carry any wearables (i.e. the Type 1 device and the Type 2 device are not wearable devices that the user need to carry in order perform the task). It may be active because the user may carry a device (e.g. the Type 1 device, the Type 2 device, a device communicatively coupled with either the Type 1 device or the Type 2 device). The presentation may be visual, audio, image, video, animation, graphical presentation, text, etc. A computation of the task may be performed by a processor of the Type 1 device, a processor of an IC of the Type 1 device, a processor of the Type 2 device, a processor of an IC of the Type 2 device, a local server, a cloud server, a data analysis subsystem, a signal analysis subsystem, and/or another processor.

The TSCI may be extracted from a derived signal (e.g. baseband signal, motion detection signal, motion sensing signal) derived from the wireless signal (e.g. RF signal). The derived signal may comprise a packet with a header and a payload. The probe signal may reside in the header and/or the payload. The motion detection signal and/or motion sensing signal may be recognized/identified base on the header. The packet may comprise a control data and/or a motion detection probe. A data (e.g. ID/parameters/characteristics/settings/control signal/command/instruction/notification/broadcasting-related information of the Type 1 device) may be obtained from the payload. The wireless signal may be transmitted by the Type 1 device. It may be received by the Type 2 device. A database (e.g. in local server, hub device, cloud server, storage network, etc.) may be used to store the TSCI, characteristics, spatial-temporal information, signatures, patterns, behaviors, trends, parameters, analytics, identification information, user information, device information, channel information, venue (e.g. map, network, proximity devices/networks) information, task information, class/category information, presentation (e.g. UI) information, and/or other information.

The Type 1 device (TX device) may comprise at least one heterogeneous wireless transmitter. The Type 2 device (RX device) may comprise at least one heterogeneous wireless receiver. The Type 1 device and the Type 2 device may be the same device. Any device may have a data processing unit/apparatus, a computing unit/system, a network unit/system, a processor, a memory communicatively coupled with the processor, and a set of instructions stored in the memory to be executed by the processor. Some processors, memories and sets of instructions may be coordinated.

There may be multiple Type 1 devices interacting with the same Type 2 device (or multiple Type 2 devices), and/or there may be multiple Type 2 devices interacting with the same Type 1 device. The multiple Type 1 devices/Type 2 devices may be synchronized and/or asynchronous, with same/different window width/size and/or time shift, same/different synchronized start time, synchronized end time, etc. Wireless signals sent by the multiple Type 1 devices may be sporadic, temporary, continuous, repeated, synchronous, simultaneous, concurrent, and/or contemporaneous. The multiple Type 1 devices/Type 2 devices may operate independently and/or collaboratively. A Type 1 and/or Type 2 device may have/comprise/be heterogeneous hardware circuitry (e.g. a heterogeneous chip or a heterogeneous IC capable of generating/receiving the wireless signal, extracting CI from received signal, or making the CI available). They may be communicatively coupled to same or different servers (e.g. cloud server, edge server, local server, hub device).

Operation of one device may be based on operation, state, internal state, storage, processor, memory output, physical location, computing resources, network of another device. Difference devices may communicate directly, and/or via another device/server/hub device/cloud server. The devices may be associated with one or more users, with associated settings. The settings may be chosen once, pre-programmed, and/or changed (e.g. adjusted, varied, modified)/varied over time. There may be additional steps in the method. The steps and/or the additional steps of the method may be performed in the order shown or in another order. Any steps may be performed in parallel, iterated, or otherwise repeated or performed in another manner. A user may be human, adult, older adult, man, woman, juvenile, child, baby, pet, animal, creature, machine, computer module/software, etc.

In the case of one or multiple Type 1 devices interacting with one or multiple Type 2 devices, any processing (e.g. time domain, frequency domain) may be different for different devices. The processing may be based on locations, orientation, direction, roles, user-related characteristics, settings, configurations, available resources, available bandwidth, network connection, hardware, software, processor, co-processor, memory, battery life, available power, antennas, antenna types, directional/unidirectional characteristics of the antenna, power setting, and/or other parameters/characteristics of the devices.

The wireless receiver (e.g. Type 2 device) may receive the signal and/or another signal from the wireless transmitter (e.g. Type 1 device). The wireless receiver may receive another signal from another wireless transmitter (e.g. a second Type 1 device). The wireless transmitter may transmit the signal and/or another signal to another wireless receiver (e.g. a second Type 2 device). The wireless transmitter, wireless receiver, another wireless receiver and/or another wireless transmitter may be moving with the object and/or another object. The another object may be tracked.

The Type 1 and/or Type 2 device may be capable of wirelessly coupling with at least two Type 2 and/or Type 1 devices. The Type 1 device may be caused/controlled to switch/establish wireless coupling from the Type 2 device to a second Type 2 device at another location in the venue. Similarly, the Type 2 device may be caused/controlled to switch/establish wireless coupling from the Type 1 device to a second Type 1 device at yet another location in the venue. The switching may be controlled by a server (or a hub device), the processor, the Type 1 device, the Type 2 device, and/or another device. The radio used before and after switching may be different. A second wireless signal (second signal) may be caused to be transmitted between the Type 1 device and the second Type 2 device (or between the Type 2 device and the second Type 1 device) through the channel. A second TSCI of the channel extracted from the second signal may be obtained. The second signal may be the first signal. The characteristics, spatial-temporal information and/or another quantity of the object may be monitored based on the second TSCI. The Type 1 device and the Type 2 device may be the same. The characteristics, spatial-temporal information and/or another quantity with different time stamps may form a waveform. The waveform may be displayed in the presentation.

The wireless signal and/or another signal may have data embedded. The wireless signal may be a series of probe signals (e.g. a repeated transmission of probe signals). The probe signals may change/vary over time. A probe signal may be a standard compliant signal, protocol signal, control signal, data signal, wireless communication network signal, cellular network signal, WiFi signal, LTE/5G/6G/7G signal, reference signal, beacon signal, motion detection signal, and/or motion sensing signal. A probe signal may be formatted according to a wireless network standard (e.g. WiFi), a cellular network standard (e.g. LTE/5G/6G), or another standard. A probe signal may comprise a packet with a header and a payload. A probe signal may have data embedded. The payload may comprise data. A probe signal may be replaced by a data signal. The probe signal may be embedded in a data signal. The wireless receiver, wireless transmitter, another wireless receiver and/or another wireless transmitter may be associated with at least one processor, memory communicatively coupled with respective processor, and/or respective set of instructions stored in the memory which when executed cause the processor to perform any and/or all steps needed to determine the spatial-temporal information (e.g. motion information), initial spatial-temporal information, initial time, direction, instantaneous location, instantaneous angle, and/or speed, of the object.

The processor, the memory and/or the set of instructions may be associated with the Type 1 heterogeneous wireless transceiver, one of the at least one Type 2 heterogeneous wireless transceiver, the object, a device associated with the object, another device associated with the venue, a cloud server, a hub device, and/or another server.

The Type 1 device may transmit the signal in a broadcasting manner to at least one Type 2 device(s) through the channel in the venue. The signal is transmitted without the Type 1 device establishing wireless connection (connection) with any Type 2 device, and without any Type 2 device requesting services from the Type 1 device.

The Type 1 device may transmit to a particular media access control (MAC) address common for more than one Type 2 devices. Each Type 2 device may adjust its MAC address to the particular MAC address.

The particular MAC address may be associated with the venue. The association may be recorded in an association table of an Association Server (e.g. hub device). The venue may be identified by the Type 1 device, a Type 2 device and/or another device based on the particular MAC address, the series of probe signals, and/or the at least one TSCI extracted from the probe signals.

For example, a Type 2 device may be moved to a new location in the venue (e.g. from another venue). The Type 1 device may be newly set up in the venue such that the Type 1 and Type 2 devices are not aware of each other. During set up, the Type 1 device may be instructed/guided/caused/controlled (e.g. using dummy receiver, using hardware pin setting/connection, using stored setting, using local setting, using remote setting, using downloaded setting, using hub device, or using server) to send the series of probe signals to the particular MAC address. Upon power up, the Type 2 device may scan for probe signals according to a table of MAC addresses (e.g. stored in a designated source, server, hub device, cloud server) that may be used for broadcasting at different locations (e.g. different MAC address used for different venue such as house, office, enclosure, floor, multi-storey building, store, airport, mall, stadium, hall, station, subway, lot, area, zone, region, district, city, country, continent). When the Type 2 device detects the probe signals sent to the particular MAC address, the Type 2 device can use the table to identify the venue based on the MAC address.

A location of a Type 2 device in the venue may be computed based on the particular MAC address, the series of probe signals, and/or the at least one TSCI obtained by the Type 2 device from the probe signals. The computing may be performed by the Type 2 device.

The particular MAC address may be changed (e.g. adjusted, varied, modified) over time. It may be changed according to a time table, rule, policy, mode, condition, situation and/or change. The particular MAC address may be selected based on availability of the MAC address, a pre-selected list, collision pattern, traffic pattern, data traffic between the Type 1 device and another device, effective bandwidth, random selection, and/or a MAC address switching plan. The particular MAC address may be the MAC address of a second wireless device (e.g. a dummy receiver, or a receiver that serves as a dummy receiver).

The Type 1 device may transmit the probe signals in a channel selected from a set of channels. At least one CI of the selected channel may be obtained by a respective Type 2 device from the probe signal transmitted in the selected channel.

The selected channel may be changed (e.g. adjusted, varied, modified) over time. The change may be according to a time table, rule, policy, mode, condition, situation, and/or change. The selected channel may be selected based on availability of channels, random selection, a pre-selected list, co-channel interference, inter-channel interference, channel traffic pattern, data traffic between the Type 1 device and another device, effective bandwidth associated with channels, security criterion, channel switching plan, a criterion, a quality criterion, a signal quality condition, and/or consideration.

The particular MAC address and/or an information of the selected channel may be communicated between the Type 1 device and a server (e.g. hub device) through a network. The particular MAC address and/or the information of the selected channel may also be communicated between a Type 2 device and a server (e.g. hub device) through another network. The Type 2 device may communicate the particular MAC address and/or the information of the selected channel to another Type 2 device (e.g. via mesh network, Bluetooth, WiFi, NFC, ZigBee, etc.). The particular MAC address and/or selected channel may be chosen by a server (e.g. hub device). The particular MAC address and/or selected channel may be signaled in an announcement channel by the Type 1 device, the Type 2 device and/or a server (e.g. hub device). Before being communicated, any information may be pre-processed.

Wireless connection between the Type 1 device and another wireless device may be established (e.g. using a signal handshake). The Type 1 device may send a first handshake signal (e.g. sounding frame, probe signal, request-to-send RTS) to the another device. The another device may reply by sending a second handshake signal (e.g. a command, or a clear-to-send CTS) to the Type 1 device, triggering the Type 1 device to transmit the signal (e.g. series of probe signals) in the broadcasting manner to multiple Type 2 devices without establishing connection with any Type 2 device. The second handshake signals may be a response or an acknowledge (e.g. ACK) to the first handshake signal. The second handshake signal may contain a data with information of the venue, and/or the Type 1 device.

The another device may be a dummy device with a purpose (e.g. primary purpose, secondary purpose) to establish the wireless connection with the Type 1 device, to receive the first signal, and/or to send the second signal. The another device may be physically attached to the Type 1 device.

In another example, the another device may send a third handshake signal to the Type 1 device triggering the Type 1 device to broadcast the signal (e.g. series of probe signals) to multiple Type 2 devices without establishing connection with any Type 2 device. The Type 1 device may reply to the third special signal by transmitting a fourth handshake signal to the another device.

The another device may be used to trigger more than one Type 1 devices to broadcast. The triggering may be sequential, partially sequential, partially parallel, or fully parallel. The another device may have more than one wireless circuitries to trigger multiple transmitters in parallel. Parallel trigger may also be achieved using at least one yet another device to perform the triggering (similar to what as the another device does) in parallel to the another device.

The another device may not communicate (or suspend communication) with the Type 1 device after establishing connection with the Type 1 device. Suspended communication may be resumed. The another device may enter an inactive mode, hibernation mode, sleep mode, stand-by mode, low-power mode, OFF mode and/or power-down mode, after establishing the connection with the Type 1 device.

The another device may have the particular MAC address so that the Type 1 device sends the signal to the particular MAC address. The Type 1 device and/or the another device may be controlled and/or coordinated by a first processor associated with the Type 1 device, a second processor associated with the another device, a third processor associated with a designated source and/or a fourth processor associated with another device. The first and second processors may coordinate with each other.

A first series of probe signals may be transmitted by a first antenna of the Type 1 device to at least one first Type 2 device through a first channel in a first venue. A second series of probe signals may be transmitted by a second antenna of the Type 1 device to at least one second Type 2 device through a second channel in a second venue. The first series and the second series may/may not be different. The at least one first Type 2 device may/may not be different from the at least one second Type 2 device. The first and/or second series of probe signals may be broadcasted without connection established between the Type 1 device and any Type 2 device. The first and second antennas may be same/different.

The two venues may have different sizes, shape, multipath characteristics. The first and second venues may overlap. The respective immediate areas around the first and second antennas may overlap. The first and second channels may be same/different. For example, the first one may be WiFi while the second may be LTE. Or, both may be WiFi, but the first one may be 2.4 GHz WiFi and the second may be 5 GHz WiFi. Or, both may be 2.4 GHz WiFi, but have different channel numbers, SSID names, and/or WiFi settings.

Each Type 2 device may obtain at least one TSCI from the respective series of probe signals, the CI being of the respective channel between the Type 2 device and the Type 1 device.

Some first Type 2 device(s) and some second Type 2 device(s) may be the same. The first and second series of probe signals may be synchronous/asynchronous. A probe signal may be transmitted with data or replaced by a data signal. The first and second antennas may be the same.

The first series of probe signals may be transmitted at a first rate (e.g. 30 Hz). The second series of probe signals may be transmitted at a second rate (e.g. 200 Hz). The first and second rates may be same/different. The first and/or second rate may be changed (e.g. adjusted, varied, modified) over time. The change may be according to a time table, rule, policy, mode, condition, situation, and/or change. Any rate may be changed (e.g. adjusted, varied, modified) over time.

The first and/or second series of probe signals may be transmitted to a first MAC address and/or second MAC address respectively. The two MAC addresses may be same/different. The first series of probe signals may be transmitted in a first channel. The second series of probe signals may be transmitted in a second channel. The two channels may be same/different. The first or second MAC address, first or second channel may be changed over time. Any change may be according to a time table, rule, policy, mode, condition, situation, and/or change.

The Type 1 device and another device may be controlled and/or coordinated, physically attached, or may be of/in/of a common device. They may be controlled by/connected to a common data processor, or may be connected to a common bus interconnect/network/LAN/Bluetooth network/NFC network/BLE network/wired network/wireless network/mesh network/mobile network/cloud. They may share a common memory, or be associated with a common user, user device, profile, account, identity (ID), identifier, household, house, physical address, location, geographic coordinate, IP subnet, SSID, home device, office device, and/or manufacturing device.

Each Type 1 device may be a signal source of a set of respective Type 2 devices (i.e. it sends a respective signal (e.g. respective series of probe signals) to the set of respective Type 2 devices). Each respective Type 2 device chooses the Type 1 device from among all Type 1 devices as its signal source. Each Type 2 device may choose asynchronously. At least one TSCI may be obtained by each respective Type 2 device from the respective series of probe signals from the Type 1 device, the CI being of the channel between the Type 2 device and the Type 1 device.

The respective Type 2 device chooses the Type 1 device from among all Type 1 devices as its signal source based on identity (ID) or identifier of Type 1/Type 2 device, task to be performed, past signal source, history (e.g. of past signal source, Type 1 device, another Type 1 device, respective Type 2 receiver, and/or another Type 2 receiver), threshold for switching signal source, and/or information of a user, account, access info, parameter, characteristics, and/or signal strength (e.g. associated with the Type 1 device and/or the respective Type 2 receiver).

Initially, the Type 1 device may be signal source of a set of initial respective Type 2 devices (i.e. the Type 1 device sends a respective signal (series of probe signals) to the set of initial respective Type 2 devices) at an initial time. Each initial respective Type 2 device chooses the Type 1 device from among all Type 1 devices as its signal source.

The signal source (Type 1 device) of a particular Type 2 device may be changed (e.g. adjusted, varied, modified) when (1) time interval between two adjacent probe signals (e.g. between current probe signal and immediate past probe signal, or between next probe signal and current probe signal) received from current signal source of the Type 2 device exceeds a first threshold; (2) signal strength associated with current signal source of the Type 2 device is below a second threshold; (3) a processed signal strength associated with current signal source of the Type 2 device is below a third threshold, the signal strength processed with low pass filter, band pass filter, median filter, moving average filter, weighted averaging filter, linear filter and/or non-linear filter; and/or (4) signal strength (or processed signal strength) associated with current signal source of the Type 2 device is below a fourth threshold for a significant percentage of a recent time window (e.g. 70%, 80%, 90%, etc.). The percentage may exceed a fifth threshold. The first, second, third, fourth and/or fifth thresholds may be time varying.

Condition (1) may occur when the Type 1 device and the Type 2 device become progressively far away from each other, such that some probe signal from the Type 1 device becomes too weak and is not received by the Type 2 device. Conditions (2)-(4) may occur when the two devices become far from each other such that the signal strength becomes very weak.

The signal source of the Type 2 device may not change if other Type 1 devices have signal strength weaker than a factor (e.g. 1, 1.1, 1.2, or 1.5, etc.) of the current signal source.

If the signal source is changed (e.g. adjusted, varied, modified), the new signal source may take effect at a near future time (e.g. the respective next time). The new signal source may be the Type 1 device with strongest signal strength, and/or processed signal strength. The current and new signal source may be same/different.

A list of available Type 1 devices may be initialized and maintained by each Type 2 device. The list may be updated by examining signal strength and/or processed signal strength associated with the respective set of Type 1 devices.

A Type 2 device may choose between a first series of probe signals from a first Type 1 device and a second series of probe signals from a second Type 1 device based on: respective probe signal rate, MAC addresses, channels, characteristics/properties/states, task to be performed by the Type 2 device, signal strength of first and second series, and/or another consideration.

The series of probe signals may be transmitted at a regular rate (e.g. 100 Hz). The series of probe signals may be scheduled at a regular interval (e.g. 0.01 s for 100 Hz), but each probe signal may experience small time perturbation, perhaps due to timing requirement, timing control, network control, handshaking, message passing, collision avoidance, carrier sensing, congestion, availability of resources, and/or another consideration.

The rate may be changed (e.g. adjusted, varied, modified). The change may be according to a time table (e.g. changed once every hour), rule, policy, mode, condition and/or change (e.g. changed whenever some event occur). For example, the rate may normally be 100 Hz, but changed to 1000 Hz in demanding situations, and to 1 Hz in low power/standby situation. The probe signals may be sent in burst.

The probe signal rate may change based on a task performed by the Type 1 device or Type 2 device (e.g. a task may need 100 Hz normally and 1000 Hz momentarily for 20 seconds). In one example, the transmitters (Type 1 devices), receivers (Type 2 device), and associated tasks may be associated adaptively (and/or dynamically) to classes (e.g. classes that are: low-priority, high-priority, emergency, critical, regular, privileged, non-subscription, subscription, paying, and/or non-paying). A rate (of a transmitter) may be adjusted for the sake of some class (e.g. high priority class). When the need of that class changes, the rate may be changed (e.g. adjusted, varied, modified). When a receiver has critically low power, the rate may be reduced to reduce power consumption of the receiver to respond to the probe signals.

In one example, probe signals may be used to transfer power wirelessly to a receiver (Type 2 device), and the rate may be adjusted to control the amount of power transferred to the receiver.

The rate may be changed by (or based on): a server (e.g. hub device), the Type 1 device and/or the Type 2 device. Control signals may be communicated between them. The server may monitor, track, forecast and/or anticipate the needs of the Type 2 device and/or the tasks performed by the Type 2 device, and may control the Type 1 device to change the rate. The server may make scheduled changes to the rate according to a time table. The server may detect an emergency situation and change the rate immediately. The server may detect a developing condition and adjust the rate gradually.

The characteristics and/or spatial-temporal information (e.g. motion information) may be monitored individually based on a TSCI associated with a particular Type 1 device and a particular Type 2 device, and/or monitored jointly based on any TSCI associated with the particular Type 1 device and any Type 2 device, and/or monitored jointly based on any TSCI associated with the particular Type 2 device and any Type 1 device, and/or monitored globally based on any TSCI associated with any Type 1 device and any Type 2 device. Any joint monitoring may be associated with: a user, user account, profile, household, map of venue, and/or user history, etc.

A first channel between a Type 1 device and a Type 2 device may be different from a second channel between another Type 1 device and another Type 2 device. The two channels may be associated with different frequency bands, bandwidth, carrier frequency, modulation, wireless standards, coding, encryption, payload characteristics, networks, network ID, SSID, network characteristics, network settings, and/or network parameters, etc.

The two channels may be associated with different kinds of wireless system (e.g. two of the following: WiFi, LTE, LTE-A, LTE-U, 2.5G, 3G, 3.5G, 4G, beyond 4G, 5G, 6G, 7G, a cellular network standard, UMTS, 3GPP, GSM, EDGE, TDMA, FDMA, CDMA, WCDMA, TD-SCDMA, 802.11 system, 802.15 system, 802.16 system, mesh network, Zigbee, NFC, WiMax, Bluetooth, BLE, RFID, UWB, microwave system, radar like system, etc.). For example, one is WiFi and the other is LTE.

The two channels may be associated with similar kinds of wireless system, but in different network. For example, the first channel may be associated with a WiFi network named "Pizza and Pizza" in the 2.4 GHz band with a bandwidth of 20 MHz while the second may be associated with a WiFi network with SSID of "StarBud hotspot" in the 5 GHz band with a bandwidth of 40 MHz. The two channels may be different channels in same network (e.g. the "StarBud hotspot" network).

In one embodiment, a wireless monitoring system may comprise training a classifier of multiple events in a venue based on training TSCI associated with the multiple events.

For each of the multiple known events happening in the venue in a respective training time period associated with the known event, a respective training wireless signal (e.g. a respective series of training probe signals) may be transmitted by an antenna of a first Type 1 heterogeneous wireless device using a processor, a memory and a set of instructions of the first Type 1 device to at least one first Type 2 heterogeneous wireless device through a wireless multipath channel in the venue in the respective training time period.

At least one respective time series of training CI (training TSCI) may be obtained asynchronously by each of the at least one first Type 2 device from the (respective) training signal. The CI may be CI of the channel between the first Type 2 device and the first Type 1 device in the training time period associated with the known event. The at least one training TSCI may be preprocessed.

For a current event happening in the venue in a current time period, a current wireless signal (e.g. a series of current probe signals) may be transmitted by an antenna of a second Type 1 heterogeneous wireless device using a processor, a memory and a set of instructions of the second Type 1 device to at least one second Type 2 heterogeneous wireless device through the channel in the venue in the current time period associated with the current event.

At least one time series of current CI (current TSCI) may be obtained asynchronously by each of the at least one second Type 2 device from the current signal (e.g. the series of current probe signals). The CI may be CI of the channel between the second Type 2 device and the second Type 1 device in the current time period associated with the current event. The at least one current TSCI may be preprocessed.

The classifier may be applied to classify at least one current TSCI obtained from the series of current probe signals by the at least one second Type 2 device, to classify at least one portion of a particular current TSCI, and/or to classify a combination of the at least one portion of the particular current TSCI and another portion of another TSCI. The classifier may also be applied to associate the current event with a known event, a class/category/group/grouping/list/set of known events, an unknown event, a class/category/group/grouping/list/set of unknown events, and/or another event/class/category/group/grouping/list/set.

Each TSCI may comprise at least one CI each associated with a respective timestamp.

Two TSCI associated with two Type 2 devices may be different with different: starting time, duration, stopping time, amount of CI, sampling frequency, sampling period. Their CI may have different features.

The first and second Type 1 devices may be at same location in the venue. They may be the same device.

The at least one second Type 2 device (or their locations) may be a permutation of the at least one first Type 2 device (or their locations). A particular second Type 2 device and a particular first Type 2 device may be the same device.

A subset of the first Type 2 device and a subset of the second Type 2 device may be the same. The at least one second Type 2 device and/or a subset of the at least one second Type 2 device may be a subset of the at least one first Type 2 device.

The at least one first Type 2 device and/or a subset of the at least one first Type 2 device may be a permutation of a subset of the at least one second Type 2 device. The at least one second Type 2 device and/or a subset of the at least one second Type 2 device may be a permutation of a subset of the at least one first Type 2 device.

The at least one second Type 2 device and/or a subset of the at least one second Type 2 device may be at same respective location as a subset of the at least one first Type 2 device. The at least one first Type 2 device and/or a subset of the at least one first Type 2 device may be at same respective location as a subset of the at least one second Type 2 device.

The antenna of the Type 1 device and the antenna of the second Type 1 device may be at same location in the venue. Antenna(s) of the at least one second Type 2 device and/or antenna(s) of a subset of the at least one second Type 2 device may be at same respective location as respective antenna(s) of a subset of the at least one first Type 2 device. Antenna(s) of the at least one first Type 2 device and/or antenna(s) of a subset of the at least one first Type 2 device may be at same respective location(s) as respective antenna(s) of a subset of the at least one second Type 2 device.

A first section of a first time duration of the first TSCI and a second section of a second time duration of the second section of the second TSCI may be aligned. A map between items of the first section and items of the second section may be computed.

The first section may comprise a first segment (e.g. subset) of the first TSCI with a first starting/ending time, and/or another segment (e.g. subset) of a processed first TSCI. The processed first TSCI may be the first TSCI processed by a first operation.

The second section may comprise a second segment (e.g. subset) of the second TSCI with a second starting time and a second ending time, and another segment (e.g. subset) of a processed second TSCI. The processed second TSCI may be the second TSCI processed by a second operation.

The first operation and/or the second operation may comprise: subsampling, re-sampling, interpolation, filtering, transformation, feature extraction, pre-processing, and/or another operation.

A first item of the first section may be mapped to a second item of the second section. The first item of the first section may also be mapped to another item of the second section. Another item of the first section may also be mapped to the second item of the second section. The mapping may be one-to-one, one-to-many, many-to-one, many-to-many.

At least one function of at least one of: the first item of the first section of the first TSCI, another item of the first TSCI, timestamp of the first item, time difference of the first item, time differential of the first item, neighboring timestamp of the first item, another timestamp associated with the first item, the second item of the second section of the second TSCI, another item of the second TSCI, timestamp of the second item, time difference of the second item, time differential of the second item, neighboring timestamp of the second item, and another timestamp associated with the second item, may satisfy at least one constraint.

One constraint may be that a difference between the timestamp of the first item and the timestamp of the second item may be upper-bounded by an adaptive (and/or dynamically adjusted) upper threshold and lower-bounded by an adaptive lower threshold.

The first section may be the entire first TSCI. The second section may be the entire second TSCI. The first time duration may be equal to the second time duration.

A section of a time duration of a TSCI may be determined adaptively (and/or dynamically). A tentative section of the TSCI may be computed. A starting time and an ending time of a section (e.g. the tentative section, the section) may be determined. The section may be determined by removing a beginning portion and an ending portion of the tentative section.

A beginning portion of a tentative section may be determined as follows. Iteratively, items of the tentative section with increasing timestamp may be considered as a current item, one item at a time.

In each iteration, at least one activity measure/index may be computed and/or considered. The at least one activity measure may be associated with at least one of: the current item associated with a current timestamp, past items of the tentative section with timestamps not larger than the current timestamp, and/or future items of the tentative section with timestamps not smaller than the current timestamp. The current item may be added to the beginning portion of the tentative section if at least one criterion (e.g. quality criterion, signal quality condition) associated with the at least one activity measure is satisfied.

The at least one criterion associated with the activity measure may comprise at least one of: (a) the activity measure is smaller than an adaptive (e.g. dynamically adjusted) upper threshold, (b) the activity measure is larger than an adaptive lower threshold, (c) the activity measure is smaller than an adaptive upper threshold consecutively for at least a predetermined amount of consecutive timestamps, (d) the activity measure is larger than an adaptive lower threshold consecutively for at least another predetermined amount of consecutive timestamps, (e) the activity measure is smaller than an adaptive upper threshold consecutively for at least a predetermined percentage of the predetermined amount of consecutive timestamps, (f) the activity measure is larger than an adaptive lower threshold consecutively for at least another predetermined percentage of the another predetermined amount of consecutive timestamps, (g) another activity measure associated with another timestamp associated with the current timestamp is smaller than another adaptive upper threshold and larger than another adaptive lower threshold, (h) at least one activity measure associated with at least one respective timestamp associated with the current timestamp is smaller than respective upper threshold and larger than respective lower threshold, (i) percentage of timestamps with associated activity measure smaller than respective upper threshold and larger than respective lower threshold in a set of timestamps associated with the current timestamp exceeds a threshold, and (j) another criterion (e.g. a quality criterion, signal quality condition).

An activity measure/index associated with an item at time $T1$ may comprise at least one of: (1) a first function of the item at time $T1$ and an item at time $T1-D1$, wherein $D1$ is a pre-determined positive quantity (e.g. a constant time offset), (2) a second function of the item at time $T1$ and an item at time $T1+D1$, (3) a third function of the item at time $T1$ and an item at time $T2$, wherein $T2$ is a pre-determined quantity (e.g. a fixed initial reference time; $T2$ may be changed (e.g. adjusted, varied, modified) over time; $T2$ may be updated periodically; $T2$ may be the beginning of a time period and $T1$ may be a sliding time in the time period), and (4) a fourth function of the item at time $T1$ and another item.

At least one of: the first function, the second function, the third function, and/or the fourth function may be a function (e.g. $F(X, Y, \ldots)$) with at least two arguments: X and Y.

The two arguments may be scalars. The function (e.g. F) may be a function of at least one of: X, Y, (X−Y), (Y−X), abs(X−Y), $X^a$, $Y^b$, abs($X^a-Y^b$), $(X-Y)^a$, (X/Y), (X+a)/(Y+b), ($X^a/Y^b$), and $((X/Y)^a-b)$, wherein a and b are may be some predetermined quantities. For example, the function may simply be abs(X−Y), or $(X-Y)^2$, $(X-Y)^4$. The function may be a robust function. For example, the function may be $(X-Y)^2$ when abs (X−Y) is less than a threshold T, and (X−Y)+a when abs(X−Y) is larger than T. Alternatively, the function may be a constant when abs(X−Y) is larger than T. The function may also be bounded by a slowly increasing function when abs(X−y) is larger than T, so that outliers cannot severely affect the result. Another example of the function may be (abs(X/Y)−a), where a=1. In this way, if X=Y (i.e. no change or no activity), the function will give a value of 0. If X is larger than Y, (X/Y) will be larger than 1 (assuming X and Y are positive) and the function will be positive. And if X is less than Y, (X/Y) will be smaller than 1 and the function will be negative.

In another example, both arguments X and Y may be n-tuples such that $X=(x\_1, x\_2, \ldots, x\_n)$ and $Y=(y\_1, y\_2, \ldots, y\_n)$. The function may be a function of at least one of: x_i, y_i, (x_i−y_i), (y_i−x_i), abs(x_i−y_i), $x\_i^a$, $y\_i^b$, abs($x\_i^a-y\_i^b$), $(x\_i-y\_i)^a$, (x_i/y_i), (x_i+a)/(y_i+b), ($x\_i^a/y\_i^b$), and $((x\_i/y\_i)^a-b)$, wherein i is a component index of the n-tuple X and Y, and 1<=i<=n. E.g. component index of x_1 is i=1, component index of x_2 is i=2.

The function may comprise a component-by-component summation of another function of at least one of the following: x_i, y_i, (x_i−y_i), (y_i−x_i), abs(x_i−y_i), $x\_i^a$, $y\_i^b$, abs($x\_i^a-y\_i^b$), $(x\_i-y\_i)^a$, (x_i/y_i), (x_i+a)/(y_i+b), ($x\_i^a/y\_i^b$), and $((x\_i/y\_i)^a-b)$, wherein i is the component index of the n-tuple X and Y. For example, the function may be in a form of $sum\_\{i=1\}^n (abs(x\_i/y\_i)-1)/n$, or $sum\_\{i=1\}^n w\_i*(abs(x\_i/y\_i)-1)$, where w_i is some weight for component i.

The map may be computed using dynamic time warping (DTW). The DTW may comprise a constraint on at least one of: the map, the items of the first TSCI, the items of the second TSCI, the first time duration, the second time duration, the first section, and/or the second section. Suppose in the map, the $i^{\{th\}}$ domain item is mapped to the $j^{\{th\}}$ range item. The constraint may be on admissible combination of i and j (constraint on relationship between i and j).

Mismatch cost between a first section of a first time duration of a first TSCI and a second section of a second time duration of a second TSCI may be computed.

The first section and the second section may be aligned such that a map comprising more than one links may be established between first items of the first TSCI and second items of the second TSCI. With each link, one of the first items with a first timestamp may be associated with one of the second items with a second timestamp.

A mismatch cost between the aligned first section and the aligned second section may be computed. The mismatch cost may comprise a function of: an item-wise cost between a first item and a second item associated by a particular link of the map, and a link-wise cost associated with the particular link of the map.

The aligned first section and the aligned second section may be represented respectively as a first vector and a second vector of same vector length. The mismatch cost may comprise at least one of: an inner product, inner-product-like quantity, quantity based on correlation, correlation indicator, quantity based on covariance, discriminating score, distance, Euclidean distance, absolute distance, Lk distance (e.g. L1, L2, . . . ), weighted distance, distance-like quantity and/or another similarity value, between the first vector and the second vector. The mismatch cost may be normalized by the respective vector length.

A parameter derived from the mismatch cost between the first section of the first time duration of the first TSCI and the second section of the second time duration of the second TSCI may be modeled with a statistical distribution. At least one of: a scale parameter, location parameter and/or another parameter, of the statistical distribution may be estimated.

The first section of the first time duration of the first TSCI may be a sliding section of the first TSCI. The second section of the second time duration of the second TSCI may be a sliding section of the second TSCI.

A first sliding window may be applied to the first TSCI and a corresponding second sliding window may be applied to the second TSCI. The first sliding window of the first TSCI and the corresponding second sliding window of the second TSCI may be aligned.

Mismatch cost between the aligned first sliding window of the first TSCI and the corresponding aligned second sliding window of the second TSCI may be computed. The current event may be associated with at least one of: the known event, the unknown event and/or the another event, based on the mismatch cost.

The classifier may be applied to at least one of: each first section of the first time duration of the first TSCI, and/or each second section of the second time duration of the second TSCI, to obtain at least one tentative classification results. Each tentative classification result may be associated with a respective first section and a respective second section.

The current event may be associated with at least one of: the known event, the unknown event, a class/category/group/grouping/list/set of unknown events, and/or the another event, based on the mismatch cost.

The current event may be associated with at least one of: the known event, the unknown event and/or the another event, based on a largest number of tentative classification results in more than one sections of the first TSCI and corresponding more than sections of the second TSCI. For example, the current event may be associated with a particular known event if the mismatch cost points to the particular known event for N consecutive times (e.g. N=10). In another example, the current event may be associated with a particular known event if the percentage of mismatch cost within the immediate past N consecutive N pointing to the particular known event exceeds a certain threshold (e.g. >80%).

In another example, the current event may be associated with a known event that achieve smallest mismatch cost for the most times within a time period. The current event may be associated with a known event that achieves smallest overall mismatch cost, which is a weighted average of at least one mismatch cost associated with the at least one first sections. The current event may be associated with a particular known event that achieves smallest of another overall cost.

The current event may be associated with the "unknown event" if none of the known events achieve mismatch cost lower than a first threshold T1 in a sufficient percentage of the at least one first section. The current event may also be associated with the "unknown event" if none of the events achieve an overall mismatch cost lower than a second threshold T2.

The current event may be associated with at least one of: the known event, the unknown event and/or the another event, based on the mismatch cost and additional mismatch cost associated with at least one additional section of the first TSCI and at least one additional section of the second TSCI.

The known events may comprise at least one of: a door closed event, door open event, window closed event, window open event, multi-state event, on-state event, off-state event, intermediate state event, continuous state event, discrete state event, human-present event, human-absent event, sign-of-life-present event, and/or a sign-of-life-absent event.

A projection for each CI may be trained using a dimension reduction method based on the training TSCI. The dimension reduction method may comprise at least one of: principal component analysis (PCA), PCA with different kernel, independent component analysis (ICA), Fisher linear discriminant, vector quantization, supervised learning, unsupervised learning, self-organizing maps, auto-encoder, neural network, deep neural network, and/or another method. The projection may be applied to at least one of: the training TSCI associated with the at least one events, and/or the current TSCI, for the classifier.

The classifier of the at least one event may be trained based on the projection and the training TSCI associated with the at least one event. The at least one current TSCI may be classified/categorized based on the projection and the current TSCI.

The projection may be re-trained using at least one of: the dimension reduction method, and another dimension reduction method, based on at least one of: the training TSCI, at least one current TSCI before retraining the projection, and/or additional training TSCI.

The another dimension reduction method may comprise at least one of: principal component analysis (PCA), PCA with different kernels, independent component analysis (ICA), Fisher linear discriminant, vector quantization, supervised learning, unsupervised learning, self-organizing maps, auto-encoder, neural network, deep neural network, and/or yet another method, The classifier of the at least one event may be re-trained based on at least one of: the re-trained projection, the training TSCI associated with the at least one events, and/or at least one current TSCI.

The at least one current TSCI may be classified based on: the re-trained projection, the re-trained classifier, and/or the current TSCI.

Each CI may comprise a vector of complex values. Each complex value may be preprocessed to give the magnitude of the complex value. Each CI may be preprocessed to give a vector of non-negative real numbers comprising the magnitude of corresponding complex values.

Each training TSCI may be weighted in the training of the projection.

The projection may comprise more than one projected components. The projection may comprise at least one most significant projected component. The projection may comprise at least one projected component that may be beneficial for the classifier.

Channel/Channel Information/Venue/Spatial-Temporal Info/Motion/Object

The channel information (CI) may be associated with/may comprise signal strength, signal amplitude, signal phase, spectral power measurement, modem parameters (e.g. used in relation to modulation/demodulation in digital communication systems such as WiFi, 4G/LTE, etc.), radio state (e.g. used in digital communication systems to decode digital data, baseband processing state, RF processing state, etc.), digital setting, gain setting, RF filter setting, RF front end switch setting, DC offset setting, DC correction setting, IQ compensation setting, received signal strength indicator (RSSI), channel state information (CSI), channel impulse response (CIR), channel frequency response (CFR), characteristics of frequency components (e.g. subcarriers) in a bandwidth, channel characteristics, channel filter response, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another channel information. Each CI may be associated with a time stamp, and/or an arrival time. A CSI can be used to equalize/undo/minimize/reduce the multipath channel effect (of the transmission channel) to demodulate a signal similar to the one transmitted by the transmitter through the multipath channel. The CI may be associated with information associated with a frequency band, frequency signature, frequency phase, frequency amplitude, frequency trend, frequency characteristics, frequency-like characteristics, time domain element, frequency domain element, time-frequency domain element, orthogonal decomposition characteristics, and/or non-orthogonal decomposition characteristics of the signal through the channel.

The CI may be preprocessed, processed, postprocessed, stored (e.g. in local memory, portable/mobile memory, removable memory, storage network, cloud memory, in a volatile manner, in a non-volatile manner), retrieved, transmitted and/or received. One or more modem parameters and/or radio state parameters may be held constant. The modem parameters may be applied to a radio subsystem. The modem parameters may represent a radio state. A motion detection signal (e.g. baseband signal, and/or packet decoded/demodulated from the baseband signal, etc.) may be obtained by processing (e.g. down-converting) the first wireless signal (e.g. RF/WiFi/LTE/5G signal) by the radio subsystem using the radio state represented by the stored modem parameters. The modem parameters/radio state may be updated (e.g. using previous modem parameters or previous radio state). Both the previous and updated modem parameters/radio states may be applied in the radio subsystem in the digital communication system. Both the previous and updated modem parameters/radio states may be compared/analyzed/processed/monitored in the task.

The channel information may also be modem parameters (e.g. stored or freshly computed) used to process the wireless signal. The wireless signal may comprise a plurality of probe signals. The same modem parameters may be used to process more than one probe signals. The same modem parameters may also be used to process more than one wireless signals. The modem parameters may comprise parameters that indicate settings or an overall configuration for the operation of a radio subsystem or a baseband subsystem of a wireless sensor device (or both). The modem parameters may include one or more of: a gain setting, an RF filter setting, an RF front end switch setting, a DC offset setting, or an IQ compensation setting for a radio subsystem, or a digital DC correction setting, a digital gain setting, and/or a digital filtering setting (e.g. for a baseband subsystem).

The CI may also be associated with information associated with a time period, time signature, timestamp, time amplitude, time phase, time trend, and/or time characteristics of the signal. The CI may be associated with information associated with a time-frequency partition, signature, amplitude, phase, trend, and/or characteristics of the signal. The CI may be associated with a decomposition of the signal. The CI may be associated with information associated with a direction, angle of arrival (AoA), angle of a directional antenna, and/or a phase of the signal through the channel. The CI may be associated with attenuation patterns of the signal through the channel. Each CI may be associated with a Type 1 device and a Type 2 device. Each CI may be associated with an antenna of the Type 1 device and an antenna of the Type 2 device.

The CI may be obtained from a communication hardware (e.g. of Type 2 device, or Type 1 device) that is capable of providing the CI. The communication hardware may be a WiFi-capable chip/IC (integrated circuit), chip compliant with a 802.11 or 802.16 or another wireless/radio standard, next generation WiFi-capable chip, LTE-capable chip, 5G-capable chip, 6G/7G/8G-capable chip, Bluetooth-enabled chip, NFC (near field communication)-enabled chip, BLE (Bluetooth low power)-enabled chip, UWB chip, another communication chip (e.g. Zigbee, WiMax, mesh network), etc. The communication hardware computes the CI and stores the CI in a buffer memory and make the CI available for extraction. The CI may comprise data and/or at least one matrices related to channel state information (CSI). The at least one matrices may be used for channel equalization, and/or beam forming, etc.

The channel may be associated with a venue. The attenuation may be due to signal propagation in the venue, signal propagating/reflection/refraction/diffraction through/at/around air (e.g. air of venue), refraction medium/reflection surface such as wall, doors, furniture, obstacles and/or barriers, etc. The attenuation may be due to reflection at surfaces and obstacles (e.g. reflection surface, obstacle) such as floor, ceiling, furniture, fixtures, objects, people, pets, etc.

Each CI may be associated with a timestamp. Each CI may comprise N1 components (e.g. N1 frequency domain components in CFR, N1 time domain components in CIR, or N1 decomposition components). Each component may be associated with a component index. Each component may be a real, imaginary, or complex quantity, magnitude, phase, flag, and/or set. Each CI may comprise a vector or matrix of complex numbers, a set of mixed quantities, and/or a multi-dimensional collection of at least one complex numbers.

Components of a TSCI associated with a particular component index may form a respective component time series associated with the respective index. A TSCI may be divided into N1 component time series. Each respective component time series is associated with a respective component index. The characteristics/spatial-temporal information of the motion of the object may be monitored based on the component time series. In one example, one or more ranges of CI components (e.g. one range being from component 11 to component 23, a second range being from component 44 to component 50, and a third range having only one component) may be selected based on some criteria/cost function/signal quality metric (e.g. based on signal-to-noise ratio, and/or interference level) for further processing.

A component-wise characteristics of a component-feature time series of a TSCI may be computed. The component-wise characteristics may be a scalar (e.g. energy) or a function with a domain and a range (e.g. an autocorrelation function, transform, inverse transform). The characteristics/spatial-temporal information of the motion of the object may be monitored based on the component-wise characteristics.

A total characteristics (e.g. aggregate characteristics) of the TSCI may be computed based on the component-wise characteristics of each component time series of the TSCI. The total characteristics may be a weighted average of the component-wise characteristics. The characteristics/spatial-temporal information of the motion of the object may be monitored based on the total characteristics. An aggregate quantity may be a weighted average of individual quantities.

The Type 1 device and Type 2 device may support WiFi, WiMax, 3G/beyond 3G, 4G/beyond 4G, LTE, LTE-A, 5G, 6G, 7G, Bluetooth, NFC, BLE, Zigbee, UWB, UMTS, 3GPP, GSM, EDGE, TDMA, FDMA, CDMA, WCDMA, TD-SCDMA, mesh network, proprietary wireless system, IEEE 802.11 standard, 802.15 standard, 802.16 standard, 3GPP standard, and/or another wireless system.

A common wireless system and/or a common wireless channel may be shared by the Type 1 transceiver and/or the at least one Type 2 transceiver. The at least one Type 2 transceiver may transmit respective signal contemporaneously (or: asynchronously, synchronously, sporadically, continuously, repeatedly, concurrently, simultaneously and/or temporarily) using the common wireless system and/or the common wireless channel. The Type 1 transceiver may transmit a signal to the at least one Type 2 transceiver using the common wireless system and/or the common wireless channel.

Each Type 1 device and Type 2 device may have at least one transmitting/receiving antenna. Each CI may be associated with one of the transmitting antenna of the Type 1 device and one of the receiving antenna of the Type 2 device. Each pair of a transmitting antenna and a receiving antenna may be associated with a link, a path, a communication path, signal hardware path, etc. For example, if the Type 1 device has M (e.g. 3) transmitting antennas, and the Type 2 device has N (e.g. 2) receiving antennas, there may be M×N (e.g. 3×2=6) links or paths. Each link or path may be associated with a TSCI.

The at least one TSCI may correspond to various antenna pairs between the Type 1 device and the Type 2 device. The Type 1 device may have at least one antenna. The Type 2 device may also have at least one antenna. Each TSCI may be associated with an antenna of the Type 1 device and an antenna of the Type 2 device. Averaging or weighted averaging over antenna links may be performed. The averaging or weighted averaging may be over the at least one TSCI. The averaging may optionally be performed on a subset of the at least one TSCI corresponding to a subset of the antenna pairs.

Timestamps of CI of a portion of a TSCI may be irregular and may be corrected so that corrected timestamps of time-corrected CI may be uniformly spaced in time. In the case of multiple Type 1 devices and/or multiple Type 2 devices, the corrected timestamp may be with respect to the same or different clock.

An original timestamp associated with each of the CI may be determined. The original timestamp may not be uniformly spaced in time. Original timestamps of all CI of the particular portion of the particular TSCI in the current sliding time window may be corrected so that corrected timestamps of time-corrected CI may be uniformly spaced in time.

The characteristics and/or spatial-temporal information (e.g. motion information) may comprise: location, location coordinate, change in location, position (e.g. initial position, new position), position on map, height, horizontal location, vertical location, distance, displacement, speed, acceleration, rotational speed, rotational acceleration, angle of motion, azimuth, direction of motion, rotation, path, deformation, transformation, shrinking, expanding, gait, gait cycle, head motion, repeated motion, periodic motion, pseudo-periodic motion, impulsive motion, sudden motion, fall-down motion, transient motion, behavior, transient behavior, period of motion, frequency of motion, time trend, temporal profile, temporal characteristics, occurrence, change, change in frequency, change in timing, change of gait cycle, timing, starting time, ending time, duration, history of motion, motion type, motion classification, frequency, frequency spectrum, frequency characteristics, presence, absence, proximity, approaching, receding, identity/identifier of the object, composition of the object, head motion rate, head motion direction, mouth-related rate, eye-related rate, breathing rate, heart rate, tidal volume, depth of breath, inhale time, exhale time, inhale time to exhale time ratio, airflow rate, heart heat-to-beat interval, heart rate variability, hand motion rate, hand motion direction, leg motion, body motion, walking rate, hand motion rate, positional characteristics, characteristics associated with movement (e.g. change in position/location) of the object, tool motion, machine motion, complex motion, and/or combination of multiple motions, event, motion statistics, motion parameter, indication of motion detection, motion magnitude, motion phase, similarity score, distance score, Euclidean distance, weighted distance, $L\_1$ norm, $L\_2$ norm, $L\_k$ norm for $k>2$, statistical distance, correlation, correlation indicator, auto-correlation, covariance, auto-covariance, cross-covariance, inner product, outer product, motion signal transformation, motion feature, presence of motion, absence of motion, motion localization, motion identification, motion recognition, presence of object, absence of object, entrance of object, exit of object, a change of object, motion cycle, motion count, gait cycle, motion rhythm, deformation motion, gesture, handwriting, head motion, mouth motion, heart motion, internal organ motion, motion trend, size, length, area, volume, capacity, shape, form, tag, starting location, ending location, starting quantity, ending quantity, event, fall-down event, security event, accident event, home event, office event, factory event, warehouse event, manufacturing event, assembly line event, maintenance event, car-related event, navigation event, tracking event, door event, door-open event, door-close event, window event, window-open event, window-close event, repeatable event, one-time event, consumed quantity, unconsumed quantity, state, physical state, health state, well-being state, emotional state, mental state, another event, and/or another information. The processor shares computational workload with the Type 1 heterogeneous wireless device and Type 2 heterogeneous wireless device.

The Type 1 device and/or Type 2 device may be a local device. The local device may be: a smart phone, smart device, TV, sound bar, set-top box, access point, router, repeater, remote control, speaker, fan, refrigerator, microwave, oven, coffee machine, hot water pot, utensil, table, chair, light, lamp, door lock, camera, microphone, motion sensor, security device, fire hydrant, garage door, switch, power adapter, computer, dongle, computer peripheral, electronic pad, sofa, tile, accessory, home device, vehicle device, office device, building device, manufacturing device, watch, glasses, clock, television, oven, air-conditioner, accessory, utility, appliance, smart machine, smart vehicle, internet-of-thing (IoT) device, internet-enabled device, computer, portable computer, tablet, smart house, smart office, smart building, smart parking lot, smart system, and/or another device.

Each Type 1 device may be associated with a respective identifier (e.g. ID). Each Type 2 device may also be associated with a respective identify (ID). The ID may comprise: numeral, combination of text and numbers, name, password, account, account ID, web link, web address, index to some information, and/or another ID. The ID may be assigned. The ID may be assigned by hardware (e.g. hardwired, via dongle and/or other hardware), software and/or firmware. The ID may be stored (e.g. in database, in memory, in server (e.g. hub device), in the cloud, stored locally, stored remotely, stored permanently, stored temporarily) and may be retrieved. The ID may be associated with at least one record, account, user, household, address, phone number, social security number, customer number, another ID, another identifier, timestamp, and/or collection of data. The ID and/or part of the ID of a Type 1 device may be made available to a Type 2 device. The ID may be used for registration, initialization, communication, identification, verification, detection, recognition, authentication, access control, cloud access, networking, social networking, logging, recording, cataloging, classification, tagging, association, pairing, transaction, electronic transaction, and/or intellectual property control, by the Type 1 device and/or the Type 2 device.

The object may be person, passenger, child, older person, baby, sleeping baby, baby in vehicle, patient, worker, high-value worker, expert, specialist, waiter, customer in mall, traveler in airport/train station/bus terminal/shipping terminals, staff/worker/customer service personnel in factory/mall/supermarket/office/workplace, serviceman in sewage/air ventilation system/lift well, lifts in lift wells, elevator, inmate, people to be tracked/monitored, animal, plant, living object, pet, dog, cat, smart phone, phone accessory, computer, tablet, portable computer, dongle, computing accessory, networked devices, WiFi devices, IoT devices, smart watch, smart glasses, smart devices, speaker, keys, smart key, wallet, purse, handbag, backpack, goods, cargo, luggage, equipment, motor, machine, air conditioner, fan, air conditioning equipment, light fixture, moveable light, television, camera, audio and/or video equipment, stationary, surveillance equipment, parts, signage, tool, cart, ticket, parking ticket, toll ticket, airplane ticket, credit card, plastic card, access card, food packaging, utensil, table, chair, cleaning equipment/tool, vehicle, car, cars in parking facilities, merchandise in warehouse/store/supermarket/distribution center, boat, bicycle, airplane, drone, remote control car/plane/boat, robot, manufacturing device, assembly line, material/unfinished part/robot/wagon/transports on factory floor, object to be tracked in airport/shopping mart/supermarket, non-object, absence of an object, presence of an object, object with form, object with changing form, object with no form, mass of fluid, mass of liquid, mass of gas/smoke, fire, flame, electromagnetic (EM) source, EM medium, and/or another object.

The object itself may be communicatively coupled with some network, such as WiFi, MiFi, 3G/4G/LTE/5G/6G/7G, Bluetooth, NFC, BLE, WiMax, Zigbee, UMTS, 3GPP, GSM, EDGE, TDMA, FDMA, CDMA, WCDMA, TD-SCDMA, mesh network, adhoc network, and/or other network. The object itself may be bulky with AC power supply, but is moved during installation, cleaning, maintenance, renovation, etc. It may also be installed in moveable platform such as lift, pad, movable, platform, elevator, conveyor belt, robot, drone, forklift, car, boat, vehicle, etc.

The object may have multiple parts, each part with different movement (e.g. change in position/location). For example, the object may be a person walking forward. While walking, his left hand and right hand may move in different direction, with different instantaneous speed, acceleration, motion, etc.

The wireless transmitter (e.g. Type 1 device), the wireless receiver (e.g. Type 2 device), another wireless transmitter and/or another wireless receiver may move with the object and/or another object (e.g. in prior movement, current movement and/or future movement. They may be communicatively coupled to one or more nearby device. They may transmit TSCI and/or information associated with the TSCI to the nearby device, and/or each other. They may be with the nearby device.

The wireless transmitter and/or the wireless receiver may be part of a small (e.g. coin-size, cigarette box size, or even smaller), light-weight portable device. The portable device may be wirelessly coupled with a nearby device.

The nearby device may be smart phone, iPhone, Android phone, smart device, smart appliance, smart vehicle, smart gadget, smart TV, smart refrigerator, smart speaker, smart watch, smart glasses, smart pad, iPad, computer, wearable computer, notebook computer, gateway. The nearby device may be connected to a cloud server, local server (e.g. hub device) and/or other server via internet, wired internet connection and/or wireless internet connection. The nearby device may be portable.

The portable device, the nearby device, a local server (e.g. hub device) and/or a cloud server may share the computation and/or storage for a task (e.g. obtain TSCI, determine characteristics/spatial-temporal information of the object associated with the movement (e.g. change in position/location) of the object, computation of time series of power (e.g. signal strength) information, determining/computing the particular function, searching for local extremum, classification, identifying particular value of time offset, denoising, processing, simplification, cleaning, wireless smart sensing task, extract CI from signal, switching, segmentation, estimate trajectory, process the map, correction, corrective adjustment, adjustment, map-based correction, detecting error, checking for boundary hitting, thresholding, etc.) and information (e.g. TSCI).

The nearby device may/may not move with the object. The nearby device may be portable/not portable/moveable/non-moveable. The nearby device may use battery power, solar power, AC power and/or other power source. The nearby device may have replaceable/non-replaceable battery, and/or rechargeable/non-rechargeable battery. The nearby device may be similar to the object. The nearby device may have identical (and/or similar) hardware and/or software to the object. The nearby device may be a smart device, network enabled device, device with connection to WiFi/3G/4G/5G/6G/Zigbee/Bluetooth/NFC/UMTS/3GPP/GSM/EDGE/TDMA/FDMA/CDMA/WCDMA/TD-SCDMA/adhoc network/other network, smart speaker, smart watch, smart clock, smart appliance, smart machine, smart equipment, smart tool, smart vehicle, internet-of-thing (IoT) device, internet-enabled device, computer, portable computer, tablet, and another device.

The nearby device and/or at least one processor associated with the wireless receiver, the wireless transmitter, the another wireless receiver, the another wireless transmitter and/or a cloud server (in the cloud) may determine the initial spatial-temporal information of the object. Two or more of them may determine the initial spatial-temporal info jointly. Two or more of them may share intermediate information in the determination of the initial spatial-temporal information (e.g. initial position).

In one example, the wireless transmitter (e.g. Type 1 device, or Tracker Bot) may move with the object. The wireless transmitter may send the signal to the wireless receiver (e.g. Type 2 device, or Origin Register) or determining the initial spatial-temporal information (e.g. initial position) of the object. The wireless transmitter may also send the signal and/or another signal to another wireless receiver (e.g. another Type 2 device, or another Origin Register) for the monitoring of the motion (spatial-temporal info) of the object. The wireless receiver may also receive the signal and/or another signal from the wireless transmitter and/or the another wireless transmitter for monitoring the motion of the object. The location of the wireless receiver and/or the another wireless receiver may be known.

In another example, the wireless receiver (e.g. Type 2 device, or Tracker Bot) may move with the object. The wireless receiver may receive the signal transmitted from the wireless transmitter (e.g. Type 1 device, or Origin Register) for determining the initial spatial-temporal info (e.g. initial position) of the object. The wireless receiver may also receive the signal and/or another signal from another wireless transmitter (e.g. another Type 1 device, or another Origin Register) for the monitoring of the current motion (e.g. spatial-temporal info) of the object. The wireless transmitter may also transmit the signal and/or another signal to the wireless receiver and/or the another wireless receiver (e.g. another Type 2 device, or another Tracker Bot) for monitoring the motion of the object. The location of the wireless transmitter and/or the another wireless transmitter may be known.

The venue may be a space such as a room, house, office, workplace, hallway, walkway, lift, lift well, escalator, elevator, sewage system, air ventilations system, staircase, gathering area, duct, air duct, pipe, tube, enclosed space, enclosed structure, semi-enclosed structure, enclosed area, area with at least one wall, plant, machine, engine, structure with wood, structure with glass, structure with metal, structure with walls, structure with doors, structure with gaps, structure with reflection surface, structure with fluid, building, roof top, store, factory, assembly line, hotel room, museum, classroom, school, university, government building, warehouse, garage, mall, airport, train station, bus terminal, hub, transportation hub, shipping terminal, government facility, public facility, school, university, entertainment facility, recreational facility, hospital, pediatric/neonatal wards, seniors home, elderly care facility, geriatric facility, community center, stadium, playground, park, field, sports facility, swimming facility, track and/or field, basketball court, tennis court, soccer stadium, baseball stadium, gymnasium, hall, garage, shopping mart, mall, supermarket, manufacturing facility, parking facility, construction site, mining facility, transportation facility, highway, road, valley, forest, wood, terrain, landscape, den, patio, land, path, amusement park, urban area, rural area, suburban area, metropolitan area, garden, square, plaza, music hall, downtown facility, over-air facility, semi-open facility, closed area, train platform, train station, distribution center, warehouse, store, distribution center, storage facility, underground facility, space (e.g. above ground, outer-space) facility, floating facility, cavern, tunnel facility, indoor facility, open-air facility, outdoor facility with some walls/doors/reflective barriers, open facility, semi-open facility, car, truck, bus, van, container, ship/boat, submersible, train, tram, airplane, vehicle, mobile home, cave, tunnel, pipe, channel, metropolitan area, downtown area with relatively tall buildings, valley, well, duct, pathway, gas line, oil line, water pipe, network of interconnecting pathways/alleys/roads/tubes/cavities/caves/pipe-like structure/air space/fluid space, human body, animal body, body cavity, organ, bone, teeth, soft tissue, hard tissue, rigid tissue, non-rigid tissue, blood/body fluid vessel, windpipe, air duct, den, etc. The venue may be indoor space, outdoor space, The venue may include both the inside and outside of the space. For example, the venue may include both the inside of a building and the outside of the building. For example, the venue can be a building that has one floor or multiple floors, and a portion of the building can be underground. The shape of the building can be, e.g., round, square, rectangular, triangle, or irregular-shaped. These are merely examples. The disclosure can be used to detect events in other types of venue or spaces.

The wireless transmitter (e.g. Type 1 device) and/or the wireless receiver (e.g. Type 2 device) may be embedded in a portable device (e.g. a module, or a device with the module) that may move with the object (e.g. in prior movement and/or current movement). The portable device may be communicatively coupled with the object using a wired connection (e.g. through USB, microUSB, Firewire, HDMI, serial port, parallel port, and other connectors) and/or a connection (e.g. Bluetooth, Bluetooth Low Energy (BLE), WiFi, LTE, NFC, ZigBee, etc.). The portable device may be a lightweight device. The portable may be powered by battery, rechargeable battery and/or AC power. The portable device may be very small (e.g. at sub-millimeter scale and/or sub-centimeter scale), and/or small (e.g. coin-size, card-size, pocket-size, or larger). The portable device may be large, sizable, and/or bulky (e.g. heavy machinery to be installed). The portable device may be a WiFi hotspot, access point, mobile WiFi (MiFi), dongle with USB/micro USB/Firewire/other connector, smartphone, portable computer, computer, tablet, smart device, internet-of-thing (IoT) device, WiFi-enabled device, LTE-enabled device, a smart watch, smart glass, smart mirror, smart antenna, smart battery, smart light, smart pen, smart ring, smart door, smart window, smart clock, small battery, smart wallet, smart belt, smart handbag, smart clothing/garment, smart ornament, smart packaging, smart paper/book/magazine/poster/printed matter/signage/display/lighted system/lighting system, smart key/tool, smart bracelet/chain/necklace/wearable/accessory, smart pad/cushion, smart tile/block/brick/building material/other material, smart garbage can/waste container, smart food carriage/storage, smart ball/racket, smart chair/sofa/bed, smart shoe/footwear/carpet/mat/shoe rack, smart glove/hand wear/ring/hand ware, smart hat/headwear/makeup/sticker/tattoo, smart mirror, smart toy, smart pill, smart utensil, smart bottle/food container, smart tool, smart device, IoT device, WiFi enabled device, network enabled device, 3G/4G/5G/6G enabled device, UMTS devices, 3GPP devices, GSM devices, EDGE devices, TDMA devices, FDMA devices, CDMA devices, WCDMA devices, TD-SCDMA devices, embeddable device, implantable device, air conditioner, refrigerator, heater, furnace, furniture, oven, cooking device, television/set-top box (STB)/DVD player/audio player/video player/remote control, hi-fi, audio device, speaker, lamp/light, wall, door, window, roof, roof tile/shingle/structure/attic structure/device/feature/installation/fixtures, lawn mower/garden tools/yard tools/mechanics tools/garage tools/, garbage can/container, 20-ft/40-ft container, storage container, factory/manufacturing/production device, repair tools, fluid container, machine, machinery to be installed, vehicle, cart, wagon, warehouse vehicle, car, bicycle, motorcycle, boat, vessel, airplane, basket/box/bag/bucket/container, smart plate/cup/bowl/pot/mat/utensils/kitchen tools/kitchen devices/kitchen accessories/cabinets/tables/chairs/tiles/lights/water pipes/taps/gas range/oven/dishwashing machine/etc. The portable device may have a battery that may be replaceable, irreplaceable, rechargeable, and/or non-rechargeable. The portable device may be wirelessly charged. The portable device may be a smart payment card. The portable device may be a payment card used in parking lots, highways, entertainment parks, or other venues/facilities that need payment. The portable device may have an identifier (ID) or identity as described above.

A event may be monitored based on the TSCI. The event may be an object related event, such as fall-down of the object (e.g. an person and/or a sick person), rotation, hesitation, pause, impact (e.g. a person hitting a sandbag, door, window, bed, chair, table, desk, cabinet, box, another person, animal, bird, fly, table, chair, ball, bowling ball, tennis ball, football, soccer ball, baseball, basketball, volley ball, etc.), two-body action (e.g. a person letting go a balloon, catching a fish, molding a clay, writing a paper, person typing on a computer, etc.), car moving in a garage, person carrying a smart phone and walking around an airport/mall/government building/office/etc., autonomous moveable object/machine moving around (e.g. vacuum cleaner, utility vehicle, car, drone, self-driving car, etc.).

The task or the wireless smart sensing task may comprise: object detection, presence detection, object recognition, object verification, object counting, tool detection, tool recognition, tool verification, machine detection, machine recognition, machine verification, human detection, human recognition, human verification, baby detection, baby recognition, baby verification, human breathing detection, motion detection, motion degree estimation, motion estimation, motion verification, periodic motion detection, periodic motion estimation, periodic motion verification, repeated motion detection/estimation/verification, stationary motion detection, stationary motion estimation, stationary motion verification, cyclo-stationary motion detection, cyclo-stationary motion estimation, cyclo-stationary motion verification, transient motion detection, transient motion estimation, transient motion verification, trend detection, trend estimation, trend verification, breathing detection, breathing estimation, breathing estimation, human biometrics detection, human biometrics estimation, human biometrics verification, environment informatics detection, environment informatics estimation, environment informatics verification, gait detection, gait estimation, gait verification, gesture detection, gesture estimation, gesture verification, machine learning, supervised learning, unsupervised learning, semi-supervised learning, clustering, feature extraction, featuring training, principal component analysis, eigen-decomposition, frequency decomposition, time decomposition, time-frequency decomposition, functional decomposition, other decomposition, training, discriminative training, supervised training, unsupervised training, semi-supervised training, neural network, sudden motion detection, fall-down detection, danger detection, life-threat detection, regular motion detection, stationary motion detection, cyclo-stationary motion detection, intrusion detection, suspicious motion detection, security, safety monitoring, navigation, guidance, map-based processing, map-based correction, irregularity detection, locationing, tracking, multiple object tracking, indoor tracking, indoor position, indoor navigation, power transfer, wireless power transfer, object counting, car tracking in parking garage, patient detection, patient monitoring, patient verification, activating a device/system (e.g. security system, alarm, siren, speaker, camera, heater/air-conditioning (HVAC) system, coffee machine, cooking device, cleaning device, housekeeping device, etc.), wireless communication, data communication, signal broadcasting, networking, coordination, administration, encryption, protection, cloud computing, other processing and/or other task.

The task may be performed by the Type 1 device, the Type 2 device, another Type 1 device, another Type 2 device, a nearby device, a local server (e.g. hub device), edge server, a cloud server, and/or another device.

A first part of the task may comprise at least one of: preprocessing, signal conditioning, signal processing, post-processing, denoising, feature extraction, coding, encryption, transformation, mapping, motion detection, motion estimation, motion change detection, motion pattern detection, motion pattern estimation, motion pattern recognition, vital sign detection, vital sign estimation, vital sign recognition, periodic motion detection, periodic motion estimation, repeated motion detection/estimation, breathing rate detection, breathing rate estimation, breathing pattern detection, breathing pattern estimation, breathing pattern recognition, heart beat detection, heart beat estimation, heart pattern detection, heart pattern estimation, heart pattern recognition, gesture detection, gesture estimation, gesture recognition, speed detection, speed estimation, object locationing, object tracking, navigation, acceleration estimation, acceleration detection, fall-down detection, change detection, intruder detection, baby detection, baby monitoring, patient monitoring, object recognition, wireless power transfer, and/or wireless charging.

A second part of the task may comprise at least one of: a smart home task, smart office task, smart building task, smart factory task (e.g. manufacturing using a machine or an assembly line), smart internet-of-thing (IoT) task, smart system task, smart home operation, smart office operation, smart building operation, smart manufacturing operation (e.g. moving supplies/parts/raw material to a machine/an assembly line), IoT operation, smart system operation, turning on a light, turning off the light, controlling the light in at least one of: a room, region, and/or the venue, playing a sound clip, playing the sound clip in at least one of: the room, the region, and/or the venue, playing the sound clip of at least one of: a welcome, greeting, farewell, first message, and/or a second message associated with the first part of the task, turning on an appliance, turning off the appliance, controlling the appliance in at least one of: the room, the region, and/or the venue, turning on an electrical system, turning off the electrical system, controlling the electrical system in at least one of: the room, the region, and/or the venue, turning on a security system, turning off the security system, controlling the security system in at least one of: the room, the region, and/or the venue, turning on a mechanical system, turning off a mechanical system, controlling the mechanical system in at least one of: the room, the region, and/or the venue, and/or controlling at least one of: an air conditioning system, heating system, ventilation system, lighting system, heating device, stove, entertainment system, door, fence, window, garage, computer system, networked device, networked system, home appliance, office equipment, lighting device, robot (e.g. robotic arm), smart vehicle, smart machine, assembly line, smart device, internet-of-thing (IoT) device, smart home device, and/or a smart office device.

The task may include: detect a user returning home, detect a user leaving home, detect a user moving from one room to another, detect/control/lock/unlock/open/close/partially open a window/door/garage door/blind/curtain/panel/solar panel/sun shade, detect a pet, detect/monitor a user doing something (e.g. sleeping on sofa, sleeping in bedroom, running on treadmill, cooking, sitting on sofa, watching TV, eating in kitchen, eating in dining room, going upstairs/downstairs, going outside/coming back, in the rest room, etc.), monitor/detect location of a user/pet, do something (e.g. send a message, notify/report to someone) automatically upon detection, do something for the user automatically upon detecting the user, turn on/off/dim a light, turn on/off music/radio/home entertainment system, turn on/off/adjust/control TV/HiFi/set-top-box (STB)/home entertainment system/smart speaker/smart device, turn on/off/adjust air conditioning system, turn on/off/adjust ventilation system, turn on/off/adjust heating system, adjust/control curtains/light shades, turn on/off/wake a computer, turn on/off/pre-heat/control coffee machine/hot water pot, turn on/off/control/preheat cooker/oven/microwave oven/another cooking device, check/adjust temperature, check weather forecast, check telephone message box, check mail, do a system check, control/adjust a system, check/control/arm/disarm security system/baby monitor, check/control refrigerator, give a report (e.g. through a speaker such as Google home, Amazon Echo, on a display/screen, via a webpage/email/messaging system/notification system, etc.).

For example, when a user arrives home in his car, the task may be to, automatically, detect the user or his car approaching, open the garage door upon detection, turn on the driveway/garage light as the user approaches the garage, turn on air conditioner/heater/fan, etc. As the user enters the house, the task may be to, automatically, turn on the entrance light, turn off driveway/garage light, play a greeting message to welcome the user, turn on the music, turn on the radio and tuning to the user's favorite radio news channel, open the curtain/blind, monitor the user's mood, adjust the lighting and sound environment according to the user's mood or the current/imminent event (e.g. do romantic lighting and music because the user is scheduled to eat dinner with girlfriend in 1 hour) on the user's daily calendar, warm the food in microwave that the user prepared in the morning, do a diagnostic check of all systems in the house, check weather forecast for tomorrow's work, check news of interest to the user, check user's calendar and to-do list and play reminder, check telephone answer system/messaging system/email and give a verbal report using dialog system/speech synthesis, remind (e.g. using audible tool such as speakers/HiFi/speech synthesis/sound/voice/music/song/sound field/background sound field/dialog system, using visual tool such as TV/entertainment system/computer/notebook/smart pad/display/light/color/brightness/patterns/symbols, using haptic tool/virtual reality tool/gesture/tool, using a smart device/appliance/material/furniture/fixture, using web tool/server/hub device/cloud server/fog server/edge server/home network/mesh network, using messaging tool/notification tool/communication tool/scheduling tool/email, using user interface/GUI, using scent/smell/fragrance/taste, using neural tool/nervous system tool, using a combination, etc.) the user of his mother's birthday and to call her, prepare a report, and give the report (e.g. using a tool for reminding as discussed above). The task may turn on the air conditioner/heater/ventilation system in advance, or adjust temperature setting of smart thermostat in advance, etc. As the user moves from the entrance to the living room, the task may be to turn on the living room light, open the living room curtain, open the window, turn off the entrance light behind the user, turn on the TV and set-top box, set TV to the user's favorite channel, adjust an appliance according to the user's preference and conditions/states (e.g. adjust lighting and choose/play music to build a romantic atmosphere), etc.

Another example may be: When the user wakes up in the morning, the task may be to detect the user moving around in the bedroom, open the blind/curtain, open the window, turn off the alarm clock, adjust indoor temperature from night-time temperature profile to day-time temperature profile, turn on the bedroom light, turn on the restroom light as the user approaches the restroom, check radio or streaming channel and play morning news, turn on the coffee machine and preheat the water, turn off security system, etc. When the user walks from bedroom to kitchen, the task may be to turn on the kitchen and hallway lights, turn off the bedroom and restroom lights, move the music/message/reminder from the bedroom to the kitchen, turn on the kitchen TV, change TV to morning news channel, lower the kitchen blind and open the kitchen window to bring in fresh air, unlock backdoor for the user to check the backyard, adjust temperature setting for the kitchen, etc.

Another example may be: When the user leaves home for work, the task may be to detect the user leaving, play a farewell and/or have-a-good-day message, open/close garage door, turn on/off garage light and driveway light, turn off/dim lights to save energy (just in case the user forgets), close/lock all windows/doors (just in case the user forgets), turn off appliance (especially stove, oven, microwave oven), turn on/arm the home security system to guard the home against any intruder, adjust air conditioning/heating/ventilation systems to "away-from-home" profile to save energy, send alerts/reports/updates to the user's smart phone, etc.

A motion may comprise at least one of: a no-motion, resting motion, non-moving motion, movement, change in position/location, deterministic motion, transient motion, fall-down motion, repeating motion, periodic motion, pseudo-periodic motion, periodic/repeated motion associated with breathing, periodic/repeated motion associated with heartbeat, periodic/repeated motion associated with living object, periodic/repeated motion associated with machine, periodic/repeated motion associated with man-made object, periodic/repeated motion associated with nature, complex motion with transient element and periodic element, repetitive motion, non-deterministic motion, probabilistic motion, chaotic motion, random motion, complex motion with non-deterministic element and deterministic element, stationary random motion, pseudo-stationary random motion, cyclo-stationary random motion, non-stationary random motion, stationary random motion with periodic autocorrelation function (ACF), random motion with periodic ACF for period of time, random motion that is pseudo-stationary for a period of time, random motion of which an instantaneous ACF has a pseudo-periodic/repeating element for a period of time, machine motion, mechanical motion, vehicle motion, drone motion, air-related motion, wind-related motion, weather-related motion, water-related motion, fluid-related motion, ground-related motion, change in electro-magnetic characteristics, sub-surface motion, seismic motion, plant motion, animal motion, human motion, normal motion, abnormal motion, dangerous motion, warning motion, suspicious motion, rain, fire, flood, tsunami, explosion, collision, imminent collision, human body motion, head motion, facial motion, eye motion, mouth motion, tongue motion, neck motion, finger motion, hand motion, arm motion, shoulder motion, body motion, chest motion, abdominal motion, hip motion, leg motion, foot motion, body joint motion, knee motion, elbow motion, upper body motion, lower body motion, skin motion, below-skin motion, subcutaneous tissue motion, blood vessel motion, intravenous motion, organ motion, heart motion, lung motion, stomach motion, intestine motion, bowel motion, eating motion, breathing motion, facial expression, eye expression, mouth expression, talking motion, singing motion, eating motion, gesture, hand gesture, arm gesture, keystroke, typing stroke, user-interface gesture, man-machine interaction, gait, dancing movement, coordinated movement, and/or coordinated body movement.

The heterogeneous IC of the Type 1 device and/or any Type 2 receiver may comprise low-noise amplifier (LNA), power amplifier, transmit-receive switch, media access controller, baseband radio, 2.4 GHz radio, 3.65 GHz radio, 4.9 GHz radio, 5 GHz radio, 5.9 GHz radio, below 6 GHz radio, below 60 GHz radio and/or another radio.

The heterogeneous IC may comprise a processor, a memory communicatively coupled with the processor, and a set of instructions stored in the memory to be executed by the processor. The IC and/or any processor may comprise at least one of: general purpose processor, special purpose processor, microprocessor, multi-processor, multi-core processor, parallel processor, CISC processor, RISC processor, microcontroller, central processing unit (CPU), graphical processor unit (GPU), digital signal processor (DSP), application specific integrated circuit (ASIC), field programmable gate array (FPGA), embedded processor (e.g. ARM), logic circuit, other programmable logic device, discrete logic, and/or a combination.

The heterogeneous IC may support broadband network, wireless network, mobile network, mesh network, cellular network, wireless local area network (WLAN), wide area network (WAN), and metropolitan area network (MAN), WLAN standard, WiFi, LTE, LTE-A, LTE-U, 802.11 standard, 802.11a, 802.11b, 802.11g, 802.11n, 802.11ac, 802.11ad, 802.11af, 802,11ah, 802.11ax, 802.11ay, mesh network standard, 802.15 standard, 802.16 standard, cellular network standard, 3G, 3.5G, 4G, beyond 4G, 4.5G, 5G, 6G, 7G, 8G, 9G, UMTS, 3GPP, GSM, EDGE, TDMA, FDMA, CDMA, WCDMA, TD-SCDMA, Bluetooth, Bluetooth Low-Energy (BLE), NFC, Zigbee, WiMax, and/or another wireless network protocol.

The processor may comprise general purpose processor, special purpose processor, microprocessor, microcontroller, embedded processor, digital signal processor, central processing unit (CPU), graphical processing unit (GPU), multi-processor, multi-core processor, and/or processor with graphics capability, and/or a combination.

The memory may be volatile, non-volatile, random access memory (RAM), Read Only Memory (ROM), Electrically Programmable ROM (EPROM), Electrically Erasable Programmable ROM (EEPROM), hard disk, flash memory, CD-ROM, DVD-ROM, magnetic storage, optical storage, organic storage, storage system, storage network, network storage, cloud storage, edge storage, local storage, external storage, internal storage, or other form of non-transitory storage medium known in the art.

The set of instructions (machine executable code) corresponding to the method steps may be embodied directly in hardware, in software, in firmware, or in combinations thereof. The set of instructions may be embedded, pre-loaded, loaded upon boot up, loaded on the fly, loaded on demand, pre-installed, installed, and/or downloaded.

The presentation may be a presentation in an audio-visual way (e.g. using combination of visual, graphics, text, symbols, color, shades, video, animation, sound, speech, audio, etc.), graphical way (e.g. using GUI, animation, video), textual way (e.g. webpage with text, message, animated text, etc.), symbolic way (e.g. emoticon, signs, hand gesture, etc.), or mechanical way (e.g. vibration, actuator movement, haptics, etc.).

Basic Computation

Computational workload associated with the method is shared among the processor, the Type 1 heterogeneous wireless device, the Type 2 heterogeneous wireless device, a local server (e.g. hub device), a cloud server, and another processor.

An operation, pre-processing, processing and/or postprocessing may be applied to data (e.g. TSCI, autocorrelation, features of TSCI). An operation may be preprocessing, processing and/or postprocessing. The preprocessing, processing and/or postprocessing may be an operation. An operation may comprise preprocessing, processing, postprocessing, scaling, computing a confidence factor, computing a function of the operands, filtering, linear filtering, nonlinear filtering, folding, grouping, energy computation, lowpass filtering, bandpass filtering, highpass filtering, median filtering, rank filtering, quartile filtering, percentile filtering, mode filtering, finite impulse response (FIR) filtering, infinite impulse response (IIR) filtering, moving average (MA) filtering, autoregressive (AR) filtering, autoregressive moving averaging (ARMA) filtering, selective filtering, adaptive filtering, interpolation, decimation, subsampling, upsampling, resampling, time correction, time base correction, phase correction, magnitude correction, phase cleaning, magnitude cleaning, matched filtering, enhancement, restoration, denoising, smoothing, signal conditioning, enhancement, restoration, spectral analysis, linear transform, nonlinear transform, inverse transform, frequency transform, inverse frequency transform, Fourier transform (FT), discrete time FT (DTFT), discrete FT (DFT), fast FT (FFT), wavelet transform, Laplace transform, Hilbert transform, Hadamard transform, trigonometric transform, sine transform, cosine transform, DCT, power-of-2 transform, sparse transform, graph-based transform, graph signal processing, fast transform, a transform combined with zero padding, cyclic padding, padding, zero padding, feature extraction, decomposition, projection, orthogonal projection, non-orthogonal projection, over-complete projection, eigen-decomposition, singular value decomposition (SVD), principle component analysis (PCA), independent component analysis (ICA), grouping, sorting, thresholding, soft thresholding, hard thresholding, clipping, soft clipping, first derivative, second order derivative, high order derivative, convolution, multiplication, division, addition, subtraction, integration, maximization, minimization, least mean square error, recursive least square, constrained least square, batch least square, least absolute error, least mean square deviation, least absolute deviation, local maximization, local minimization, optimization of a cost function, neural network, recognition, labeling, training, clustering, machine learning, supervised learning, unsupervised learning, semi-supervised learning, comparison with another TSCI, similarity score computation, quantization, vector quantization, matching pursuit, compression, encryption, coding, storing, transmitting, normalization, temporal normalization, frequency domain normalization, classification, clustering, labeling, tagging, learning, detection, estimation, learning network, mapping, remapping, expansion, storing, retrieving, transmitting, receiving, representing, merging, combining, splitting, tracking, monitoring, matched filtering, Kalman filtering, particle filter, intrapolation, extrapolation, histogram estimation, importance sampling, Monte Carlo sampling, compressive sensing, representing, merging, combining, splitting, scrambling, error protection, forward error correction, doing nothing, time varying processing, conditioning averaging, weighted averaging, arithmetic mean, geometric mean, harmonic mean, averaging over selected frequency, averaging over antenna links, logical operation, permutation, combination, sorting, AND, OR, XOR, union, intersection, vector addition, vector subtraction, vector multiplication, vector division, inverse, norm, distance, and/or another operation. The operation may be the preprocessing, processing, and/or post-processing. Operations may be applied jointly on multiple time series or functions.

The function (e.g. function of operands) may comprise: scalar function, vector function, discrete function, continuous function, polynomial function, characteristics, feature, magnitude, phase, exponential function, logarithmic function, trigonometric function, transcendental function, logical function, linear function, algebraic function, nonlinear function, piecewise linear function, real function, complex function, vector-valued function, inverse function, derivative of function, integration of function, circular function, function of another function, one-to-one function, one-to-many function, many-to-one function, many-to-many function, zero crossing, absolute function, indicator function, mean, mode, median, range, statistics, histogram, variance, standard deviation, arithmetic mean, geometric mean, harmonic mean, trimmed mean, percentile, square, cube, root, power, sine, cosine, tangent, cotangent, secant, cosecant, elliptical function, parabolic function, hyperbolic function, game function, zeta function, absolute value, thresholding, limiting function, floor function, rounding function, sign function, quantization, piecewise constant function, composite function, function of function, time function processed with an operation (e.g. filtering), probabilistic function, stochastic function, random function, ergodic function, stationary function, deterministic function, periodic function, repeated function, transformation, frequency transform, inverse frequency transform, discrete time transform, Laplace transform, Hilbert transform, sine transform, cosine transform, triangular transform, wavelet transform, integer transform, power-of-2 transform, sparse transform, projection, decomposition, principle component analysis (PCA), independent component analysis (ICA), neural network, feature extraction, moving function, function of moving window of neighboring items of time series, filtering function, convolution, mean function, histogram, variance/standard deviation function, statistical function, short-time transform, discrete transform, discrete Fourier transform, discrete cosine transform, discrete sine transform, Hadamard transform, eigen-decomposition, eigenvalue, singular value decomposition (SVD), singular value, orthogonal decomposition, matching pursuit, sparse transform, sparse approximation, any decomposition, graph-based processing, graph-based transform, graph signal processing, classification, identifying a class/group/category, labeling, learning, machine learning, detection, estimation, feature extraction, learning network, feature extraction, denoising, signal enhancement, coding, encryption, mapping, remapping, vector quantization, lowpass filtering, highpass filtering, bandpass filtering, matched filtering, Kalman filtering, preprocessing, postprocessing, particle filter, FIR filtering, IIR filtering, autoregressive (AR) filtering, adaptive filtering, first order derivative, high order derivative, integration, zero crossing, smoothing, median filtering, mode filtering, sampling, random sampling, resampling function, downsampling, down-converting, upsampling, up-converting, interpolation, extrapolation, importance sampling, Monte Carlo sampling, compressive sensing, statistics, short term statistics, long term statistics, autocorrelation function, cross correlation, moment generating function, time averaging, weighted averaging, special function, Bessel function, error function, complementary error function, Beta function, Gamma function, integral function, Gaussian function, Poisson function, etc.

Machine learning, training, discriminative training, deep learning, neural network, continuous time processing, distributed computing, distributed storage, acceleration using GPU/DSP/coprocessor/multicore/multiprocessing may be applied to a step (or each step) of this disclosure.

A frequency transform may include Fourier transform, Laplace transform, Hadamard transform, Hilbert transform, sine transform, cosine transform, triangular transform, wavelet transform, integer transform, power-of-2 transform, combined zero padding and transform, Fourier transform with zero padding, and/or another transform. Fast versions and/or approximated versions of the transform may be performed. The transform may be performed using floating point, and/or fixed point arithmetic.

An inverse frequency transform may include inverse Fourier transform, inverse Laplace transform, inverse Hadamard transform, inverse Hilbert transform, inverse sine transform, inverse cosine transform, inverse triangular transform, inverse wavelet transform, inverse integer transform, inverse power-of-2 transform, combined zero padding and transform, inverse Fourier transform with zero padding, and/or another transform. Fast versions and/or approximated versions of the transform may be performed. The transform may be performed using floating point, and/or fixed point arithmetic.

A quantity from a TSCI may be computed. The quantity may comprise statistic of at least one of: motion, location, map coordinate, height, speed, acceleration, movement angle, rotation, size, volume, time trend, pattern, one-time pattern, repeating pattern, evolving pattern, time pattern, mutually excluding patterns, related/correlated patterns, cause-and-effect, correlation, short-term/long-term correlation, tendency, inclination, statistics, typical behavior, atypical behavior, time trend, time profile, periodic motion, repeated motion, repetition, tendency, change, abrupt change, gradual change, frequency, transient, breathing, gait, action, event, suspicious event, dangerous event, alarming event, warning, belief, proximity, collision, power, signal, signal power, signal strength, received signal strength indicator (RSSI), signal amplitude, signal phase, signal frequency component, signal frequency band component, channel state information (CSI), map, time, frequency, time-frequency, decomposition, orthogonal decomposition, non-orthogonal decomposition, tracking, breathing, heart beat, statistical parameters, cardiopulmonary statistics/analytics, daily activity statistics/analytics, chronic disease statistics/analytics, medical statistics/analytics, an early (or instantaneous or contemporaneous or delayed) indication/suggestion/sign/indicator/verifier/detection/symptom of a disease/condition/situation, biometric, baby, patient, machine, device, temperature, vehicle, parking lot, venue, lift, elevator, spatial, road, fluid flow, home, room, office, house, building, warehouse, storage, system, ventilation, fan, pipe, duct, people, human, car, boat, truck, airplane, drone, downtown, crowd, impulsive event, cyclo-stationary, environment, vibration, material, surface, 3-dimensional, 2-dimensional, local, global, presence, and/or another.

Sliding Window/Algorithm

Sliding time window may have time varying window width. It may be smaller at the beginning to enable fast acquisition and may increase over time to a steady-state size. The steady-state size may be related to the frequency, repeated motion, transient motion, and/or spatial-temporal information to be monitored. Even in steady state, the window size may be adaptively (and/or dynamically) changed (e.g. adjusted, varied, modified) based on battery life, power consumption, available computing power, change in amount of targets, the nature of motion to be monitored, etc.

The time shift between two sliding time windows at adjacent time instance may be constant/variable/locally adaptive/dynamically adjusted over time. When shorter time shift is used, the update of any monitoring may be more frequent which may be used for fast changing situations, object motions, and/or objects. Longer time shift may be used for slower situations, object motions, and/or objects.

The window width/size and/or time shift may be changed (e.g. adjusted, varied, modified) upon a user request/choice. The time shift may be changed automatically (e.g. as controlled by processor/computer/server/hub device/cloud server) and/or adaptively (and/or dynamically).

At least one characteristics of a function (e.g. auto-correlation function, auto-covariance function, cross-correlation function, cross-covariance function, power spectral density, time function, frequency domain function, frequency transform) may be determined (e.g. by an object tracking server, the processor, the Type 1 heterogeneous device, the Type 2 heterogeneous device, and/or another device). The at least one characteristics of the function may include: a local maximum, local minimum, local extremum, local extremum with positive time offset, first local extremum with positive time offset, n^th local extremum with positive time offset, local extremum with negative time offset, first local extremum with negative time offset, n^th local extremum with negative time offset, constrained (with argument within constraint) maximum, minimum, constrained maximum, constrained minimum, constrained extremum, slope, derivative, higher order derivative, maximum slope, minimum slope, local maximum slope, local maximum slope with positive time offset, local minimum slope, constrained maximum slope, constrained minimum slope, maximum higher order derivative, minimum higher order derivative, constrained higher order derivative, zero-crossing, zero crossing with positive time offset, n^th zero crossing with positive time offset, zero crossing with negative time offset, n^th zero crossing with negative time offset, constrained zero-crossing, zero-crossing of slope, zero-crossing of higher order derivative, and/or another characteristics. At least one argument of the function associated with the at least one characteristics of the function may be identified. Some quantity (e.g. spatial-temporal information of the object) may be determined based on the at least one argument of the function.

A characteristics (e.g. characteristics of motion of an object in the venue) may comprise at least one of: an instantaneous characteristics, short-term characteristics, repetitive characteristics, recurring characteristics, history, incremental characteristics, changing characteristics, deviational characteristics, phase, magnitude, degree, time characteristics, frequency characteristics, time-frequency characteristics, decomposition characteristics, orthogonal decomposition characteristics, non-orthogonal decomposition characteristics, deterministic characteristics, probabilistic characteristics, stochastic characteristics, autocorrelation function (ACF), mean, variance, standard deviation, statistics, duration, timing, trend, periodic characteristics, repetition characteristics, long-term characteristics, historical characteristics, average characteristics, current characteristics, past characteristics, future characteristics, predicted characteristics, location, distance, height, speed, direction, velocity, acceleration, change of the acceleration, angle, angular speed, angular velocity, angular acceleration of the object, change of the angular acceleration, orientation of the object, angular of rotation, deformation of the object, shape of the object, change of shape of the object, change of size of the object, change of structure of the object, and/or change of characteristics of the object.

At least one local maximum and at least one local minimum of the function may be identified. At least one local signal-to-noise-ratio-like (SNR-like) parameter may be computed for each pair of adjacent local maximum and local minimum. The SNR-like parameter may be a function (e.g. linear, log, exponential function, monotonic function) of a fraction of a quantity (e.g. power, magnitude, etc.) of the local maximum over the same quantity of the local minimum. It may also be the function of a difference between the quantity of the local maximum and the same quantity of the local minimum.

Significant local peaks may be identified or selected. Each significant local peak may be a local maximum with SNR-like parameter greater than a threshold T1 and/or a local maximum with amplitude greater than a threshold T2.

The at least one local minimum and the at least one local minimum in the frequency domain may be identified/computed using a persistence-based approach.

A set of selected significant local peaks may be selected from the set of identified significant local peaks based on a selection criterion (e.g. a quality criterion, a signal quality condition). The characteristics/spatial-temporal information of the object may be computed based on the set of selected significant local peaks and frequency values associated with the set of selected significant local peaks.

In one example, the selection criterion may always correspond to select the strongest peaks in a range. While the strongest peaks may be selected, the unselected peaks may still be significant (rather strong).

Unselected significant peaks may be stored and/or monitored as "reserved" peaks for use in future selection in future sliding time windows. As an example, there may be a particular peak (at a particular frequency) appearing consistently over time. Initially, it may be significant but not selected (as other peaks may be stronger). But in later time, the peak may become stronger and more dominant and may be selected. When it became "selected", it may be back-traced in time and made "selected" in the earlier time when it was significant but not selected. In such case, the back-traced peak may replace a previously selected peak in an early time. The replaced peak may be the relatively weakest, or a peak that appear in isolation in time (i.e. appearing only briefly in time).

In another example, the selection criterion may not correspond to select the strongest peaks in the range. Instead, it may consider not only the "strength" of the peak, but the "trace" of the peak—peaks that may have happened in the past, especially those peaks that have been identified for a long time.

For example, if a finite state machine (FSM) is used, it may select the peak(s) based on the state of the FSM. Decision thresholds may be computed adaptively (and/or dynamically) based on the state of the FSM.

A similarity score and/or component similarity score may be computed (e.g. by a server (e.g. hub device), the processor, the Type 1 device, the Type 2 device, a local server, a cloud server, and/or another device) based on a pair of temporally adjacent CI of a TSCI. The pair may come from the same sliding window or two different sliding windows. The similarity score may also be based on a pair of, temporally adjacent or not so adjacent, CI from two different TSCI. The similarity score and/or component similar score may be/comprise: time reversal resonating strength (TRRS), correlation, cross-correlation, auto-correlation, correlation indicator, covariance, cross-covariance, auto-covariance, inner product of two vectors, distance score, norm, metric, quality metric, signal quality condition, statistical characteristics, discrimination score, neural network, deep learning network, machine learning, training, discrimination, weighted averaging, preprocessing, denoising, signal conditioning, filtering, time correction, timing compensation, phase offset compensation, transformation, component-wise operation, feature extraction, finite state machine, and/or another score. The characteristics and/or spatial-temporal information may be determined/computed based on the similarity score.

Any threshold may be pre-determined, adaptively (and/or dynamically) determined and/or determined by a finite state machine. The adaptive determination may be based on time, space, location, antenna, path, link, state, battery life, remaining battery life, available power, available computational resources, available network bandwidth, etc.

A threshold to be applied to a test statistics to differentiate two events (or two conditions, or two situations, or two states), A and B, may be determined. Data (e.g. CI, channel state information (CSI), power parameter, etc.) may be collected under A and/or under B in a training situation. The test statistics may be computed based on the data. Distributions of the test statistics under A may be compared with distributions of the test statistics under B (reference distribution), and the threshold may be chosen according to some criteria. The criteria may comprise: maximum likelihood (ML), maximum aposterior probability (MAP), discriminative training, minimum Type 1 error for a given Type 2 error, minimum Type 2 error for a given Type 1 error, and/or other criteria (e.g. a quality criterion, signal quality condition). The threshold may be adjusted to achieve different sensitivity to the A, B and/or another event/condition/situation/state. The threshold adjustment may be automatic, semi-automatic and/or manual. The threshold adjustment may be applied once, sometimes, often, periodically, repeatedly, occasionally, sporadically, and/or on demand. The threshold adjustment may be adaptive (and/or dynamically adjusted). The threshold adjustment may depend on the object, object movement/location/direction/action, object characteristics/spatial-temporal information/size/property/trait/habit/behavior, the venue, feature/fixture/furniture/barrier/material/machine/living thing/thing/object/boundary/surface/medium that is in/at/of the venue, map, constraint of the map, the event/state/situation/condition, time, timing, duration, current state, past history, user, and/or a personal preference, etc.

A stopping criterion (or skipping or bypassing or blocking or pausing or passing or rejecting criterion) of an iterative algorithm may be that change of a current parameter (e.g. offset value) in the updating in an iteration is less than a threshold. The threshold may be 0.5, 1, 1.5, 2, or another number. The threshold may be adaptive (and/or dynamically adjusted). It may change as the iteration progresses. For the offset value, the adaptive threshold may be determined based on the task, particular value of the first time, the current time offset value, the regression window, the regression analysis, the regression function, the regression error, the convexity of the regression function, and/or an iteration number.

The local extremum may be determined as the corresponding extremum of the regression function in the regression window. The local extremum may be determined based on a set of time offset values in the regression window and a set of associated regression function values. Each of the set of associated regression function values associated with the set of time offset values may be within a range from the corresponding extremum of the regression function in the regression window.

The searching for a local extremum may comprise robust search, minimization, maximization, optimization, statistical optimization, dual optimization, constraint optimization, convex optimization, global optimization, local optimization an energy minimization, linear regression, quadratic regression, higher order regression, linear programming, nonlinear programming, stochastic programming, combinatorial optimization, constraint programming, constraint satisfaction, calculus of variations, optimal control, dynamic programming, mathematical programming, multi-objective optimization, multi-modal optimization, disjunctive programming, space mapping, infinite-dimensional optimization, heuristics, metaheuristics, convex programming, semidefinite programming, conic programming, cone programming, integer programming, quadratic programming, fractional programming, numerical analysis, simplex algorithm, iterative method, gradient descent, subgradient method, coordinate descent, conjugate gradient method, Newton's algorithm, sequential quadratic programming, interior point method, ellipsoid method, reduced gradient method, quasi-Newton method, simultaneous perturbation stochastic approximation, interpolation method, pattern search method, line search, non-differentiable optimization, genetic algorithm, evolutionary algorithm, dynamic relaxation, hill climbing, particle swarm optimization, gravitation search algorithm, simulated annealing, memetic algorithm, differential evolution, dynamic relaxation, stochastic tunneling, Tabu search, reactive search optimization, curve fitting, least square, simulation based optimization, variational calculus, and/or variant. The search for local extremum may be associated with an objective function, loss function, cost function, utility function, fitness function, energy function, and/or an energy function.

Regression may be performed using regression function to fit sampled data (e.g. CI, feature of CI, component of CI) or another function (e.g. autocorrelation function) in a regression window. In at least one iteration, a length of the regression window and/or a location of the regression window may change. The regression function may be linear function, quadratic function, cubic function, polynomial function, and/or another function.

The regression analysis may minimize at least one of: error, aggregate error, component error, error in projection domain, error in selected axes, error in selected orthogonal axes, absolute error, square error, absolute deviation, square deviation, higher order error (e.g. third order, fourth order, etc.), robust error (e.g. square error for smaller error magnitude and absolute error for larger error magnitude, or first kind of error for smaller error magnitude and second kind of error for larger error magnitude), another error, weighted sum (or weighted mean) of absolute/square error (e.g. for wireless transmitter with multiple antennas and wireless receiver with multiple antennas, each pair of transmitter antenna and receiver antenna form a link), mean absolute error, mean square error, mean absolute deviation, and/or mean square deviation, etc. Error associated with different links may have different weights. One possibility is that some links and/or some components with larger noise or lower signal quality metric may have smaller or bigger weight.), weighted sum of square error, weighted sum of higher order error, weighted sum of robust error, weighted sum of the another error, absolute cost, square cost, higher order cost, robust cost, another cost, weighted sum of absolute cost, weighted sum of square cost, weighted sum of higher order cost, weighted sum of robust cost, and/or weighted sum of another cost.

The regression error determined may be an absolute error, square error, higher order error, robust error, yet another error, weighted sum of absolute error, weighted sum of square error, weighted sum of higher order error, weighted sum of robust error, and/or weighted sum of the yet another error.

The time offset associated with maximum regression error (or minimum regression error) of the regression function with respect to the particular function in the regression window may become the updated current time offset in the iteration.

A local extremum may be searched based on a quantity comprising a difference of two different errors (e.g. a difference between absolute error and square error). Each of the two different errors may comprise an absolute error, square error, higher order error, robust error, another error, weighted sum of absolute error, weighted sum of square error, weighted sum of higher order error, weighted sum of robust error, and/or weighted sum of the another error.

The quantity may be compared with a reference data or a reference distribution, such as an F-distribution, central F-distribution, another statistical distribution, threshold, threshold associated with probability/histogram, threshold associated with probability/histogram of finding false peak, threshold associated with the F-distribution, threshold associated the central F-distribution, and/or threshold associated with the another statistical distribution.

The regression window may be determined based on at least one of: the movement (e.g. change in position/location) of the object, quantity associated with the object, the at least one characteristics and/or spatial-temporal information of the object associated with the movement of the object, estimated location of the local extremum, noise characteristics, estimated noise characteristics, signal quality metric, F-distribution, central F-distribution, another statistical distribution, threshold, preset threshold, threshold associated with probability/histogram, threshold associated with desired probability, threshold associated with probability of finding false peak, threshold associated with the F-distribution, threshold associated the central F-distribution, threshold associated with the another statistical distribution, condition that quantity at the window center is largest within the regression window, condition that the quantity at the window center is largest within the regression window, condition that there is only one of the local extremum of the particular function for the particular value of the first time in the regression window, another regression window, and/or another condition.

The width of the regression window may be determined based on the particular local extremum to be searched. The local extremum may comprise first local maximum, second local maximum, higher order local maximum, first local maximum with positive time offset value, second local maximum with positive time offset value, higher local maximum with positive time offset value, first local maximum with negative time offset value, second local maximum with negative time offset value, higher local maximum with negative time offset value, first local minimum, second local minimum, higher local minimum, first local minimum with positive time offset value, second local minimum with positive time offset value, higher local minimum with positive time offset value, first local minimum with negative time offset value, second local minimum with negative time offset value, higher local minimum with negative time offset value, first local extremum, second local extremum, higher local extremum, first local extremum with positive time offset value, second local extremum with positive time offset value, higher local extremum with positive time offset value, first local extremum with negative time offset value, second local extremum with negative time offset value, and/or higher local extremum with negative time offset value.

A current parameter (e.g. time offset value) may be initialized based on a target value, target profile, trend, past trend, current trend, target speed, speed profile, target speed profile, past speed trend, the motion or movement (e.g. change in position/location) of the object, at least one characteristics and/or spatial-temporal information of the object associated with the movement of object, positional quantity of the object, initial speed of the object associated with the movement of the object, predefined value, initial width of the regression window, time duration, value based on carrier frequency of the signal, value based on subcarrier frequency of the signal, bandwidth of the signal, amount of antennas associated with the channel, noise characteristics, signal h metric, and/or an adaptive (and/or dynamically adjusted) value. The current time offset may be at the center, on the left side, on the right side, and/or at another fixed relative location, of the regression window.

In the presentation, information may be displayed with a map of the venue. The information may comprise: location, zone, region, area, corrected location, approximate location, location with respect to (w.r.t.) a map of the venue, location w.r.t. a segmentation of the venue, direction, a path, a path w.r.t. the map and/or the segmentation, a trace (e.g. location within a time window such as the past 5 seconds, or past 10 seconds; the time window duration may be adjusted adaptively (and/or dynamically); the time window duration may be adaptively (and/or dynamically) adjusted w.r.t. speed, acceleration, etc.), a history of a path, approximate regions/zones along a path, a history/summary of past locations, a history of past locations of interest, frequently-visited areas, customer traffic, crowd distribution, crowd behavior, crowd control information, speed, acceleration, motion statistics, breathing rate, heart rate, presence/absence of motion, presence/absence of people or pets or object, presence/absence of vital sign, gesture, gesture control (control of devices using gesture), location-based gesture control, information of a location-based operation, an identity (ID) or identifier of the respect object (e.g. a pet, a person, an self-guided machine/device, a vehicle, a drone, a car, a boat, a bicycle, a self-guided vehicle, a machine with a fan, an air-conditioner, a TV, a machine with a movable part), an identification of a user (e.g. a person), an information of the user, a location/speed/acceleration/direction/motion/gesture/gesture control/motion trace of the user, an ID or identifier of the user, an activity of the user, a state of the user, a sleeping/resting characteristics of the user, an emotional state of the user, a vital sign of the user, an environment information of the venue, a weather information of the venue, an earthquake, an explosion, a storm, a rain, a fire, a temperature, a collision, an impact, a vibration, an event, a door-open event, a door-close event, a window-open event, a window-close event, a fall-down event, a burning event, a freezing event, a water-related event, a wind-related event, an air-movement event, an accident event, a pseudo-periodic event (e.g. running on a treadmill, jumping up and down, skipping rope, somersault, etc.), a repeated event, a crowd event, a vehicle event, a gesture of the user (e.g. a hand gesture, an arm gesture, a foot gesture, a leg gesture, a body gesture, a head gesture, a face gesture, a mouth gesture, an eye gesture, etc.).

The location may be 2-dimensional (e.g. with 2D coordinates), 3-dimensional (e.g. with 3D coordinates). The location may be relative (e.g. w.r.t. a map) or relational (e.g. halfway between point A and point B, around a corner, up the stairs, on top of table, at the ceiling, on the floor, on a sofa, close to point A, a distance R from point A, within a radius of R from point A, etc.). The location may be expressed in rectangular coordinate, polar coordinate, and/or another representation.

The information (e.g. location) may be marked with at least one symbol. The symbol may be time varying. The symbol may be flashing and/or pulsating with or without changing color/intensity. The size may change over time. The orientation of the symbol may change over time. The symbol may be a number that reflects an instantaneous quantity (e.g. vital sign/breathing rate/heart rate/gesture/state/status/action/motion of a user, temperature, network traffic, network connectivity, a status of a device/machine, remaining power of a device, a status of the device, etc.). The rate of change, the size, the orientation, the color, the intensity and/or the symbol may reflect the respective motion. The information may be presented visually and/or described verbally (e.g. using pre-recorded voice, or voice synthesis). The information may be described in text. The information may also be presented in a mechanical way (e.g. an animated gadget, a movement of a movable part).

The user-interface (UI) device may be a smart phone (e.g. iPhone, Android phone), tablet (e.g. iPad), laptop (e.g. notebook computer), personal computer (PC), device with graphical user interface (GUI), smart speaker, device with voice/audio/speaker capability, virtual reality (VR) device, augmented reality (AR) device, smart car, display in the car, voice assistant, voice assistant in a car, etc.

The map may be 2-dimensional, 3-dimensional and/or higher-dimensional. (e.g. a time varying 2D/3D map) Walls, windows, doors, entrances, exits, forbidden areas may be marked on the map. The map may comprise floor plan of a facility. The map may have one or more layers (overlays). The map may be a maintenance map comprising water pipes, gas pipes, wiring, cabling, air ducts, crawl-space, ceiling layout, and/or underground layout.

The venue may be segmented/subdivided/zoned/grouped into multiple zones/regions/geographic regions/sectors/sections/territories/districts/precincts/localities/neighborhoods/areas/stretches/expanse such as bedroom, living room, storage room, walkway, kitchen, dining room, foyer, garage, first floor, second floor, rest room, offices, conference room, reception area, various office areas, various warehouse regions, various facility areas, etc. The segments/regions/areas may be presented in a map. Different regions may be color-coded. Different regions may be presented with a characteristic (e.g. color, brightness, color intensity, texture, animation, flashing, flashing rate, etc.). Logical segmentation of the venue may be done using the at least one heterogeneous Type 2 device, or a server (e.g. hub device), or a cloud server, etc.

Here is an example of the disclosed system, apparatus, and method. Stephen and his family want to install the disclosed wireless motion detection system to detect motion in their 2000 sqft two-storey town house in Seattle, Wash. Because his house has two storeys, Stephen decided to use one Type 2 device (named A) and two Type 1 devices (named B and C) in the ground floor. His ground floor has predominantly three rooms: kitchen, dining room and living room arranged in a straight line, with the dining room in the middle. The kitchen and the living rooms are on opposite end of the house. He put the Type 2 device (A) in the dining room, and put one Type 1 device (B) in the kitchen and the other Type 1 device (C) in the living room. With this placement of the devices, he is practically partitioning the ground floor into 3 zones (dining room, living room and kitchen) using the motion detection system. When motion is detected by the AB pair and the AC pair, the system would analyze the motion information and associate the motion with one of the 3 zones.

When Stephen and his family go out on weekends (e.g. to go for a camp during a long weekend), Stephen would use a mobile phone app (e.g. Android phone app or iPhone app) to turn on the motion detection system. When the system detects motion, a warning signal is sent to Stephen (e.g. an SMS text message, an email, a push message to the mobile phone app, etc.). If Stephen pays a monthly fee (e.g. $10/month), a service company (e.g. security company) will receive the warning signal through wired network (e.g. broadband) or wireless network (e.g. home WiFi, LTE, 3G, 2.5G, etc.) and perform a security procedure for Stephen (e.g. call him to verify any problem, send someone to check on the house, contact the police on behalf of Stephen, etc.).

Stephen loves his aging mother and cares about her well-being when she is alone in the house. When the mother is alone in the house while the rest of the family is out (e.g. go to work, or shopping, or go on vacation), Stephen would turn on the motion detection system using his mobile app to ensure the mother is ok. He then uses the mobile app to monitor his mother's movement in the house. When Stephen uses the mobile app to see that the mother is moving around the house among the 3 regions, according to her daily routine, Stephen knows that his mother is doing ok. Stephen is thankful that the motion detection system can help him monitor his mother's well-being while he is away from the house.

On a typical day, the mother would wake up at around 7 AM. She would cook her breakfast in the kitchen for about 20 minutes. Then she would eat the breakfast in the dining room for about 30 minutes. Then she would do her daily exercise in the living room, before sitting down on the sofa in the living room to watch her favorite TV show. The motion detection system enables Stephen to see the timing of the movement in each of the 3 regions of the house. When the motion agrees with the daily routine, Stephen knows roughly that the mother should be doing fine. But when the motion pattern appears abnormal (e.g. there is no motion until 10 AM, or she stayed in the kitchen for too long, or she remains motionless for too long, etc.), Stephen suspects something is wrong and would call the mother to check on her. Stephen may even get someone (e.g. a family member, a neighbor, a paid personnel, a friend, a social worker, a service provider) to check on his mother.

At some time, Stephen feels like repositioning the Type 2 device. He simply unplugs the device from the original AC power plug and plug it into another AC power plug. He is happy that the wireless motion detection system is plug-and-play and the repositioning does not affect the operation of the system. Upon powering up, it works right away.

Sometime later, Stephen is convinced that our wireless motion detection system can really detect motion with very high accuracy and very low alarm, and he really can use the mobile app to monitor the motion in the ground floor. He decides to install a similar setup (i.e. one Type 2 device and two Type 1 devices) in the second floor to monitor the bedrooms in the second floor. Once again, he finds that the system set up is extremely easy as he simply needs to plug the Type 2 device and the Type 1 devices into the AC power plug in the second floor. No special installation is needed. And he can use the same mobile app to monitor motion in the ground floor and the second floor. Each Type 2 device in the ground floor/second floor can interact with all the Type 1 devices in both the ground floor and the second floor. Stephen is happy to see that, as he doubles his investment in the Type 1 and Type 2 devices, he has more than double the capability of the combined systems.

According to various embodiments, each CI (CI) may comprise at least one of: channel state information (CSI), frequency domain CSI, frequency representation of CSI, frequency domain CSI associated with at least one sub-band, time domain CSI, CSI in domain, channel response, estimated channel response, channel impulse response (CIR), channel frequency response (CFR), channel characteristics, channel filter response, CSI of the wireless multipath channel, information of the wireless multipath channel, timestamp, auxiliary information, data, meta data, user data, account data, access data, security data, session data, status data, supervisory data, household data, identity (ID), identifier, device data, network data, neighborhood data, environment data, real-time data, sensor data, stored data, encrypted data, compressed data, protected data, and/or another CI. In one embodiment, the disclosed system has hardware components (e.g. wireless transmitter/receiver with antenna, analog circuitry, power supply, processor, memory, etc.) and corresponding software components. According to various embodiments of the present teaching, the disclosed system includes Bot (referred to as a Type 1 device) and Origin (referred to as a Type 2 device) for vital sign detection and monitoring. Each device comprises a transceiver, a processor and a memory.

The disclosed system can be applied in many cases. In one example, the Type 1 device (transmitter) may be a small WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. In one example, the Type 2 (receiver) may be a WiFi-enabled device resting on the table. It may also be a WiFi-enabled television (TV), set-top box (STB), a smart speaker (e.g. Amazon echo), a smart refrigerator, a smart microwave oven, a mesh network router, a mesh network satellite, a smart phone, a computer, a tablet, a smart plug, etc. The Type 1 device and Type 2 devices may be placed in/near a conference room to count people. The Type 1 device and Type 2 devices may be in a well-being monitoring system for older adults to monitor their daily activities and any sign of symptoms (e.g. dementia, Alzheimer's disease). The Type 1 device and Type 2 device may be used in baby monitors to monitor the vital signs (breathing) of a living baby. The Type 1 device and Type 2 devices may be placed in bedrooms to monitor quality of sleep and any sleep apnea. The Type 1 device and Type 2 devices may be placed in cars to monitor well-being of passengers and driver, detect any sleeping of driver and detect any babies left in a car. The Type 1 device and Type 2 devices may be used in logistics to prevent human trafficking by monitoring any human hidden in trucks and containers. The Type 1 device and Type 2 devices may be deployed by emergency service at disaster area to search for trapped victims in debris. The Type 1 device and Type 2 devices may be deployed in an area to detect breathing of any intruders. There are numerous applications of wireless breathing monitoring without wearables.

Hardware modules may be constructed to contain either the Type 1 transceiver and the Type 2 transceiver. The hardware modules may be sold to/used by variable brands to design, build and sell final commercial products. Products using the disclosed system and/or method may be home/office security products, sleep monitoring products, WiFi products, mesh products, TV, STB, entertainment system, HiFi, speaker, home appliance, lamps, stoves, oven, microwave oven, table, chair, bed, shelves, tools, utensils, torches, vacuum cleaner, smoke detector, sofa, piano, fan, door, window, door/window handle, locks, smoke detectors, car accessories, computing devices, office devices, air conditioner, heater, pipes, connectors, surveillance camera, access point, computing devices, mobile devices, LTE devices, 3G/4G/5G/6G devices, UMTS devices, 3GPP devices, GSM devices, EDGE devices, TDMA devices, FDMA devices, CDMA devices, WCDMA devices, TD-SCDMA devices, gaming devices, eyeglasses, glass panels, VR goggles, necklace, watch, waist band, belt, wallet, pen, hat, wearables, implantable device, tags, parking tickets, smart phones, etc.

The summary may comprise at least one of: an analytics, a selected time window, a subsampling, a transform, a projection, etc. The presenting may comprise presenting at least one of: a monthly view, a weekly view, a daily view, a simplified view, a detailed view, a cross-sectional view, a small form-factor view, a large form-factor view, a color-coded view, a comparative view, a summary view, an animation, a web view, a voice announcement, and another presentation related to the periodic or repetition characteristics of the repeating motion.

A Type 1 device and/or a Type 2 device may be an antenna, a device with antenna, a device with a housing (e.g. for radio, antenna, data/signal processing unit, wireless IC, circuits, etc.), device that has interface to attach/connect to/link antenna, device that is interfaced to/attached to/connected to/linked to another device/system/computer/phone/network/data aggregator, device with a user interface(UI)/graphical UI/display, device with wireless transceiver, device with wireless transmitter, device with wireless receiver, internet-of-thing (IoT) device, device with wireless network, device with both wired networking and wireless networking capability, device with wireless integrated circuit (IC), Wi-Fi device, device with Wi-Fi chip (e.g. 802.11a/b/g/n/ac/ax standard compliant, etc.), Wi-Fi access point (AP), Wi-Fi client, Wi-Fi router, Wi-Fi repeater, Wi-Fi hub, Wi-Fi mesh network router/hub/AP, wireless mesh network router, adhoc network device, wireless mesh network device, mobile device (e.g. 2G/2.5G/3G/3.5G/4G/LTE/5G/6G/7G, UMTS, 3GPP, GSM, EDGE, TDMA, FDMA, CDMA, WCDMA, TD-SCDMA, etc.), cellular device, base station, mobile network base station, mobile network hub, mobile network compatible device, LTE device, device with LTE module, mobile module (e.g. circuit board with mobile-enabling chip (IC) such as Wi-Fi chip, LTE chip, BLE chip, etc.), Wi-Fi chip (IC), LTE chip, BLE chip, device with mobile module, smart phone, companion device (e.g. dongle, attachment, plugin) for smart phones, dedicated device, plug-in device, AC-powered device, battery-powered device, device with processor/memory/set of instructions, smart device/gadget/items: clock, stationary, pen, user-interface, paper, mat, camera, television (TV), set-top-box, microphone, speaker, refrigerator, oven, machine, phone, wallet, furniture, door, window, ceiling, floor, wall, table, chair, bed, night-stand, air-conditioner, heater, pipe, duct, cable, carpet, decoration, gadget, USB device, plug, dongle, lamp/light, tile, ornament, bottle, vehicle, car, AGV, drone, robot, laptop, tablet, computer, harddisk, network card, instrument, racket, ball, shoe, wearable, clothing, glasses, hat, necklace, food, pill, small device that moves in the body of creature (e.g. in blood vessels, in lymph fluid, digestive system, etc.), and/or another device. The Type 1 device and/or Type 2 device may be communicatively coupled with: the internet, another device with access to internet (e.g. smart phone), cloud server (e.g. hub device), edge server, local server, and/or storage. The Type 1 device and/or the Type 2 device may operate with local control, can be controlled by another device via a wired/wireless connection, can operate automatically, or can be controlled by a central system that is remote (e.g. away from home).

In one embodiment, a Type B device may be a transceiver that may perform as both Origin (a Type 2 device, a Rx device) and Bot (a Type 1 device, a Tx device), i.e., a Type B device may be both Type 1 (Tx) and Type 2 (Rx) devices (e.g. simultaneously or alternately), for example, mesh devices, a mesh router, etc.

In one embodiment, a Type A device may be a transceiver that may only function as Bot (a Tx device), i.e., Type 1 device only or Tx only, e.g., simple IoT devices. It may have the capability of Origin (Type 2 device, Rx device), but somehow it is functioning only as Bot in the embodiment.

All the Type A and Type B devices form a tree structure. The root may be a Type B device with network (e.g. internet) access. For example, it may be connected to broadband service through a wired connection (e.g. Ethernet, cable modem, ADSL/HDSL modem) connection or a wireless connection (e.g. LTE, 3G/4G/5G, WiFi, Bluetooth, microwave link, satellite link, etc.).

In one embodiment, all the Type A devices are leaf node. Each Type B device may be the root node, non-leaf node, or leaf node.

FIG. 1 illustrates an exemplary demonstration of a Smart TV 110, according to some embodiments of the present teaching. As shown in FIG. 1, hang on the wall of the living room, the Smart TV 110 has one Origin 111 and one Bot 112, i.e., two WiFi transceivers, embedded inside of it to sense the wireless propagation environment of the living room. When the user is pacing around in front of the TV 110 within a certain distance, e.g. 2 to 3 feet from the TV, the TV 110 will detect the user's motion by sensing the environment with the Origin 111 and the Bot 112, and capturing and analyzing the channel state information (CSI) of a wireless multipath channel between the Origin 111 and the Bot 112. The area within the certain distance of the TV 110 is called a trigger zone 120. In response to that detection of the user's motion within the trigger zone 120, the TV 110 may be automatically turned on. When the user is watching the TV 110 while sitting on the sofa, even it might be far away from the TV 110, the Origin 111 and the Bot 112 can still capture the perturbation introduced to the CSI by the motion or vital signals of the present user. Only when no one is in the living room, the propagation environment will be quiet and the CSI will be consistent along the time and can be sensed by the Origin 111 and the Bot 112 inside the Smart TV 110. In other words, with the help of the Origin 111 and the Bot 112 inside the Smart TV 110, the Smart TV 110 can sense the indoor environment wirelessly and differentiate between different indoor states: (S1) when the user is pacing close to the TV 110 within the target area (2 to 3 feet), (S2) when the user is sitting on the sofa and watching the TV 110 (e.g., daily activity inside the living room), and (S3) when the room is empty and no one is there.

In a designed scheme of one embodiment, the Smart TV 110 will turn on or off automatically as a response to the three detected indoor states. When the Smart TV 110 is on (or off) and state (S1) is detected, the TV 110 will be turned off (or on) immediately. When the TV 110 is on and state (S2) is detected, the TV 110 will remain as on. When the TV 110 is on and state (S3) is detected for a certain time period, the TV 110 will enter into a countdown mode. During the count-down period and before the countdown limit is reached, if the state (S2) is detected, the TV 110 will remain on and the count-down mode is reset and disabled. However, if the state (S3) persists during the count-down period, the TV 110 will be shut down when the countdown limit is reached.

In the Smart TV 110, the Bot 112 keeps transmitting channel probing signals to the Origin 111 at a given sounding rate 1/Ts where Ts is the channel probing interval in seconds. Based on each received channel probing signal, the Origin 111 can estimate the channel state information (CSI). For every 1/Ts CSI, a motion statistic value (metric) is derived as the averaged auto-correlation value between adjacent CSIs for a total of M consecutive CSIs. Due to the nature of multipath propagation, the CSI will be disturbed when users are inside the room and different activities will result in a different motion pattern in the CSIs. When the motion is close to the Smart TV 110 (the Origin 111 and the Bot 112), a larger motion statistic value will be produced than the one associated to when the motion is away from the TV 110. When there is no motion inside the room, the corresponding motion statistics will be very small, e.g. around 0. Hence, by using motion statistics, the aforementioned three indoor states can be categorized well.

Different algorithms are disclosed to ensure an accuracy as well as a robustness of the disclosed Smart TV system. One exemplary algorithm is described below.

(A) To detect state (S1) when the user is pacing in front of the TV 110, a first-in-first-out buffer B_1 with a fixed length W_1 is used to store the latest motion statistics calculated from incoming CSIs. The median value X_1 of all elements in buffer B_1 is used as the metric. X_1 keeps updating and is compared with a predefined threshold R_1. When X_1>R_1, it is determined that state (S1) is detected and the Smart TV will be turned on (or off) if its current state is off (or on).

(B) Meanwhile, to detect state (S3) when no one is inside the room, another first-in-first-out buffer B_2 with a fixed length W_2 is used to store the latest motion statistics calculated from incoming CSIs. The median value X_2 of all elements in buffer B_2 is used as the metric. X_2 keeps being updated and is compared with a predefined threshold R_2. When X_2<R_2, it is determined that state (S3) is detected and the Smart TV will enter the countdown mode with the countdown limit being T_0.

During the countdown mode and before the limit T_0 is reached, the Origin 111 and the Bot 112 keeps sensing the indoor propagation environment and updating the buffer B_1 and B_2 with latest motion statistics. Meanwhile, a new first-in first-out motion statistics buffer B_3 is opened with length W_3 and it is aimed to detect if the state (S2) or any motion happens during this period. The median value X_3 of all elements in buffer B_3 is used as the metric and compared with a predefined threshold R_3. When X_3>R_3, it is determined that state (S2) is detected, i.e., there is motion or the user present in the room.

During the countdown period, if the state (S2) is detected, the countdown will be terminated and the Smart TV 110 will not be shut down. Otherwise, the Smart TV 110 will automatically be shut down when the countdown limit is reached.

(C) The length of each buffer is adjustable. In one embodiment, W_1 is 5 seconds, W_2 is 15 seconds, W_3 is 5 seconds and T_0 is 30 seconds. The threshold of R_1, R_2, and R_3 can be adjusted manually or learned through a training process during the initial set-up.

The Smart TV 110 disclosed herein may display any video on a TV screen. In one embodiment, the video can be paused and/or resumed automatically as a response to the three detected indoor states: (S1) when the user is pacing close to the TV 110 within the target area (2 to 3 feet), (S2) when the user is sitting on the sofa and watching the TV 110 (e.g., daily activity inside the living room), and (S3) when the room is empty and no one is there. When the TV 110 is on and playing any video on the screen, if the state (S1) is detected, the TV 110 will immediately pause and start a countdown period T_1. During the countdown period of T_1, if the state (S1) is detected again, the TV 110 will resume and start to play from the paused scene. If state (S1) is never detected while the state (S2) is detected, the TV 110 will remain paused with its screen being on and showing the paused scene. However, if the state (S3) keeps being detected during the countdown period of T_1, i.e. none of the state (S1) or the state (S2) has been detected before the countdown limit T_1 is reached, the TV 110 will enter the sleep mode with the display being off and start another countdown period T_2. During the countdown period of T_2, if the state (S1) is detected, the TV 110 will immediately light up and start to play from the paused scene. If the state (S2) is detected instead of the state (S1), the TV 110 will immediately light up, stay in the pause mode, and show the paused screen. However, if before the limit T_2 is reached, none of the state (S1) or the state (S2) has ever been detected, i.e., the TV 110 detects the state (S3) all the time, then the TV 110 which is in the sleep mode will turn off automatically, but remember the last scene before it is paused.

Another exemplary algorithm is described below to ensure the accuracy as well as the robustness of the disclosed Smart TV system.

(A) To detect the state (S1) when the user is pacing in front of the TV 110, a first-in-first-out buffer B_1 with a fixed length W_1 is used to store the latest motion statistics calculated from incoming CSIs. The median value X_1 of all elements in buffer B_1 is used as the metric. X_1 keeps updating and is compared with a predefined threshold R_1. When X_1>R_1, it is determined that state (S1) is detected and the Smart TV will be paused or resumed given its current state. If the current state of the Smart TV is being paused, the Smart TV 110 will immediately resume to play from the paused scene. However, if the Smart TV 110 was playing a movie and it is being paused as a response to the detection of the state (S1), a countdown mode of limit T_1 will be started immediately to decide if the Smart TV enter the sleep mode or not.

(B) Meanwhile, to detect the state (S3) when no one is inside the room, another first-in-first-out buffer B_2 with a fixed length W_2 is used to store the latest motion statistics calculated from incoming CSIs. The median value X_2 of all elements in buffer B_2 is used as the metric. X_2 keeps being updated and is compared with a predefined threshold R_2. When X_2<R_2, it is determined that state (S3) is detected.

(C) Moreover, a first-in first-out motion statistics buffer B_3 is opened with length W_3 and it is aimed to detect if the state (S2) or any motion happens during this period. The median value X_3 of all elements in buffer B_3 is used as the metric and compared with a predefined threshold R_3. When X_3>R_3, it is determined that state (S2) is detected, i.e., there is motion or the user present in the room.

(D) During the countdown of T_1 and before the limit T_1 is reached, the Origin and the Bot keeps sensing the indoor propagation environment and updating the buffer B_1, B_2, and B_3 with latest motion statistics. If the state (S1) is detected before the limit T_1 is reached, the Smart TV 110 will immediately resume and continue to play from the paused scene, and the countdown will be terminated. If the state (S1) is not detected but the state (S2) is detected before the limit T_1 is reached, the countdown of T_1 will be reset and started over again while the Smart TV remains in the paused mode. On the other hand, if none of the state (S1) or the state (S2) is detected, i.e., the Origin and the Bot in the Smart TV keeps detecting state (S3), the TV 110 will enter the sleep mode with the display being off when the countdown limit T_1 is reached.

(E) As soon as the Smart TV enters the sleep mode, a new countdown of limit T_2 starts. During the countdown of T_2, the Smart TV 110 keeps its display off until any of the following three cases happens. If the state (S1) is detected, the countdown of T_2 will be terminated and the Smart TV will light up and resume to play from the paused scene immediately. If the state (S2) is detected, the countdown of T_2 will be terminated while the countdown of T_1 will start over again. Meanwhile, the Smart TV will light up, remain paused with the display showing the paused scene. If the state (S3) keeps being detected, i.e., none of the state (S1) or the state (S2) is detected, the Smart TV 110 in the sleep mode will be turned off automatically at the time when the countdown limit T_2 is reached. The length of each buffer is adjustable. The threshold of R_1, R_2, and R_3 can be adjusted manually or learned through a training process during the initial set-up.

In one embodiment, a wireless proximity monitoring device like a Smart TV is able to detect a motion anywhere in the venue including the proximity or a target proximity region of the Smart TV, while the Smart TV is only interested in detecting a motion in the target proximity region. For example, by controlling its sensitivity parameters, the Smart TV can restrict its motion detection to within the target proximity region, but not outside the region. By adjusting the sensitivity setting, the Smart TV can change the coverage of the target proximity region, and only triggers the TV to turn on, off, pause or resume after determining the motion is within the target proximity region.

In one embodiment, the Smart TV can change the coverage of the target proximity region by adjusting some thresholds related to the motion, e.g. motion is detected if T1<motion statistics<T2. In this manner, the target proximity region or trigger zone may be somewhat circular, instead of directional, in shape. To have a directional proximity, one can use multiple Bots (i.e. Type 1 device, or Tx) and one Origin (i.e. Type 2 device, or Rx). (Alternatively, one can use multiple Origins and one Bot.) For proximity motion detection between Bot 1 and Origin (in direction 1), the system uses a set of thresholds (T1 and T2). For proximity motion detection between Bot 2 and Origin (in direction 2), the system uses a different set of thresholds (T1' and T2'). In this manner, a directional target proximity region (e.g. along direction 1, or along direction 2) can be determined. For example, Bot 1 may be a TV; Bot 2 may be an Amazon Echo smart speaker; and Origin may be a home router.

Figure 2:
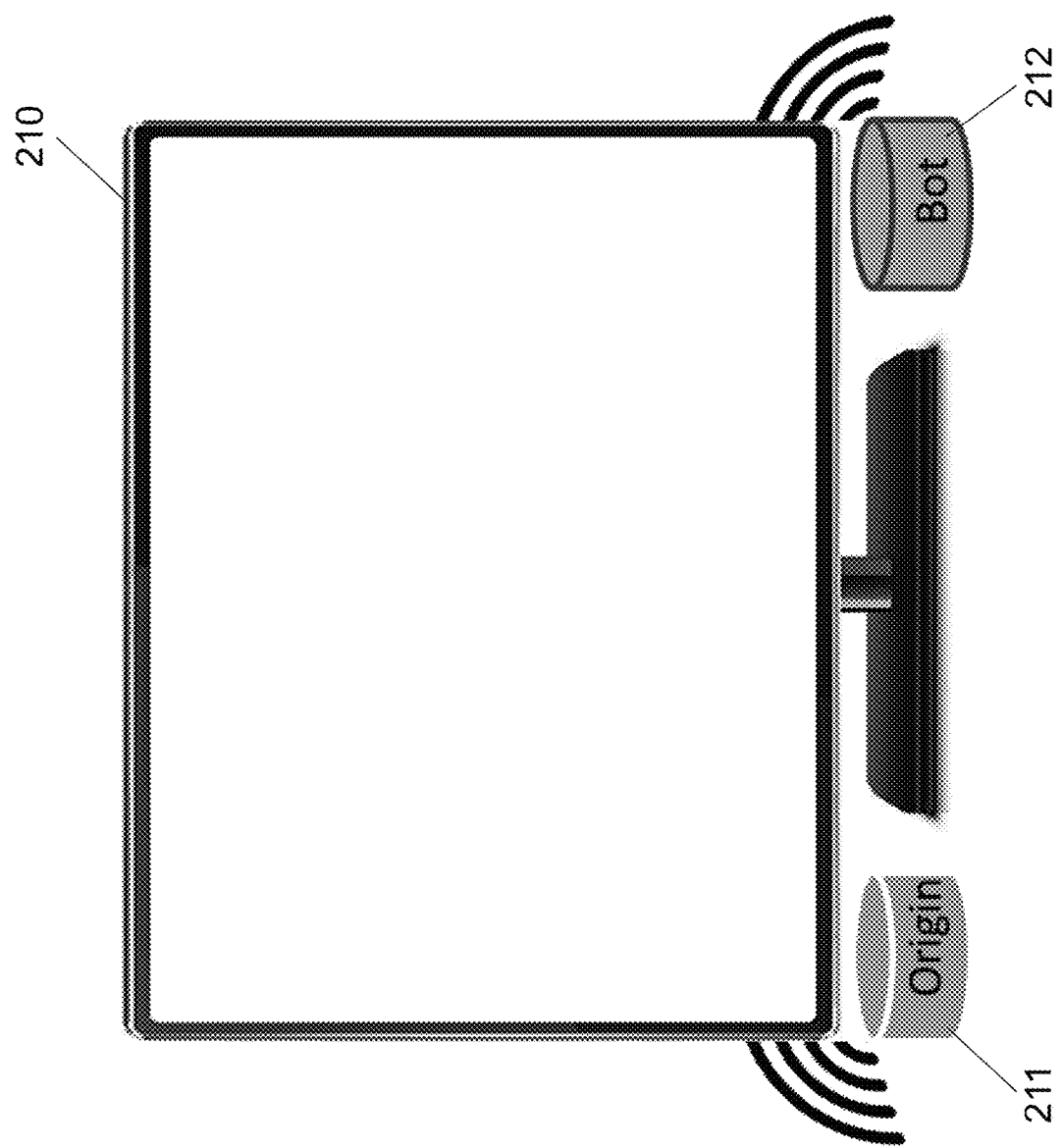
FIG. 2 illustrates an exemplary setting of Smart TV with deployment of devices under the TV, according to some embodiments of the present teaching.

To validate and demonstrate the idea of Smart TV, experiments are conducted and the set-up is shown in FIG. 2 where the Origin 211 and the Bot 212 are put at the left and right boundary of the TV 210, right under the TV 210.

Figure 3:
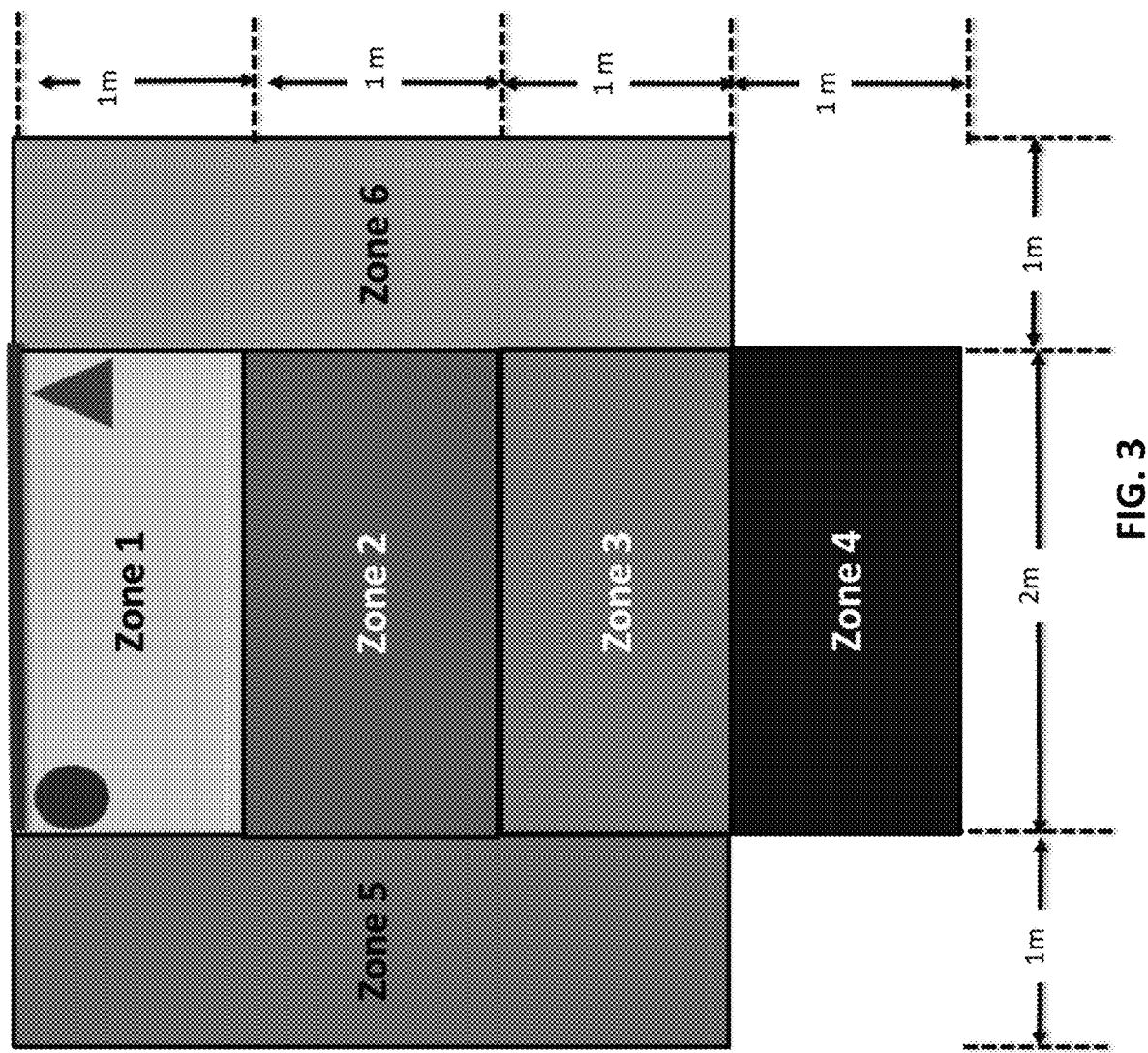
FIG. 3 illustrates an exemplary experiment setting of Smart TV with area partition in front of the TV, according to some embodiments of the present teaching.

In one embodiment, the space in front of the test TV 210 is partitioned into 6 zones as shown in FIG. 3 and the Zone 1 which is within 1 meter from the TV is considered as the intended area of the state (S1).

Figure 4:
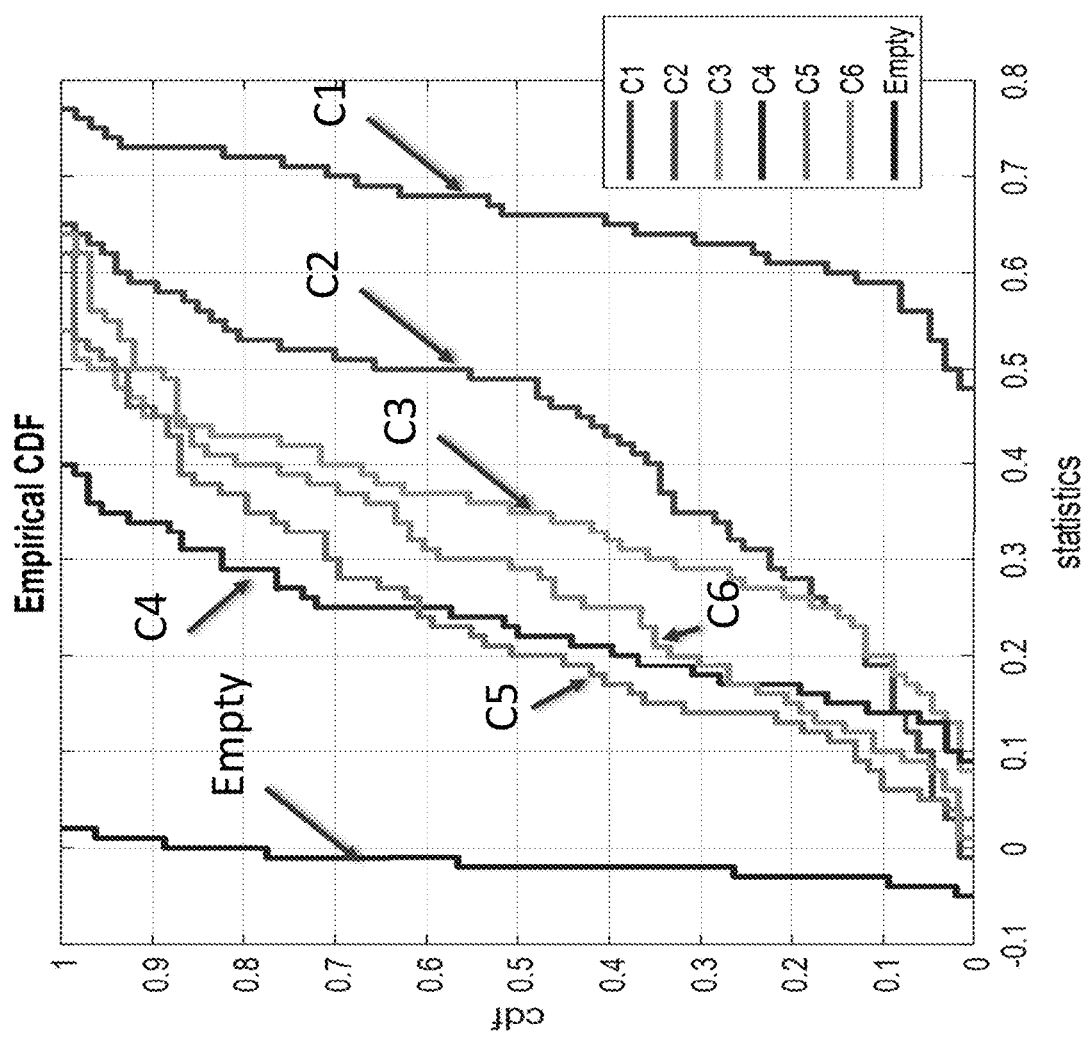
FIG. 4 illustrates an exemplary distribution of motion statistics when the user is pacing at different areas and when the environment is empty, according to some embodiments of the present teaching.

The CSI between the Origin 211 and the Bot 212 can be collected to calculate the motion statistics for cases when one tester is pacing in each zone for 1 minute and for the case when the room is empty for 1 minute. The distributions of statistics corresponding to different scenarios are plotted as the cumulative distribution function (CDF) in FIG. 4, where the legend "CX" means the scenario of user pacing in Zone X. It is clear that almost 90% of the statistics for an empty room are below 0, while almost 90% of statistics of pacing in Zone 1 are above 0.6. For other motion inside the room, most of the motion statistics fall into the range of 0.1 to 0.5. Hence, with the help of motion statistics, the disclosed Smart TV is capable of differentiating between those 3 indoor states.

Figure 5:
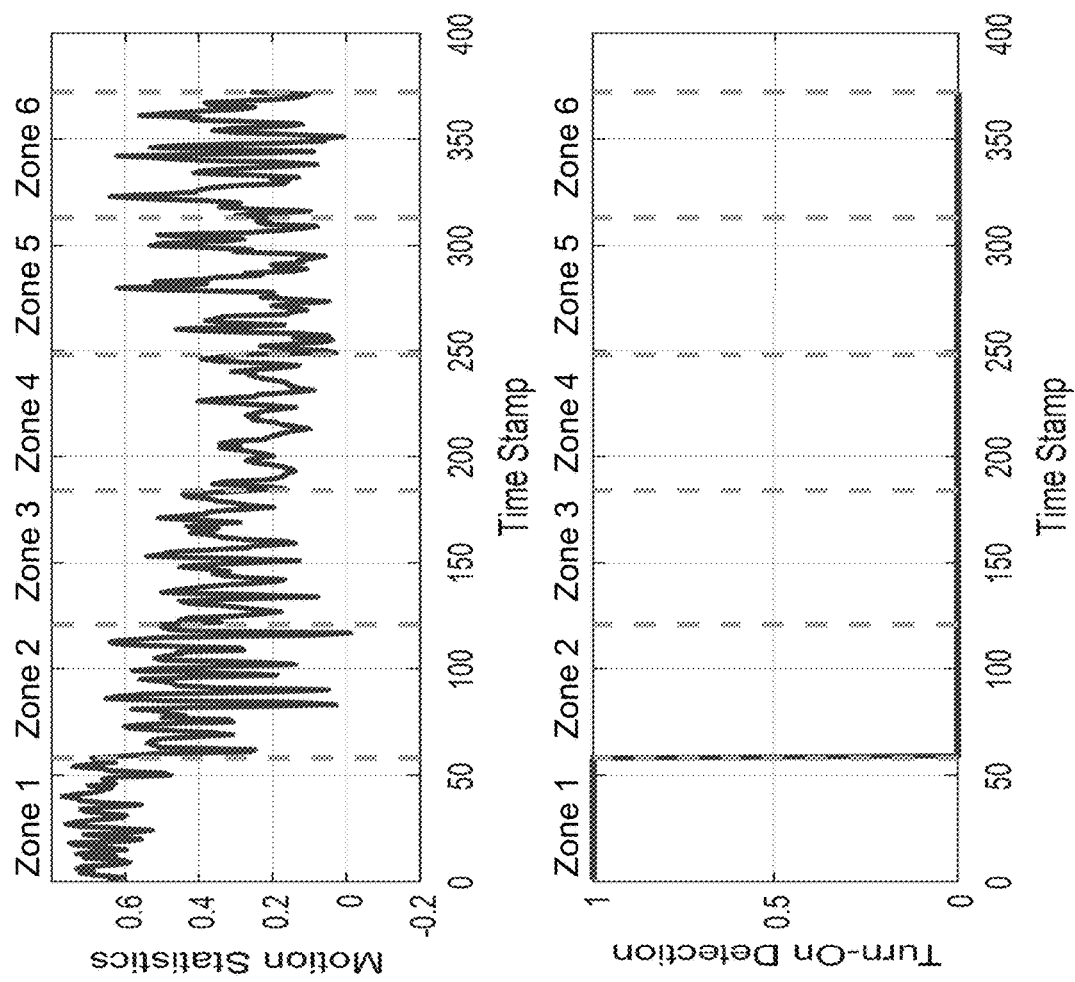
FIG. 5 illustrates exemplary experimental results of motion statistics of pacing at different areas and the corresponding system turn-on detection outputs, according to some embodiments of the present teaching.

FIG. 5 shows the motion statistics and the system output (turn-on detection) along the time for the user pacing at different zones. When the turn-on detection is one, the Smart TV will be turned on (off) automatically. 100% of detection is achieved for Zone 1, i.e. the intended trigger zone, and 0 false alarm for other zones.

Figure 6:
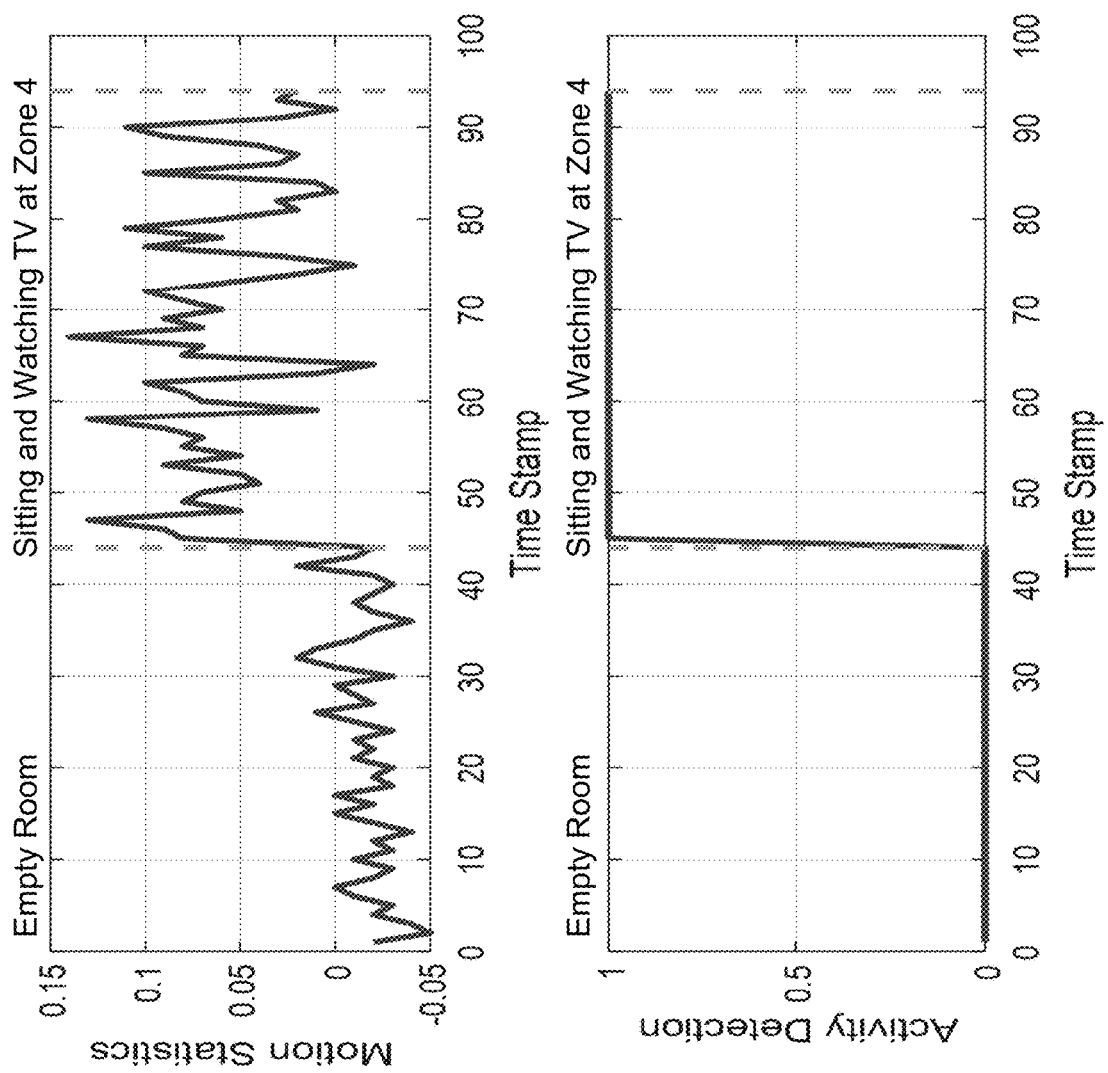
FIG. 6 illustrates exemplary experimental results of motion statistics of an empty room vs one user watching TV, and the corresponding system activity detection outputs, according to some embodiments of the present teaching.

FIG. 6 shows the motion statistics and the system output (activity detection) along the time for both the scenarios of an empty room and someone sitting in Zone 4. When the activity detection is 1, the TV will not be turned off. When the activity detection is 0, the TV will be turned off after the countdown. According to FIG. 6, the motion statistics is sensitive and capable of detecting tiny and distant motion, while maintaining its robustness for an empty room.

Figure 7:
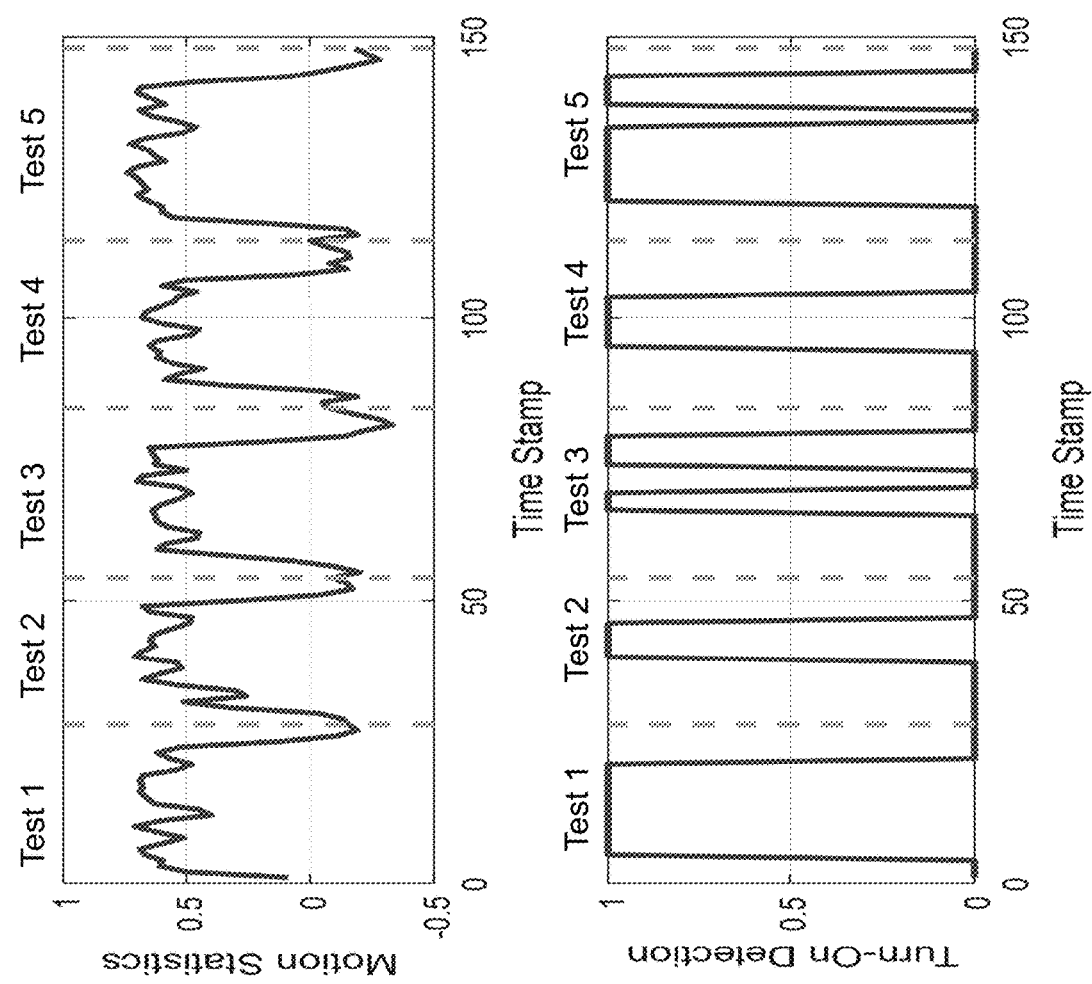
FIG. 7 illustrates exemplary experimental results of motion statistics of 5 turn-on tests, and the corresponding system activity detection outputs, according to some embodiments of the present teaching.
Figure 8:
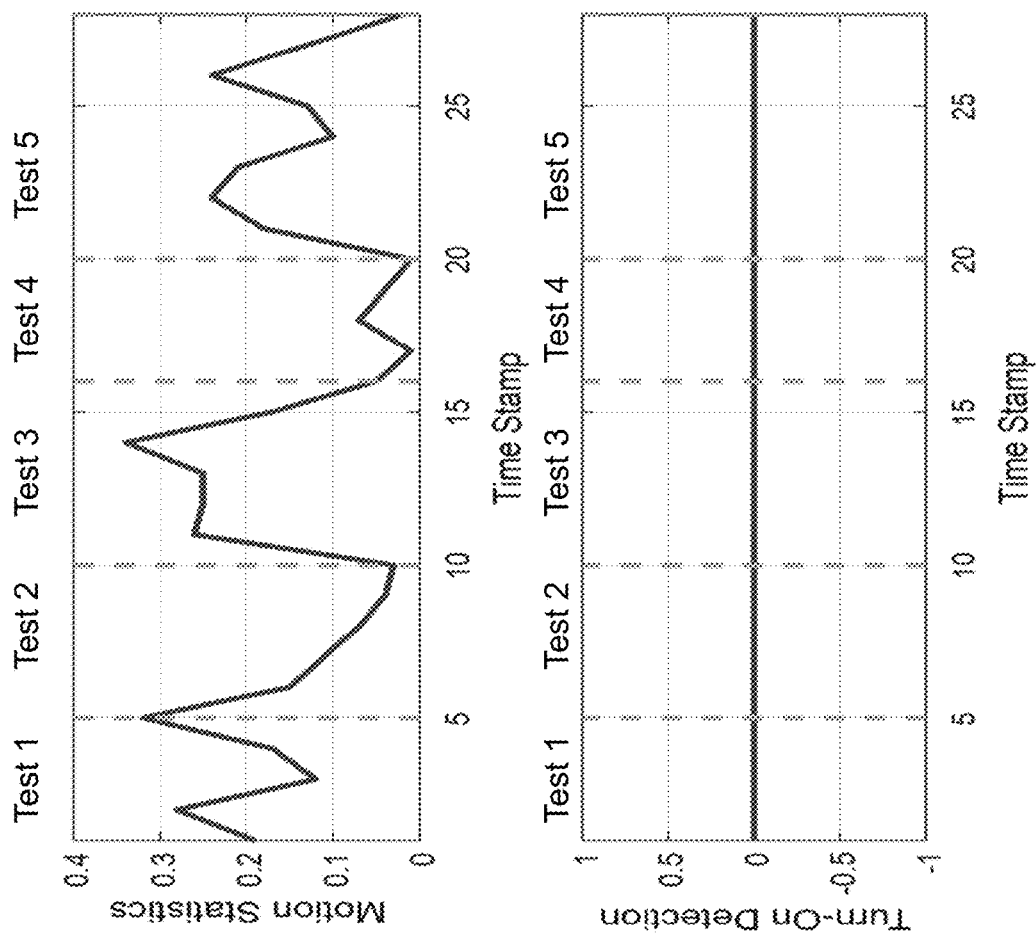
FIG. 8 illustrates exemplary experimental results of motion statistics of 5 passing-by tests, and the corresponding system activity detection outputs, according to some embodiments of the present teaching.

Furthermore, FIG. 7 and FIG. 8 show results of 5 turn-on tests and 5 passing-by tests. As the user is intentionally pacing in Zone 1 to activate the state (S1), the disclosed Smart TV system can always capture and respond to it quickly and accurately. When the user is only walking through Zone 1 randomly without an intention to activate the state (S1), the disclosed Smart TV system will never produce a false alarm, which demonstrates its robustness.

By utilizing the CSI that characterizes the indoor environment to detect and distinguish different indoor environments, the disclosed Smart TV system is intelligent and capable of turning on and off the TV automatically based on the indoor states of when no one is in the room, when the user is within the room performing daily activities and/or when the user is pacing in front of the TV. The disclosed Smart TV system can detect motion in close proximity, and quickly respond to it. Meanwhile, the disclosed system can also be extended to other smart appliances, such as the refrigerator, the electric fireplace, the display screen for advertising and so on.

Figure 9:
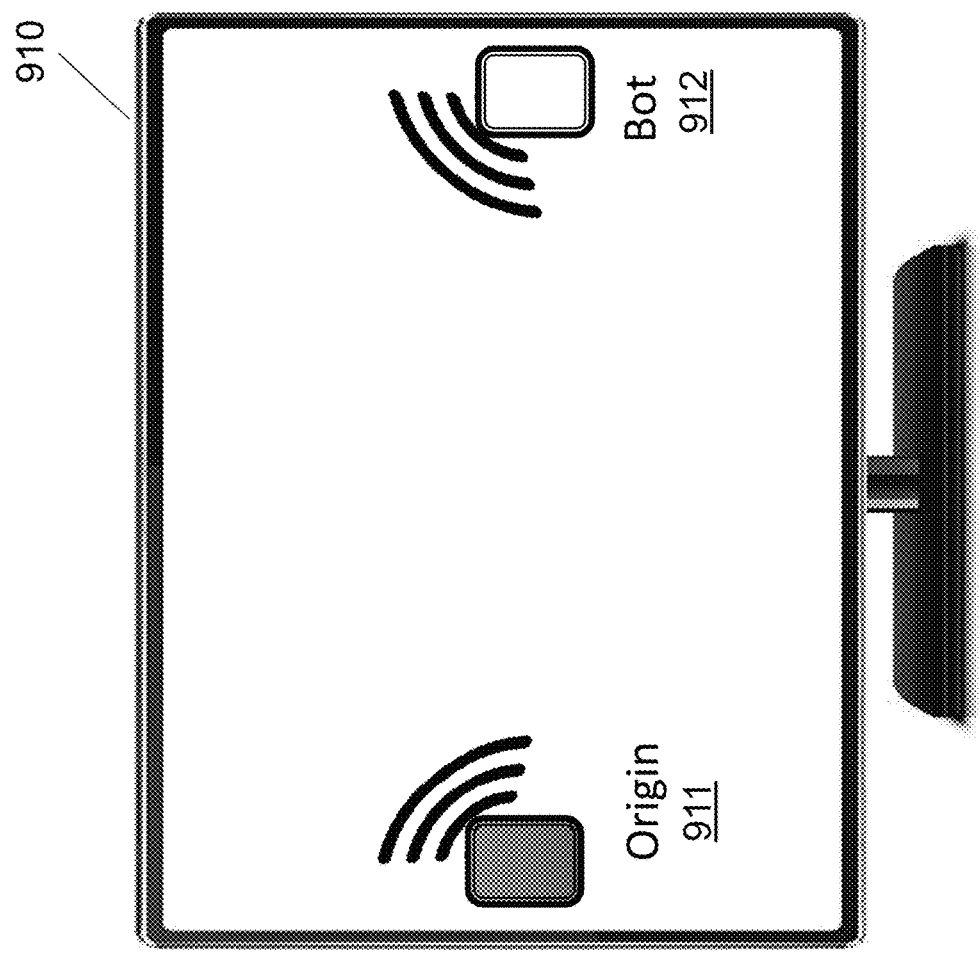
FIG. 9 illustrates an exemplary setting of Smart TV with deployment of devices inside the TV, according to some embodiments of the present teaching.
Figure 10:
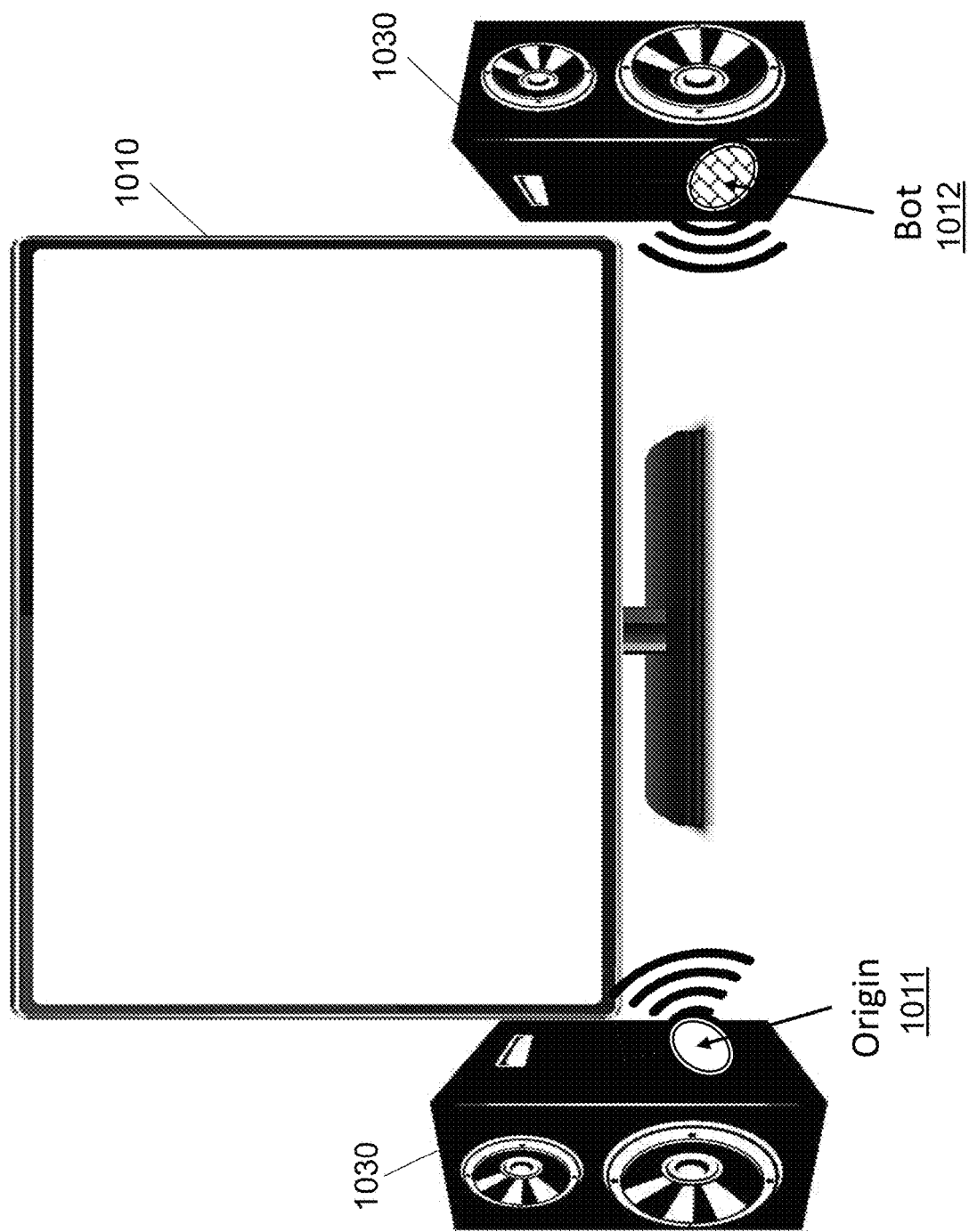
FIG. 10 illustrates an exemplary setting of Smart TV with Origin and Bot installed in a speaker close to the TV, according to some embodiments of the present teaching.
Figure 11:
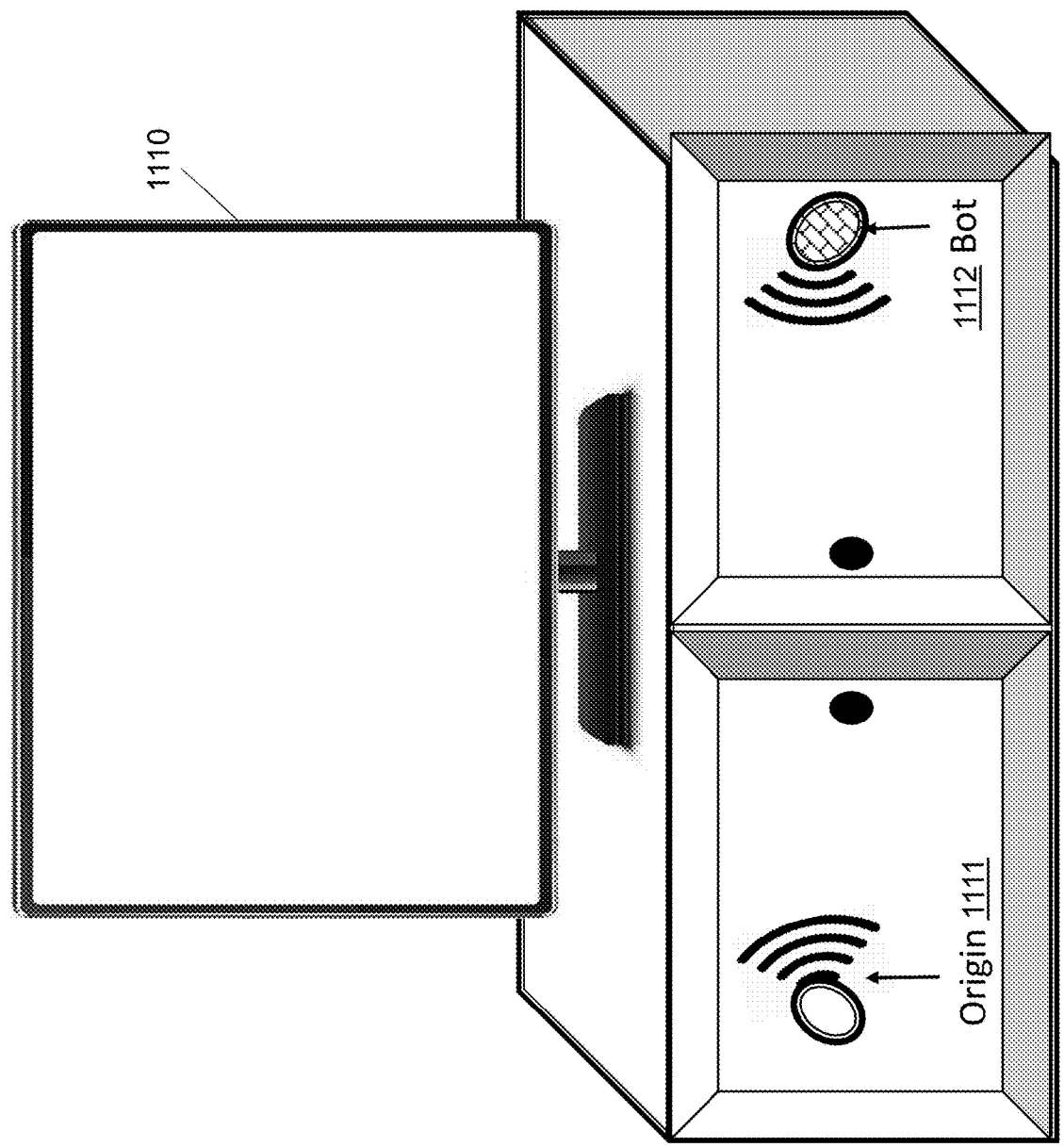
FIG. 11 illustrates an exemplary setting of Smart TV with Origin and Bot installed on a table close to the TV, according to some embodiments of the present teaching.

FIG. 9 illustrates another exemplary setting of Smart TV 910 where the Origin 911 and/or Bot 912 may be integrated into the TV 910 for presence detection. FIG. 10 illustrates another exemplary setting of Smart TV 1010 where the Origin 1011 and/or Bot 1012 may be installed in a speaker 1030 placed in front of the TV 1010 for presence detection. FIG. 11 illustrates another exemplary setting of Smart TV 1110, with the TV 1110 placed on a table 1120, and the Origin 1111 and Bot 1112 installed on the table 1120. The table 1120 can be computer furniture to house the computer, or entertainment center to house the TV.

Figure 12:
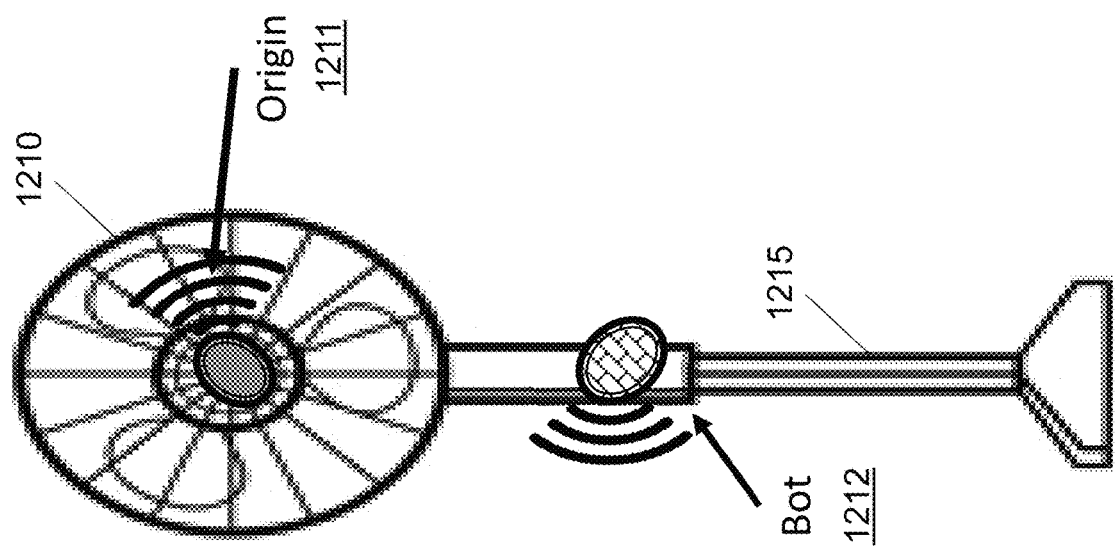
FIG. 12 illustrates an exemplary setting of Smart fan with Origin and Bot installed on the high stand of the fan, according to some embodiments of the present teaching.

FIG. 12 illustrates another scenario of a smart fan 1210. The fan 1210 may be a standing fan with a high stand 1215 and the Origin 1211 and/or Bot 1212 may be installed on the high stand 1215. When a person is detected, either through motion detection or vital signs (such as breathing) detection, the fan 1210 can be turned on.

Figure 13:
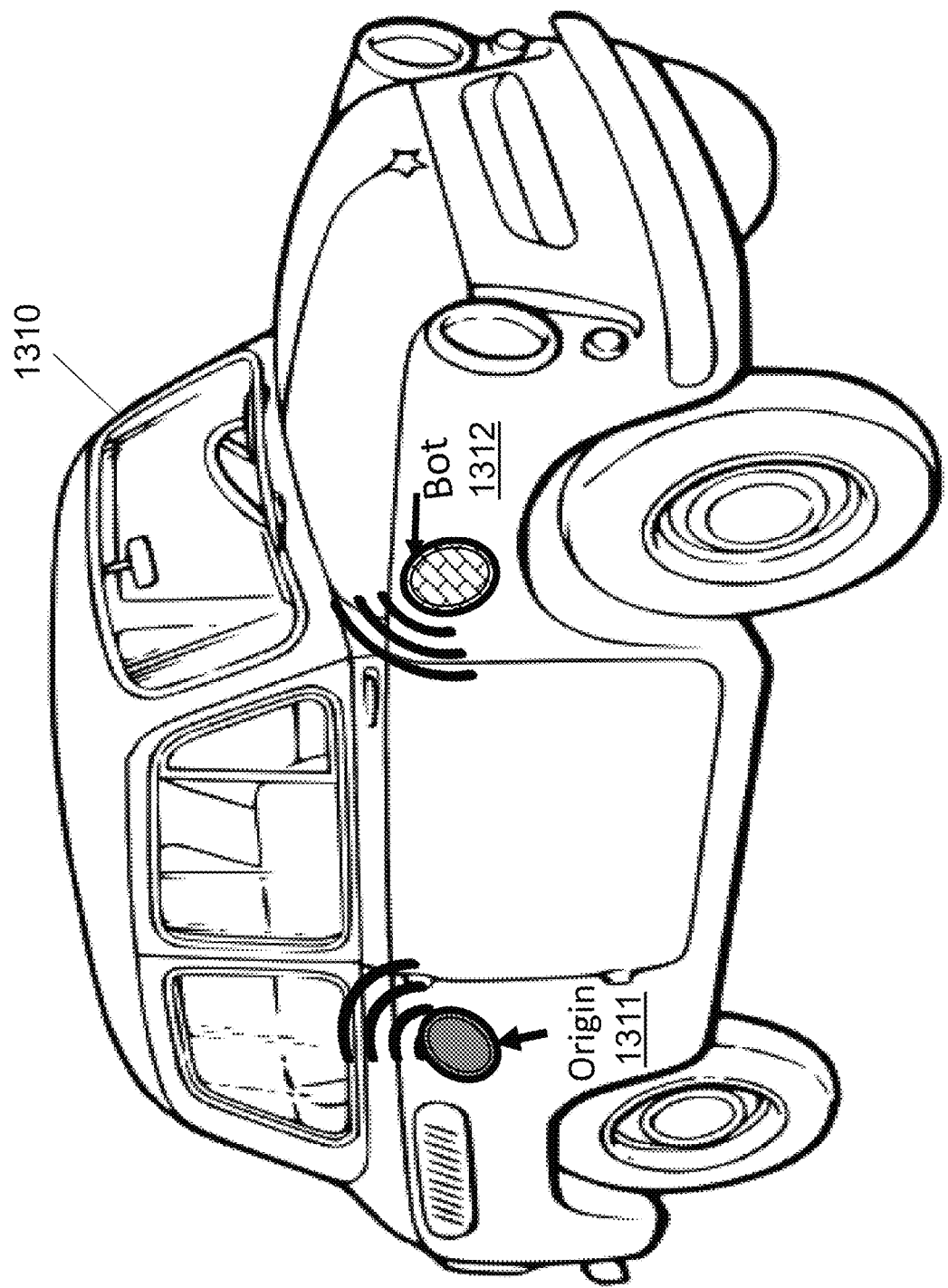
FIG. 13 illustrates an exemplary setting of Smart car with Origin and Bot installed outside of the car, according to some embodiments of the present teaching.

FIG. 13 illustrates another scenario of a smart car 1310. The Origin 1311 and Bot 1312 may be installed on the outside of the car 1310. When human presence is detected, the car 1310 may do something to: e.g. activate security; check ID of the person; if the user is confirmed, the car may open the door, trunk, etc. or start engine (warm up) or start air conditioning (AC) to cool the car 1310.

Figure 14:
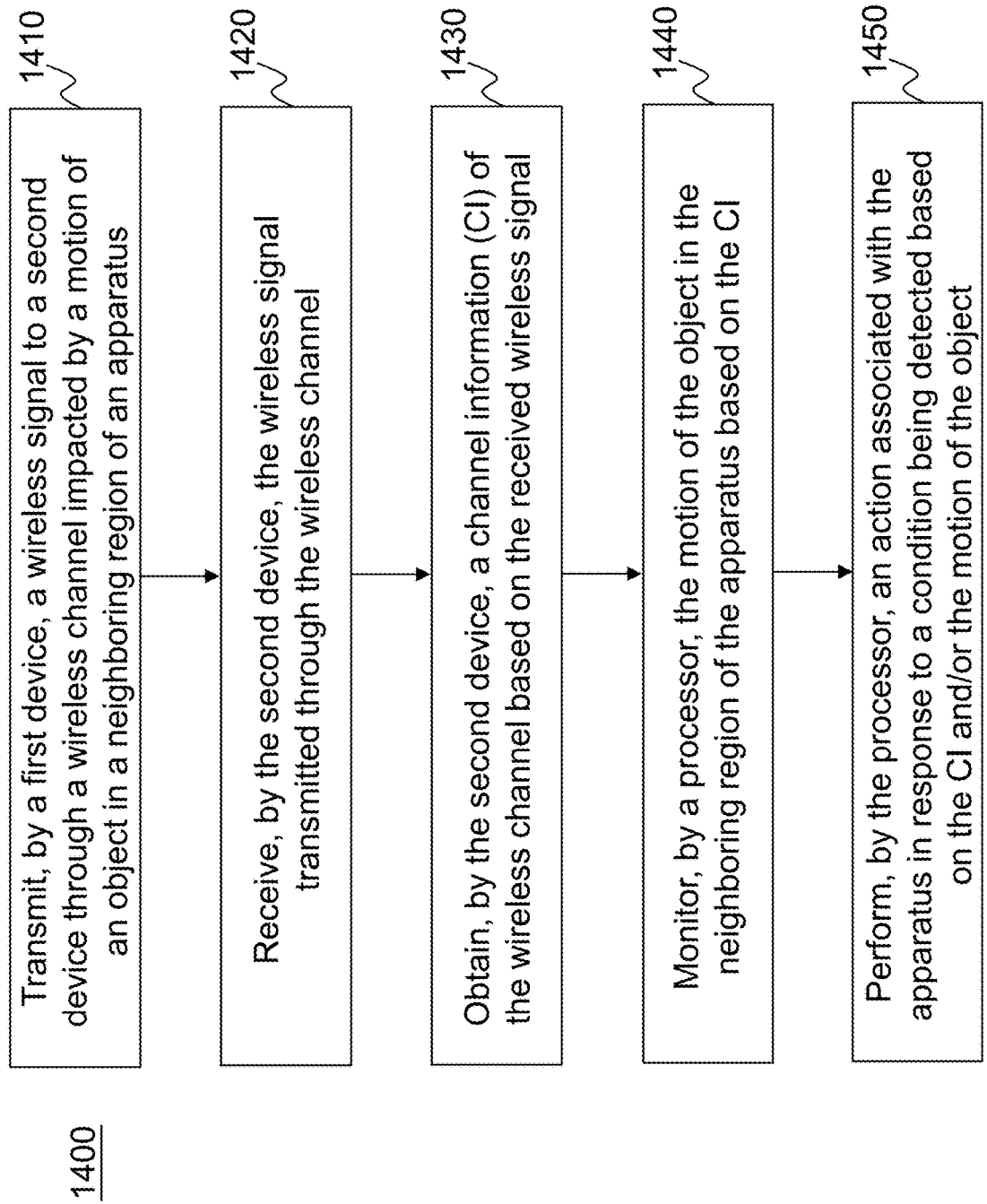
FIG. 14 illustrates a flow chart of an exemplary method for wireless proximity and presence monitoring, according to some embodiments of the present teaching.

FIG. 14 illustrates a flow chart of an exemplary method 1400 for wireless proximity and presence monitoring, according to some embodiments of the present teaching. At operation 1410, a first device transmits a wireless signal to a second device through a wireless channel impacted by a motion of an object in a neighboring region of an apparatus. As discussed above, the apparatus may be a smart TV, a smart fan, a smart car, etc. The first device may be a Bot; while the second device may be an Origin. The apparatus may include the first device, or the second device, or both. The object may be a person or a user of the apparatus.

At operation 1420, the second device receives the wireless signal transmitted through the wireless channel. At operation 1430, the second device obtains a channel information (CI) of the wireless channel based on the received wireless signal, e.g. a CSI of the wireless channel impacted by the motion of the object.

At operation 1440, a processor monitors the motion of the object in the neighboring region of the apparatus based on the CI. The processor may be coupled to the apparatus, to the first device, or to the second device, according to various embodiments. At operation 1450, the processor performs an action associated with the apparatus in response to a condition being detected based on the CI and/or the motion of the object. For example, when a condition is met to indicate that the object enters the neighboring region of the apparatus, the processor sends to a signal to turn on or resume the apparatus automatically; when another condition is met to indicate that the object leaves the neighboring region of the apparatus, the processor sends to another signal to turn off or pause the apparatus automatically. According to various embodiments, the order of the operations shown in FIG. 14 may be changed or modified.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. An apparatus in a venue for wireless proximity monitoring, comprising:
   a transmitter configured for transmitting a wireless signal through a wireless multipath channel, wherein the wireless multipath channel is impacted by a motion of an object within a proximity of the apparatus, wherein the proximity is segmented into a plurality of zones;
   a receiver configured for:
      receiving the wireless signal through the wireless multipath channel between the transmitter and the receiver, and
      obtaining a time series of channel information (TSCI) of the wireless multipath channel based on the wireless signal received by the receiver; and
   a processor coupled to the receiver and configured for
      determining, based at least partially on the TSCI, a presence of the object,
      calculating a motion statistic value indicating a motion intensity of the object based on a correlation between adjacent channel information of the TSCI, determining, among the plurality of zones, particular zone where the object is present based on the motion statistic value, and monitoring the motion of the object in the particular zone of the plurality of zones within the proximity of the apparatus based at least partially on the TSCI, wherein the motion of the object is monitored by determining at least one of:

a characteristics of the motion, a behavior of the object, a location of the object, a duration of the motion, a timing of the motion, an intensity of the motion, a distance of the motion, a speed of the motion, an acceleration of the motion, a repeated pattern of the motion, a periodic characteristics of the motion, a transient characteristics of the motion, an activity of the object, a regular activity of the object, a daily activity of the object, a weekly activity of the object, a monthly activity of the object, a yearly activity of the object, a change of the object, a change of the motion, a change of intensity of the motion, a change of a duration of the motion, an impulsive change of the motion, a change in behavior of the object, a change in transient characteristics of the motion, a change in periodic characteristics of the motion, an event associated with the object, a fall-down event of the object, an appearance of the object, a disappearance of the object, a behavior of the object, a gesture of the object, a gait of the object, a security-related event, at least one companion of the object, an information of the at least one companion, and a quantity of the object comprising an identity, a count, a class, a group, an age, a location, a time, a timing, a duration, a body condition, a vital sign, a breathing rate, a heart rate, a sleep quality, a sleep measure, an activity level, an activity measure, a physical state, an emotional state, a mental state, an anxiety, a calmness, a restlessness, a walking distance, a daily step count, a behavior, a fight, a presence, an absence, an appearance, a disappearance, an approaching, a receding, a pacing back and forth, a pacing from one end to another, a pacing from one point to another, a trend, a daily activity, a repeated activity, a normal activity, a deviation from normal activity, a sign of sickness, a sign of danger, a sign of need, an emotion, an expression, a facial expression, a body language, a gesture, a gait, a sign, a body motion, a head motion, a shoulder motion, a limb motion, a hand motion, a finger motion, a handwriting, a brush stroke, a keystroke, a symptom, and another quantity of the object.

2. The apparatus of claim 1, wherein:

a relative position of the transmitter and the receiver is adjusted, an instantaneous channel information (CI) of the wireless multipath channel is changed as the relative position being adjusted, and the relative position is adjusted by adjusting at least one of: a position of the transmitter, a position of the receiver, an orientation angle of the transmitter, an orientation angle of the receiver, a distance between the transmitter and the receiver, a configuration of the transmitter and the receiver, an arrangement of antennas of the transmitter and the receiver, a relative angle of the transmitter and the receiver, a position of an antenna of the transmitter, a position of an antenna of the receiver, an orientation angle of an antenna of the transmitter, an orientation angle of an antenna of the receiver, a distance between an antenna of the transmitter and another antenna of the receiver, a replacement of an antenna of the transmitter, and a replacement of an antenna of the receiver.

3. The apparatus of claim 1, wherein:

the wireless signal is a train of probe signals;

the wireless signal is compatible with at least one of:

a standard, wireless local area network (WLAN) standard, wireless communication standard, mobile communication standard, wireless network standard, international standard, national standard, industry standard, defacto standard, an IEEE standard, IEEE 802 standard, 802.11, 802.11n, 802.11ac, 802.11ax, 802.11be, 802.15, 802.16, WiFi standard, mesh standard, a 3GPP standard, LTE, 3G, 1G, 5G, 6G, 7G, 8G, UWB standard, Bluetooth standard, BLE, RFID standard, and another standard;

the receiver is configured for receiving the train of probe signals and extracting the TSCI based on the received train of probe signals;

at least one of the transmitter and the receiver is configured based on at least one of:

a user command, a remote command, a time schedule, the monitored characteristics of the motion of the object, a first event determined directly based on the monitored motion characteristics, a second event determined indirectly based on the monitored motion characteristics, a third event determined by another device, a status of the object, a status of another device in the venue, a status of another object in the venue, a status of the venue, a primitive, a service, an instructive command, a fundamental instruction, a service primitive, a management primitive, a management service primitive, a control primitive, a primitive comprising a probing rate of the train of probe signals, a primitive comprising a configuration associated with the probing rate, a primitive comprising the probing rate as a parameter of the primitive, a primitive comprising a priority setting associated with the probing rate change, a primitive comprising a new configuration, a primitive comprising a timing associated with a configuration change, a primitive comprising a request associated with the configuration, a primitive comprising a priority setting, a primitive comprising a priority parameter, a primitive associated with an instantiation of probe signal transmission, a standard-compliant primitive, an 802 primitive, an 802.11 primitive, a MAC layer primitive, a PHY layer primitive, a software call, a firmware call, a subroutine call, a software library, a standard-compliant frame, a standard-compliant management frame, a standard-compliant control frame, a standard-compliant data frame, an 802 frame, an 802.11 frame, an 802.11 management frame, an 802.11 control frame, an 802.11 data frame, a message, a message from an application software, a message from a software, a message from a firmware, a message from another, a message sent to the transmitter, a message sent to the receiver, a message sent from the receiver to the transmitter, a message sent from the transmitter to the receiver, wherein the message comprises at least one of: a command, the user command, the remote command, a request, an instruction, a software library call, a firmware, a management frame, a control frame, a data frame, the standard-compliant frame, the standard-compliant management frame, the standard-compliant control frame, the standard-compliant data frame, the 802 frame, the 802.11 frame, the 802.11 management frame, the 802.11 control frame, the 802.11 data frame, and another message;

the transmitter is configured for changing a configuration associated with the train of probe signals such that a quantity associated with the train of probe signals in a current window is different from a past window; and the configuration is changed based on at least one of:
  a user command, a remote command, a time schedule, the monitored characteristics of the motion of the object, a first event determined directly based on the monitored motion characteristics, a second event determined indirectly based on the monitored motion characteristics, a third event determined by another device, a status of the object, a status of another device in the venue, a status of another object in the venue, a status of the venue,
  a primitive, a service, an instructive command, a fundamental instruction, a service primitive, a management primitive, a management service primitive, a control primitive, a primitive comprising the probing rate, a primitive comprising a configuration associated with the probing rate, a primitive comprising a new value of the probing rate, a primitive comprising a time associated with the probing rate change, a primitive comprising a request associated with the probing rate, a primitive comprising the probing rate as a parameter of the primitive, a primitive comprising a priority setting, a primitive comprising a priority setting associated with the probing rate change, a primitive comprising a priority parameter, a standard compliant primitive, an 802 primitive, an 802.11 primitive, a MAC layer primitive, a PRY layer primitive, a software call, a firmware call, a subroutine call, a software library,
  a standard compliant frame, a standard-compliant management frame, a standard-compliant control frame, a standard-compliant data frame,
  an 802 frame, an 802.11 frame, an 802.11 management frame, an 802.11 control frame, an 802.11 data frame,
  a message, a message from an application, a message from a software, a message from a firmware, a message from another a message sent to the transmitter, a message sent to the receiver, a message sent from the receiver to the transmitter, a message sent from the transmitter to the receiver, wherein the message comprises at least one of: a command, the user command, the remote command, a request, an instruction, a software library call, a firmware, a management frame, a control frame, a data frame, the standard-compliant frame, the standard-compliant management frame, the standard-compliant control frame, the standard-compliant data frame, the 802 frame, the 802.11 frame, the 802.11 management frame, the 802.11 control frame, the 802.11 data frame, and another.

4. The apparatus of claim 1, wherein:
there are multiple transmitters on the apparatus;
the receiver is configured for obtaining more than one TSCI of the wireless multipath channel, wherein each TSCI is extracted from a respective asynchronous wireless signal transmitted from a respective transmitter to the receiver through the wireless multipath channel; and
the processor is configured for monitoring the motion of the object based on the more than one TSCI.

5. The apparatus of claim 1, wherein:
there are multiple receivers on the apparatus;
each of the multiple receivers is configured for obtaining a respective TSCI extracted from the wireless signal transmitted from the transmitter to the respective receiver through the wireless multipath channel; and
the processor is coupled to each of the multiple receivers and configured for monitoring the motion of the object based on the respective TSCI obtained by each receiver.

6. The apparatus of claim 1, wherein:
there are at least two transmitters on the apparatus;
one transmitter on the apparatus is configured to function as a receiver to receive an additional wireless signal from another transmitter on the apparatus through the wireless multipath channel and to extract an additional TSCI from the additional wireless signal; and
the processor is configured for monitoring the motion of the object based on the additional TSCI.

7. The apparatus of claim 1, wherein:
there are at least two receivers on the apparatus;
one receiver on the apparatus is configured to function as a transmitter to transmit an additional wireless signal to another receiver on the apparatus through the wireless multi path channel such that an additional TSCI is extracted from the additional wireless signal; and
the processor is configured for monitoring the motion of the object based on the additional TSCI.

8. The apparatus of claim 1, wherein:
the processor is further configured for controlling a device based on the monitoring of the motion of the object within the proximity of the apparatus;
the device comprises at least one of:
  a lighting device, switch, timer, window, curtain, shade, door, skylight, nightlight, lamp, lighted decoration, light-emitting device, light-reduction device, colored light source, color-changing device, mood-setting light, ambient light,
  a home appliance, stove, refrigerator, oven, microwave oven, pot, coffer maker, cooker, laundry machine, washer, dryer, smoke detector, cleaning device, vacuum cleaner, telephone, clock, timing device, seat, table, floor, wall, tiles, mat, tool, container, piano, musical instrument, instrument,
  an HVAC-related device, fan, attic fan, air-conditioner, air-conditioning system, heater, heat pump, water heater, water filter, watering system, air-flow control device, thermostat, solar panel, tile,
  entertainment devices, media device, television (TV), TV device, amplifier, HiFi system, camera, audio system, speaker, microphone, headphone, set-top box, game machine, virtual reality device, augmented reality (AR) device,
  a security system, motion sensor, PIR sensor, wireless sensor, contact sensor, security ready gadget, small door bell, garage door, door, window,
  a computing device, computer, server, monitor, laptop, tablet, router, access point, repeater, networked device, smart device, internet-of-thing (IoT) device, mobile device, smart phone, office machines, photocopier, fax machine, paper shredder, printer, scanner, cart, a conference system, conference room, messaging system, note-taking system, workplace system, logistics system, a manufacturing machine, assembly line, robot, automated guided vehicle, motor, machine, device, supply chain, inventory system, shelving, storage, container, a transportation device, vehicle, car, bus, truck, container truck, motorcycle, boat, drone, flying machine, and another device; and controlling the device comprises at least one of:
causing the device to turn on,
causing the device to turn off,
causing the device to turn on based on a presence of the object in a targeted proximity area in the venue,
causing the device to turn based on an absence of the object in the targeted proximity area in the venue,
causing the device to be configured,
causing the device to exercise a functionality,
causing the functionality of the device to be configured,
causing the functionality of the device to at least one of: start, stop, operate, pause, and resume,
causing a setting of the device to be at least one of: selected, set, and adjusted,
and another control of the device.

9. The apparatus of claim 1, wherein the processor is further configured for:
sending, based on the monitoring of the motion of the object within the proximity of the apparatus, a message to a user device.

10. The apparatus of claim 8, wherein the processor is further configured for:
analyzing the motion of the object; and
computing at least one analytics based on analyzing the motion of the object.

11. The apparatus of claim 10, wherein the processor is further configured for:
sending a data to a user device, based on at least one of: the motion of the object being monitored in the venue, and the at least one analytics computed based on the motion of the object; and generating a presentation on the user device based on the data.

12. An apparatus for wireless proximity monitoring in a venue where a transmitter and a receiver are located, comprising:
at least one of the transmitter and the receiver, wherein:
the transmitter is configured for transmitting a wireless signal through a wireless multipath channel that is impacted by a motion of an object within a proximity of the apparatus,
the proximity is segmented into a plurality of zones,
the receiver is configured for:
receiving the wireless signal through the wireless multipath channel between the transmitter and the receiver, and
obtaining a time series of channel information (TSCI) of the wireless multipath channel based on the wireless signal received by the receiver; and
a processor configured for:
determining, based at least partially on the TSCI, a presence of the object,
calculating a motion statistic value indicating a motion intensity of the object based on a correlation between adjacent channel information of the TSCI,
determining among the plurality of zones, a particular zone where the object is present based on the motion statistic value,
monitoring the motion of the object in the particular zone of the plurality of zones within the proximity of the apparatus based at least partially on the TSCI, and
controlling the apparatus based on the particular zone and the monitored motion of the object within the proximity of the apparatus,
wherein the motion of the object is monitored by determining at least one of:
a characteristics of the motion, a behavior of the object, a location of the object, a duration of the motion, a timing of the motion, an intensity of the motion, a distance of the motion, a speed of the motion, an acceleration of the motion,
a repeated pattern of the motion, a periodic characteristics of the motion, a transient characteristics of the motion, an activity of the object, a regular activity of the object, a daily activity of the object, a weekly activity of the object, a monthly activity of the object, a yearly activity of the object,
a change of the object, a change of the motion, a change of intensity of the motion, a change of a duration of the motion, an impulsive change of the motion, a change in behavior of the object, a change in transient characteristics of the motion, a change in periodic characteristics of the motion,
an event associated with the object, a fall-down event of the object, an appearance of the object, a disappearance of the object, a behavior of the object, a gesture of the object, a gait of the object, a security-related event,
at least one companion of the object, an information of the at least one companion, and
a quantity of the object comprising an identity, a count, a class, a group, an age, a location, a time, a timing, a duration, a body condition, a vital sign, a breathing rate, a heart rate, a sleep quality, a sleep measure, an activity level, an activity measure, a physical state, an emotional state, a mental state, an anxiety, a calmness, a restlessness, a walking distance, a daily step count, a behavior, a fight, a presence, an absence, an appearance, a disappearance, an approaching, a receding, a pacing back and forth, a pacing from one end to another, a pacing from one point to another, a trend, a daily activity, a repeated activity, a normal activity, a deviation from normal activity, a sign of sickness, a sign of danger, a sign of need, an emotion, an expression, a facial expression, a body language, a gesture, a gait, a sign, a body motion, a head motion, a shoulder motion, a limb motion, a hand motion, a finger motion, a handwriting, a brush stroke, a keystroke, a symptom, and another quantity of the object.

13. The apparatus of claim 12, wherein:
the wireless signal is a train of probe signals sent at a regular interval within a time window;
the transmitter and the receiver are configured for transmission and reception of the train of probe signals; and
at least one of the transmitter and the receiver is configured or reconfigured based on at least one of:
a user command, a remote command, a time schedule, the monitored characteristics of the motion of the object, a first event determined directly based on the monitored motion characteristics, a second event determined indirectly based on the monitored motion characteristics, a third event determined by another device, a status of the object, a status of another device in the venue, a status of another object in the venue, a status of the venue, a primitive, a service, an instructive command, a fundamental instruction, a service primitive, a management primitive, a management service primitive, a control primitive, a primitive comprising a probing rate of the train of probe signals, a primitive comprising a configuration associated with the probing rate, a primitive comprising the probing rate as a parameter of the primitive, a primitive comprising a priority setting associated with the probing rate change, a primitive comprising a new configuration, a primitive comprising a timing associated with a configuration change, a primitive comprising a request associated with the configuration, a primitive comprising a priority setting, a primitive comprising a priority parameter, a primitive associated with an instantiation of probe signal transmission, a standard-compliant primitive, an 802 primitive, an 802.11 primitive, a MAC layer primitive, a PHY layer primitive, a software call, a firmware call, a subroutine call, a software library, a standard-compliant frame, a standard-compliant management frame, a standard-compliant control frame, a standard-compliant data frame, an 802 frame, an 802.11 frame, an 802.11 management frame, an 802.11 control frame, an 802.11 data frame, a message, a message from an application software, a message from a software, a message from a firmware, a message from another, a message sent to the transmitter, a message sent to the receiver, a message sent from the receiver to the transmitter, a message sent from the transmitter to the receiver, wherein the message comprises at least one of: a command, the user command, the remote command, a request, an instruction, a software library call, a firmware, a management frame, a control frame, a data frame, the standard-compliant frame, the standard-compliant management frame, the standard-compliant control frame, the standard-compliant data frame, the 802 frame, the 802.11 frame, the 802.11 management frame, the 802.11 control frame, the 802.11 data frame, and another message.

14. The apparatus of claim 12, wherein:
there are multiple transmitters on the apparatus;
the receiver is configured for obtaining more than one TSCI of the wireless multipath channel, wherein each TSCI is extracted from a respective asynchronous wireless signal transmitted from a respective transmitter to the receiver through the wireless multipath channel; and
the processor is configured for monitoring the motion of the object based on the more than one TSCI.

15. The apparatus of claim 12, wherein:
there are multiple receivers on the apparatus;
each of the multiple receivers is configured for obtaining a respective TSCI extracted from the wireless signal transmitted from the transmitter to the respective receiver through the wireless multipath channel; and
the processor is configured for monitoring the motion of the object based on the respective TSCI obtained by each receiver.

16. The apparatus of claim 12, wherein:
there are at least two transmitters on the apparatus;
one transmitter on the apparatus is configured to function as a receiver to receive an additional wireless signal from another transmitter on the apparatus through the wireless multipath channel and to extract an additional TSCI from the additional wireless signal; and
the processor is configured for monitoring the motion of the object based on the additional TSCI.

17. The apparatus of claim 12, wherein:
there are at least two receivers on the apparatus;
one receiver on the apparatus is configured to function as a transmitter to transmit an additional wireless signal to another receiver on the apparatus through the wireless multipath channel such that an additional TSCI is extracted from the additional wireless signal; and
the processor is configured for monitoring the motion of the object based on the additional TSCI.

18. The apparatus of claim 12, further comprising at least one of:
a lighting device, switch, timer, window, curtain, shade, door, skylight, nightlight, lamp, lighted decoration, light-emitting device, light-reduction device, colored light source, color-changing device, mood-setting light, ambient light, a home appliance, stove, refrigerator, oven, microwave oven, pot, coffer maker, cooker, laundry machine, washer, dryer, smoke detector, cleaning device, vacuum cleaner, telephone, clock, timing device, seat, table, floor, wall, tiles, mat, tool, container, piano, musical instrument, instrument,
an HVAC-related device, fan, attic fan, air-conditioner, air-conditioning system, heater, heat pump, water heater, water filter, watering system, air-flow control device, thermostat, solar panel, tile,
entertainment devices, media device, television (TV), TV device, amplifier, HiFi system, camera, audio system, speaker, microphone, headphone, set-top box, game machine, virtual reality device, augmented reality (AR) device,
a security system, motion sensor, FIR sensor, wireless sensor, co ac sensor, security, ready gadget, small door bell, garage door, door, window,
a computing device, computer, server, monitor, laptop, tablet, router, access point, repeater, networked device, smart device, internet-of-thing (IoT) device, mobile device, smart phone,
office machines, photocopier, fax machine, paper shredder, printer, scanner, cart, a conference system, conference room, messaging system, note-taking system, workplace system, logistics system,
a manufacturing machine, assembly line, robot, automated guided vehicle, motor, machine, device, supply chain, inventory system, shelving, storage, container, a transportation device, vehicle, car, bus, truck, container truck, motorcycle, boat, drone, flying machine, and another device.

19. The apparatus of claim 12, wherein the processor is further configured for:
sending, based on the monitoring of the motion of the object within the proximity of the apparatus, a message to a user device of a user that uses the apparatus being controlled.

20. The apparatus of claim 12, wherein the processor is further configured for:
analyzing the motion of the object; and
computing at least one analytics based on analyzing the motion of the object.

21. The apparatus of claim 20, wherein the processor is further configured for:
sending a data to a user device of a user that uses the apparatus being controlled, based on at least one of: the motion of the object being monitored in the venue, and the at least one analytics computed based on the motion of the object; and
generating a presentation on the user device based on the data.

22. The apparatus of claim 12, wherein controlling the apparatus comprises at least one of:
causing the apparatus to turn on,
causing the apparatus to turn off,
causing the apparatus to turn on based on a presence of the object in a targeted proximity area in the venue,
causing the apparatus to turn off based on an absence of the object in the targeted proximity area in the venue,
causing the apparatus to be configured,
causing the apparatus to exercise a functionality,
causing the functionality of the apparatus to be configured,
causing the functionality of the apparatus to at least one of: start, stop, operate, pause, and resume,
causing a setting of the apparatus to be at least one of: selected, set, and adjusted, and another control of the apparatus.

23. A method, implemented by a processor, a memory communicatively coupled with the processor, and a set of instructions stored in the memory to be executed by the processor, comprising:
obtaining a time series of channel information (TSCI) of a wireless multipath channel that is impacted by a motion of an object within a proximity of an apparatus in a venue, wherein:
a transmitter sends a wireless signal to a receiver through the wireless multipath channel,
the proximity is segmented into a plurality of zones, and
the receiver receives the wireless signal and computes the TSCI of the wireless multipath channel based on the received wireless signal;
determining, based at least partially on the TSCI, a presence of the object;
calculating a motion statistic value indicating, a motion intensity of the object based on a correlation between adjacent channel information of the TSCI;
determining, among the plurality of zones, a particular zone where the object is present based on the motion statistic value;
monitoring the motion of the object in the particular zone of the plurality of zones within the proximity of the apparatus based at least partially on the TSCI; and
performing an action associated with the apparatus in response to a condition being detected based on at least one of: the particular zone and the motion of the object.

24. The method of claim 23, wherein the apparatus comprises at least one of:
a home appliance, a consumer electronic device, an internet-of-things (IoT) device, a smart device, an office appliance, a manufacturing appliance, a logistic device, a television, a set-top box, an audio device, an entertaining device, a device with a display, a device with a low-power mode, a refrigerator, a speaker, a computer, a router, an access point,
a stove, a heating device, a device with fire, a cooking device, an ironing device, a fireplace, a gas burning device, a cooling device, a freezing device, a refrigerating device, an air conditioner, a heater, a welding device, a soldering device, a brazing device, a melting device, a fusing device, a joining device, a sorting device, a blending device, a mixing device,
a HVAC device, a heater, a ventilation device, an air conditioner, an energy consuming device, an energy generation device, an energy transformation device,
an electrical device, a high energy device, a high voltage electrical device, a high current device, a strong magnetic field device, a magnetic coupler, an magnetic induction device, an electrical induction device, a power transfer device, an energy transfer device, a heavy-lifting device, a heavy machinery, a high-power device, a water gun, a device with pressurized fluid, a device with fluid, a watering system, a swimming pool, a gas pipe, a weapon, a rioting management device,
a mechanic device, a device with a rotating component, a machine, a motor, a lawnmower, an engine, a vehicle, a transport device, an automated guided vehicle (AGV), a driverless vehicle, a controller of a remote control device, a machine on wheels, a crushing device, a stamping device, a striking device, a drilling device, a sawing device, a spraying device, a molding device, a cleaning device, an industrial device, an industrial machinery, a manufacturing device, a device with a moving part,
a guard post, a supervisory control system, an emergency system, a security system, a supervisor device, a control center, a mobile control,
a children play area, a baby-sitting area, an older adult living area, a lift-guard post, a prison, a detention facility, a hospital room, an intensive care unit (ICU), a device in ICU, a device with hazardous material, a device with hazardous waste, a device with radiation, a device with bio-hazard, a device with chemical hazard, a device with physical hazard, a device in unstable environment, a device on slippery surface,
a device with delicate matter, a device with fragile matter, a device with unstable matter, a device with fuel, a device with living tissues for transplant, a device with valuables, a device with weapons, a device with explosives, and another device.

25. The method of claim 23, wherein:
the wireless signal comprises at least one of:
a wireless communication signal, mobile communication signal, wireless network signal, mobile network signal, mesh signal, light signal, light communication, downlink signal, uplink signal, broadcast signal, multicast signal, unicast signal, bandlimited standard compliant signal, wireless standard compliant signal, protocol signal, standardized wireless protocol, communication protocol, wireless communication network signal, cellular network signal, beacon signal, beacon wireless signal, pilot signal, probe signal, reference signal, source signal, wireless source signal, motion probes, motion detection signal, motion sensing signal, synchronization signal,
a 3GPP signal, LTE/3G/4G/5G/6G/7G/8G signal, WiFi signal, IEEE 802 signal, WEE 802.11/15/16 signal, RFID signal, Bluetooth signal, BLE signal, UWB signal, Zigbee signal, WiMax signal, an RF signal in licensed band, an RF signal in unlicensed band, an RF signal in ISM band, and another RF signal; and
the RF signal is compatible with at least one of:
a standard, wireless local area network (WLAN) standard, wireless communication standard, mobile communication standard, wireless network standard, international standard, national standard, industry standard, defacto standard, an IEEE standard, IEEE 802 standard, 802.11, 802.11n, 802.11ac, 802.11ax, 802.11be, 802.15, 802.16, WiFi standard, mesh standard, a 3GPP standard, LTE, 3G, 4G, 5G, 6G, 7G, 8G, UWB standard, Bluetooth standard, BLE, RFID standard, and another standard.

26. The method of claim 23, wherein the proximity of the apparatus comprises at least one of:

a region within a radius of 0.1 feet around the apparatus,
a region within a radius of 0.5 feet around the apparatus,
a region within a radius of one feet around the apparatus,
a region within a radius of five feet around the apparatus,
a region within a radius of ten feet around the apparatus,
a region within a radius of fifty feet around the apparatus,
a region within a radius of 100 feet around the apparatus,
a region within a radius of 500 feet around the apparatus,
a region within a radius of 1000 feet around the apparatus,
a region within a radius larger than 1000 feet around the apparatus,
a region around the apparatus excluding another region around the apparatus,
a directional region, a frontal region, a rear region, a side region, a top region, a bottom region, and
a region around the apparatus with a height between a first height and a second height from a floor.

27. The method of claim 23, wherein:
the apparatus comprises at least one of: the transmitter and the receiver.

28. The method of claim 27, wherein:
at least one of the transmitter and the receiver is steered towards a direction of the apparatus to monitor a directed proximity region of the apparatus; and
the direction comprises at least one of: a front direction, a back direction, a left direction, a right direction, a top direction, a bottom direction and another direction of the apparatus.

29. The method of claim 23, wherein monitoring the motion of the object comprises monitoring at least one of:

a presence, an absence, an appearing, a disappearing, an approaching, a receding,
a periodic motion, a transient motion, a repeating motion, a stochastic motion, a characteristics of the motion, intensity, a timing, a duration,
a behavior, a trend, a daily activity, a normal activity, a deviation from normal activity, a change, an activity level, an activity measure,
a location, a distance, a speed, an acceleration, a walking distance,
an event, a fall-down event, a pacing back and forth, a pacing from one end to another, a pacing from one point to another, a wandering, a running, a fight,
a physical condition, a heart beat, a breathing rate, a vital sign, an emotion state, a mental state, a physical state, an anxiety, a calmness, a restlessness,
an identity, a count, a class, a group, an age, at least one companion, an information of the at least one companion,
a sleeping condition, a sleep quality, a sleep measure, a sign of a sickness, a symptom, a sign of danger, a sign of need, a sign of a body condition,
an emotion, an expression, a facial expression, a body language, a gesture, a gait, a head motion, a shoulder motion, a limb motion, an arm motion, a hand motion, a finger motion, a handwriting, a brush stroke, a keystroke, and another information.

30. The method of claim 23, wherein performing the action associated with the apparatus comprises at least one of:

turning off the apparatus, turning on the apparatus,
slowing down the apparatus, speeding up the apparatus,
reducing an operation of the apparatus, increasing an operation of the apparatus, adjusting an operation of the apparatus, adjusting the apparatus,
activating an auxiliary system, controlling an auxiliary system,
notifying at least one of: the user, another user, a server, another monitoring system, an emergency response system, an emergency service,
sending a message to at least one of: a user device of the user, another device of the another user, a server, a local server, a cloud server, another monitoring system, an emergency response system, an emergency service,
signaling an alarm with at least one of: sound, light, and mechanical motion, and another responding action.

* * * * *